March 19, 1968 L. PEASE 3,373,782
SIDE, TOP AND BOTTOM CHIPPERS
Filed Oct. 20, 1964 20 Sheets-Sheet 4

INVENTOR.
Lionel Pease
BY
TW Secrest

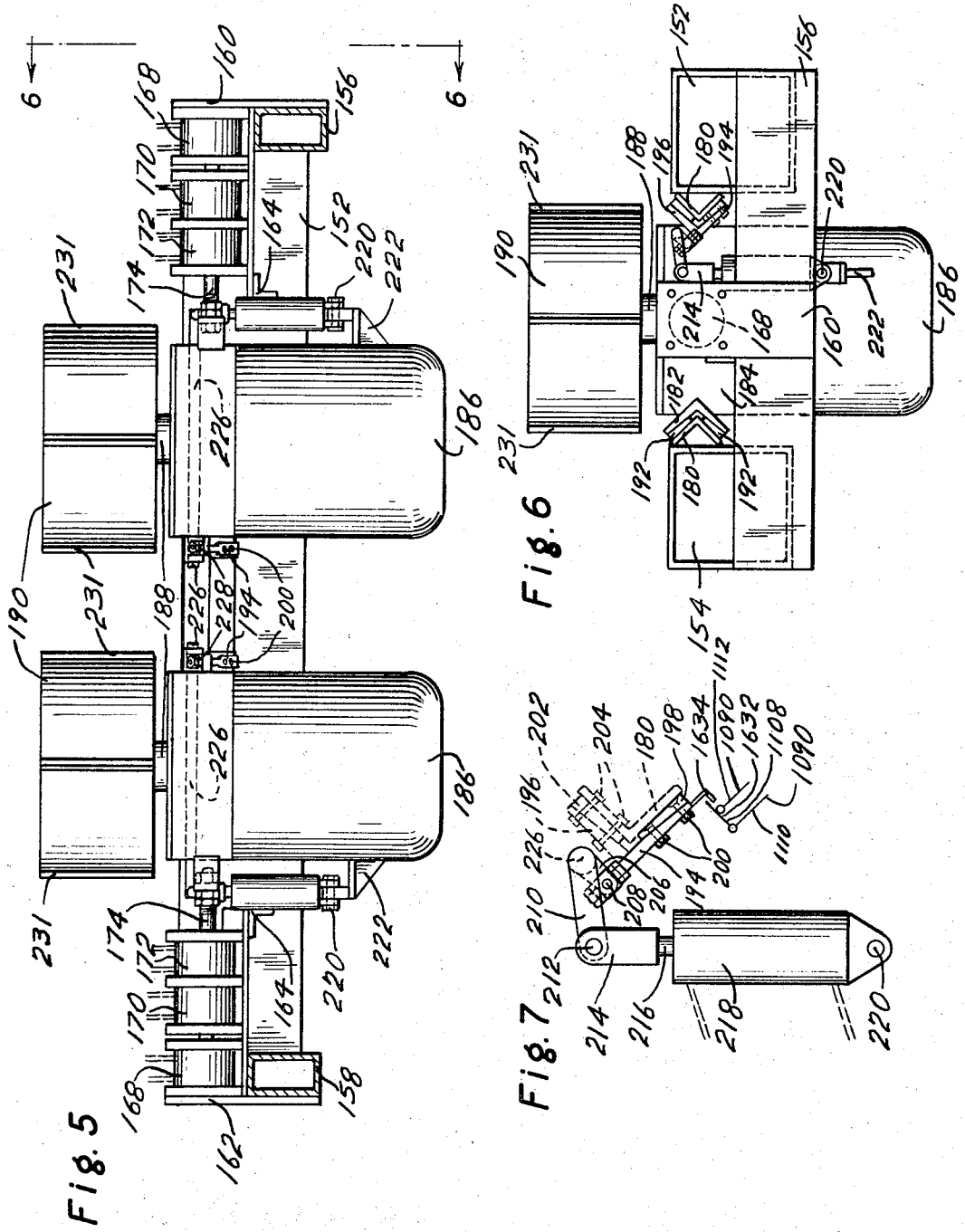

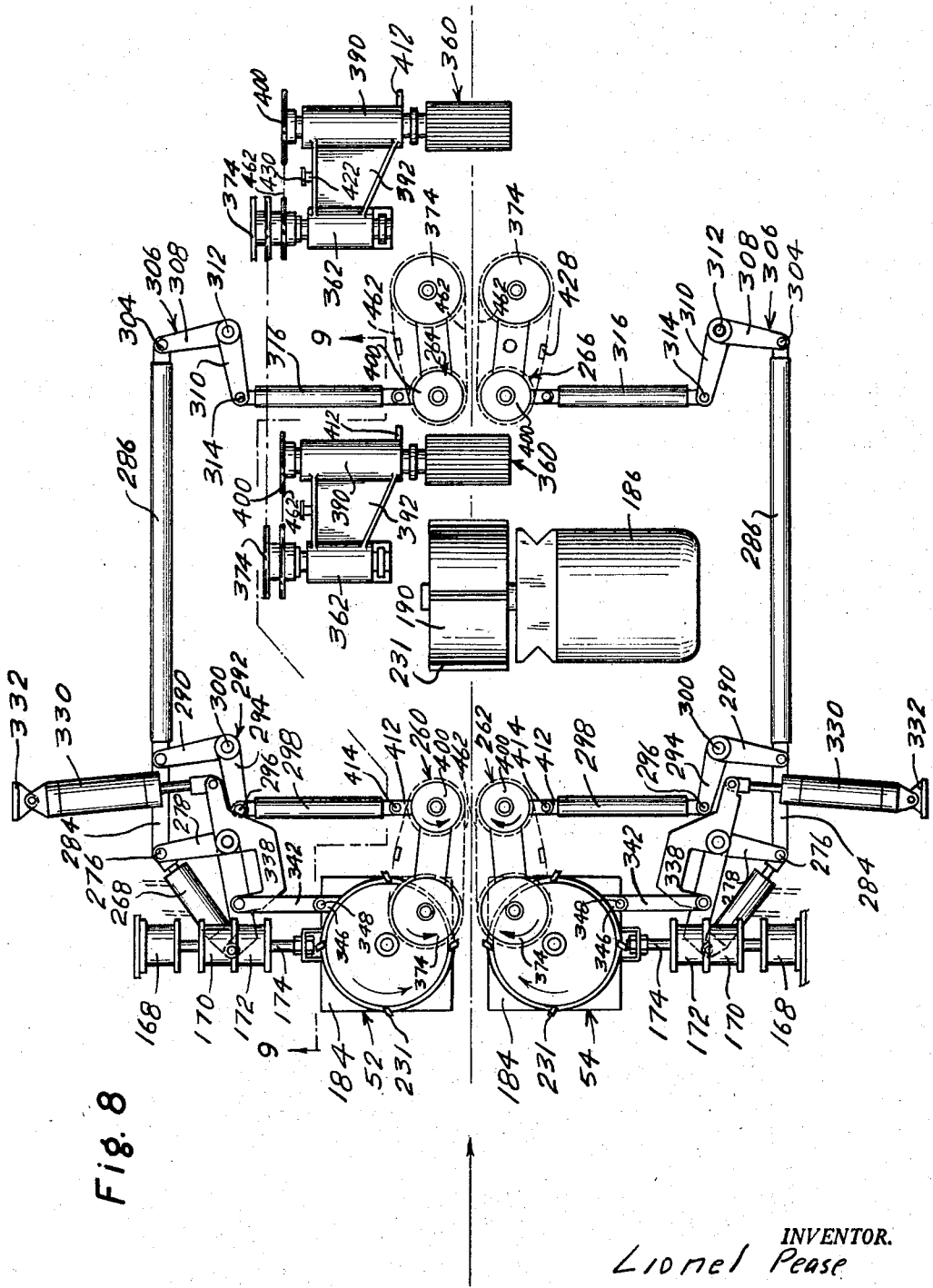

March 19, 1968 L. PEASE 3,373,782
SIDE, TOP AND BOTTOM CHIPPERS
Filed Oct. 20, 1964 20 Sheets-Sheet 7

INVENTOR.
Lionel Pease
BY
TW Secrest

March 19, 1968

L. PEASE 3,373,782

SIDE, TOP AND BOTTOM CHIPPERS

Filed Oct. 20, 1964

INVENTOR.
Lionel Pease
BY
TW Secrest

March 19, 1968 L. PEASE 3,373,782
SIDE, TOP AND BOTTOM CHIPPERS
Filed Oct. 20, 1964 20 Sheets-Sheet 9
Fig. 14
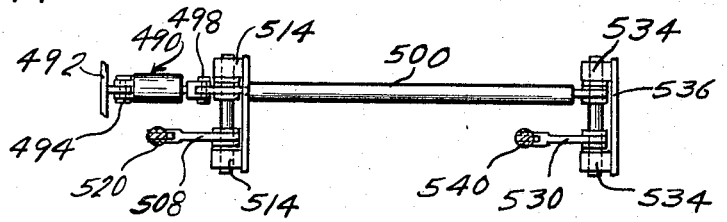
Fig. 15
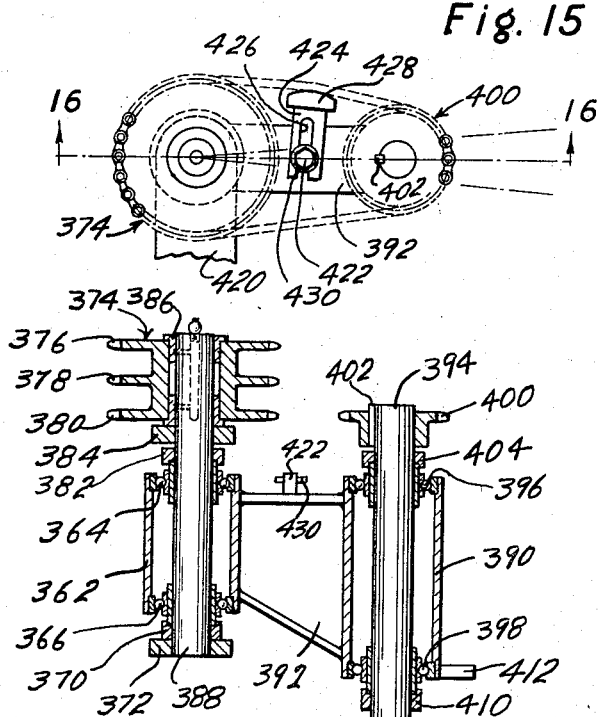
Fig. 16
INVENTOR.
Lionel Pease
BY
TW Secrest INVENTOR.
Lionel Pease
BY
TW Secrest Fig. 25 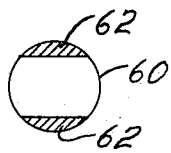   Fig. 26

Fig. 28 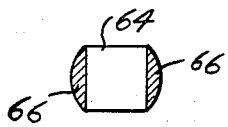   Fig. 29 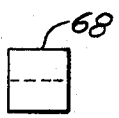

INVENTOR.
Lionel Pease
BY
TW Secrest

March 19, 1968

L. PEASE 3,373,782

SIDE, TOP AND BOTTOM CHIPPERS

Filed Oct. 20, 1964

INVENTOR.
Lionel Pease
BY
TW Secrest

March 19, 1968 L. PEASE 3,373,782
SIDE, TOP AND BOTTOM CHIPPERS
Filed Oct. 20, 1964 20 Sheets-Sheet 19

INVENTOR.
Lionel Pease
BY TW Secrest

March 19, 1968     L. PEASE     3,373,782
SIDE, TOP AND BOTTOM CHIPPERS
Filed Oct. 20, 1964     20 Sheets-Sheet 20

INVENTOR.
Lionel Pease
BY VW Secrest

United States Patent Office 3,373,782
Patented Mar. 19, 1968

3,373,782
SIDE, TOP AND BOTTOM CHIPPERS
Lionel Pease, Seattle, Wash., assignor to Mill Equipment, Inc., Seattle, Wash., a corporation of Washington
Filed Oct. 20, 1964, Ser. No. 405,101
40 Claims. (Cl. 144—326)

This invention is for a machine comprising side, top and bottom chippers for converting logs into lumber and chips.

It is not economical to process small logs into rough-cut lumber by the process of sawing the small logs into the rough-cut lumber and slabs. For example, lodge pole pine at the base may have a diameter of about twelve (12") inches and at the height of fifty (50') feet may have a diameter of about nine (9") inches. It is not economical to cut such a tree, convey it to a processing place, saw slabs off the periphery of the tree so as to leave a rough-cut cant. The cant may be utilized, but it is necessary to dispose of the slabs and the bark. All of these steps make it uneconomical to utilize such a log. In fact, the cost of processing such a log is sometimes more than can be realized from the rough-cut lumber.

This invention makes it possible to economically convert a small log into small dimensional lumber and wood chips. The tree is cut and conveyed to a central processing plant, the bark is removed and may be burned or otherwise destroyed. Then, the debarked log is fed to this invention and converted into wood chips and a rough-cut cant. For example, a log having a three and one-half (3½") inch diameter may be converted into wood chips and a rough-cut two-by-four (2" x 4"). A further example is that a log having a five-inch diameter may be converted into wood chips and a rough-cut four-by-four (4" x 4") or two rough-cut two-by-fours (2" x 4"s). The wood chips may be used in a pulping operation to make paper pulp, may be converted into hardboard, into chipboard or into a pressboard. Naturally, the rough-cut small dimensional lumber may be used as is, or may be finished to make a smooth finished piece of lumber such as a two-by-four (2" x 4") having outside dimensions of approximately one and five-eighth inches by three and five-eighth inches (1⅝" x 3⅝").

Accordingly, an object of this invention is the conversion of what is essentially a waste material or an economically non-utilizable material into useful material such as wood chips and cants; the provision of a machine having a high capacity for converting small logs into cants at a rate of approximately 70,000 boardfeet per eight-hour shift; a machine capable of handling various sized small logs; a machine which is relatively small and occupies a small floor area; a machine which has relatively few moving parts for its function and purpose; a machine which requires relatively little maintenance; a machine having safety devices to prevent operation of the machine in case of an accident or a malfunction; a machine capable of converting small logs into either slabs or cants at a high production rate; a machine which is compatible with other equipment such as means for feeding logs into the machine and means for processing the cants into small dimensional lumber such as two-by-fours (2" x 4"'s); a machine which is capable of removing four slabs simultaneously from the log and also, accurately from the log; a machine which squares a log accurately; and, a machine which makes it possible to economically process small logs into small dimensional lumber and wood chips.

These and other important objects and advantages of the invention will be more particularly brought forth upon reference to the accompanying drawings, the detailed description of the invention and the appended claims.

Figure 4:
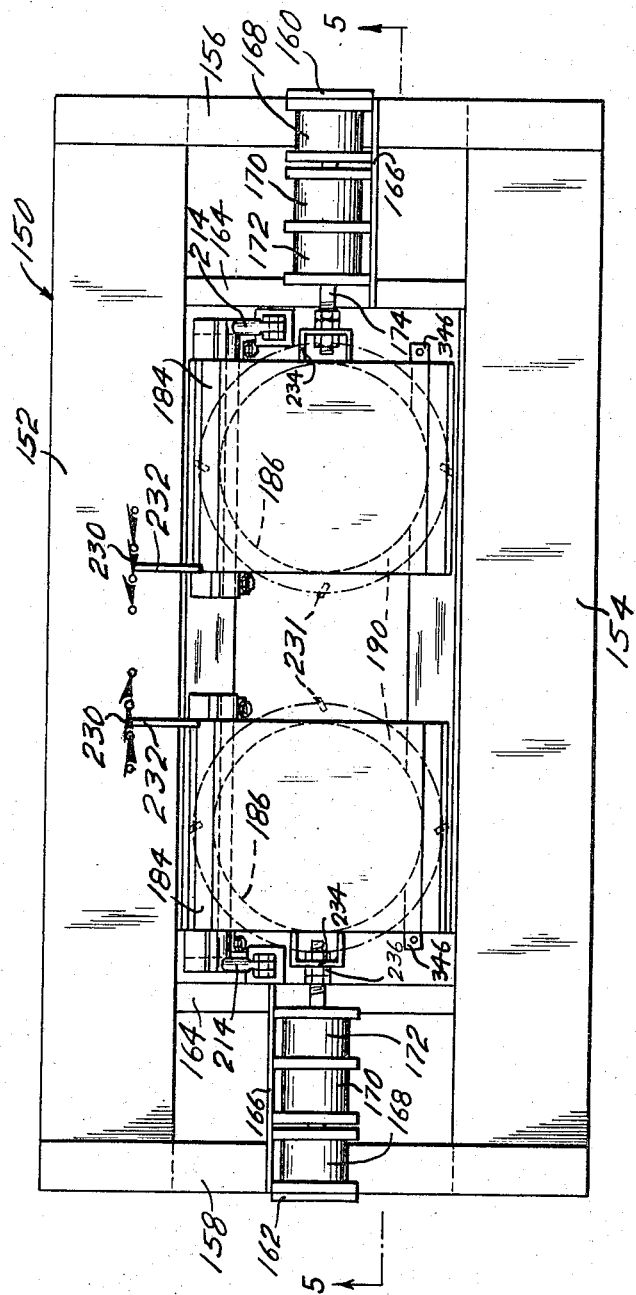
FIGURE 4 is an illustration of a guide means for positioning two chippers and means for moving the two chippers on said guide means.
Figure 9:
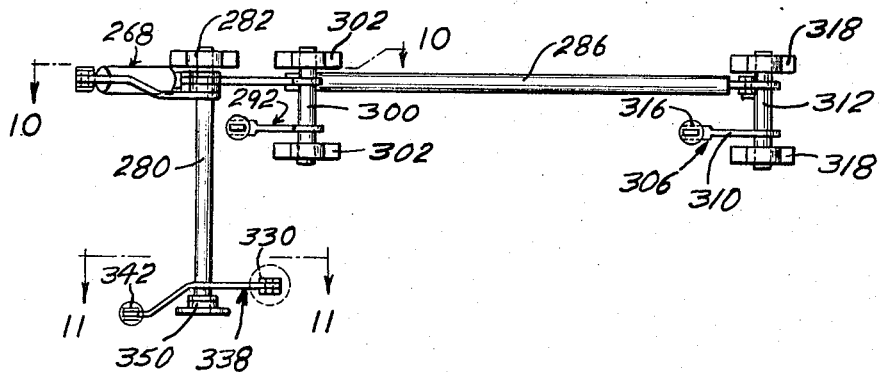
Figure 10:
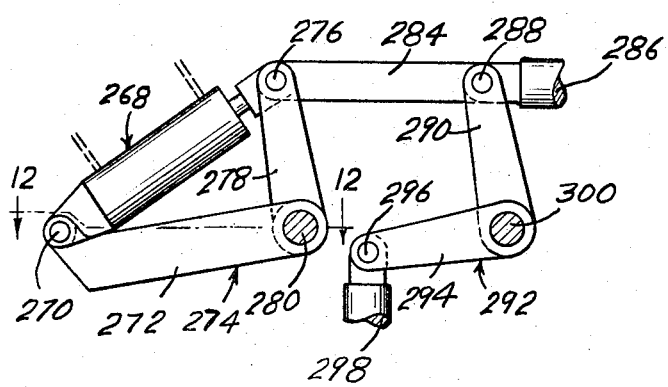
Figure 11:
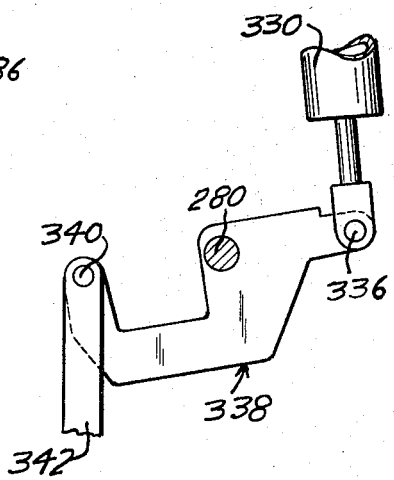
Figure 12:
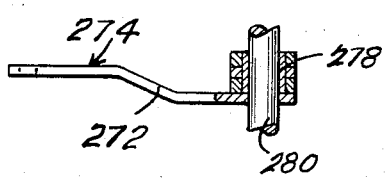
Figure 13:
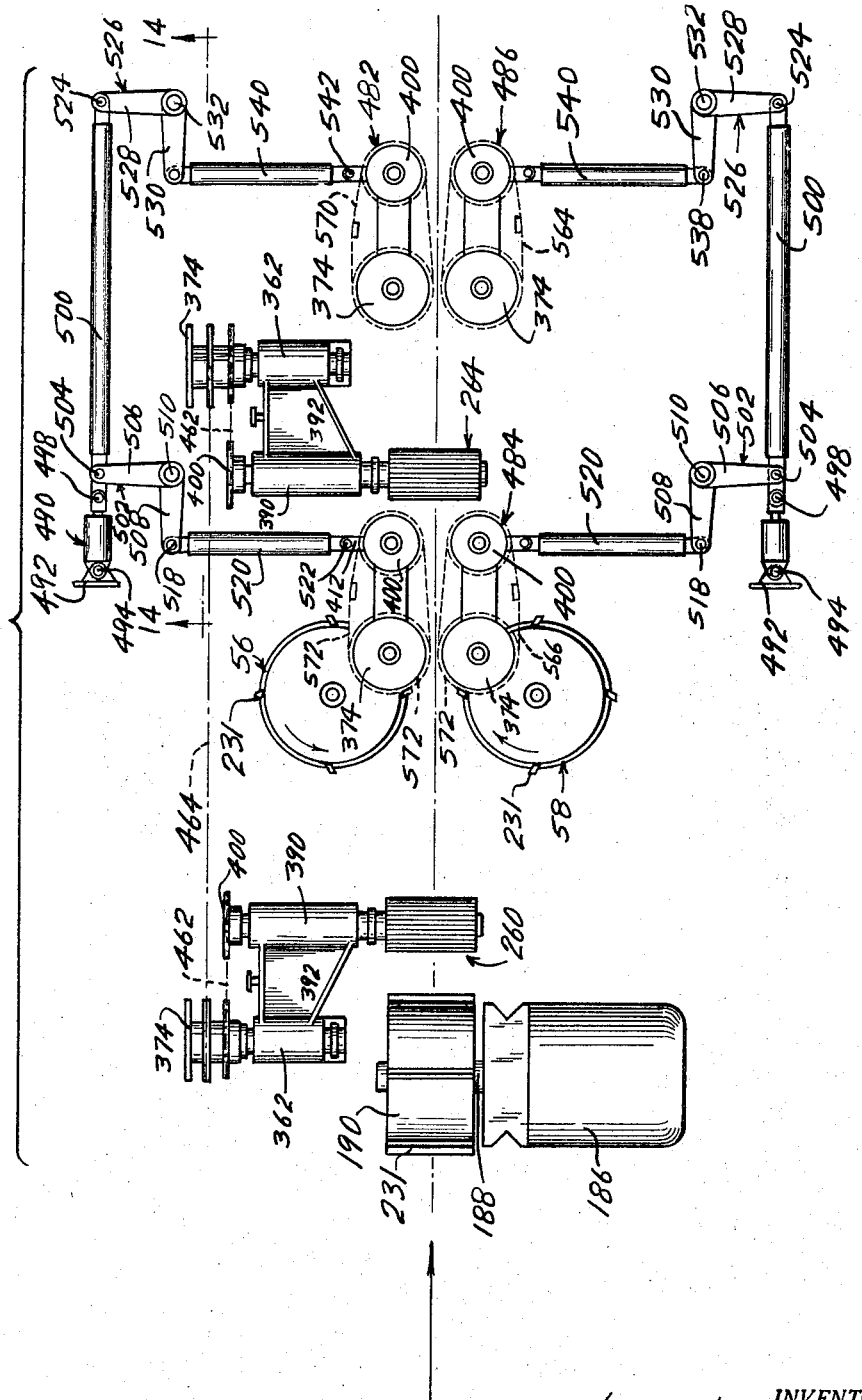
Figure 17:
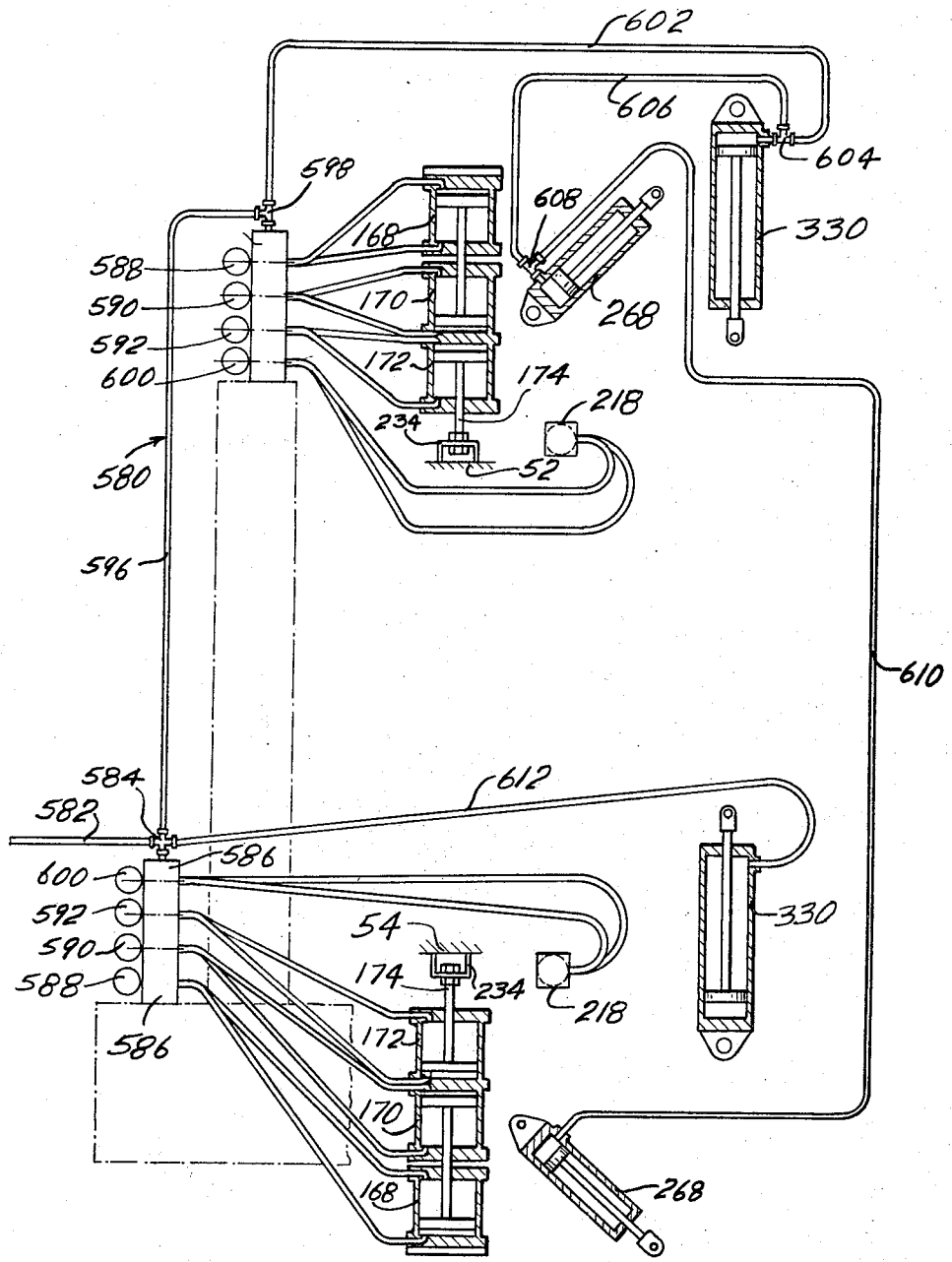
Figure 18:
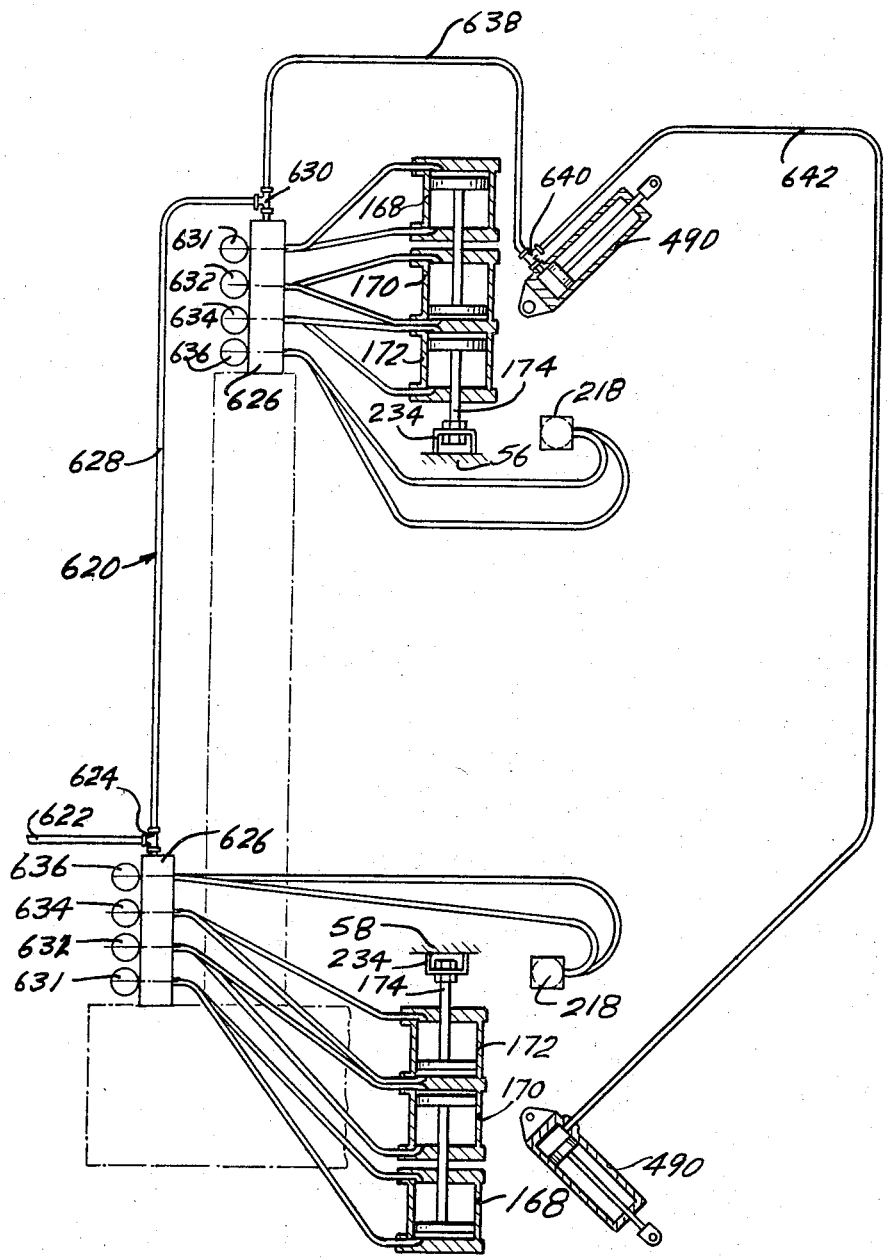
Figure 19:
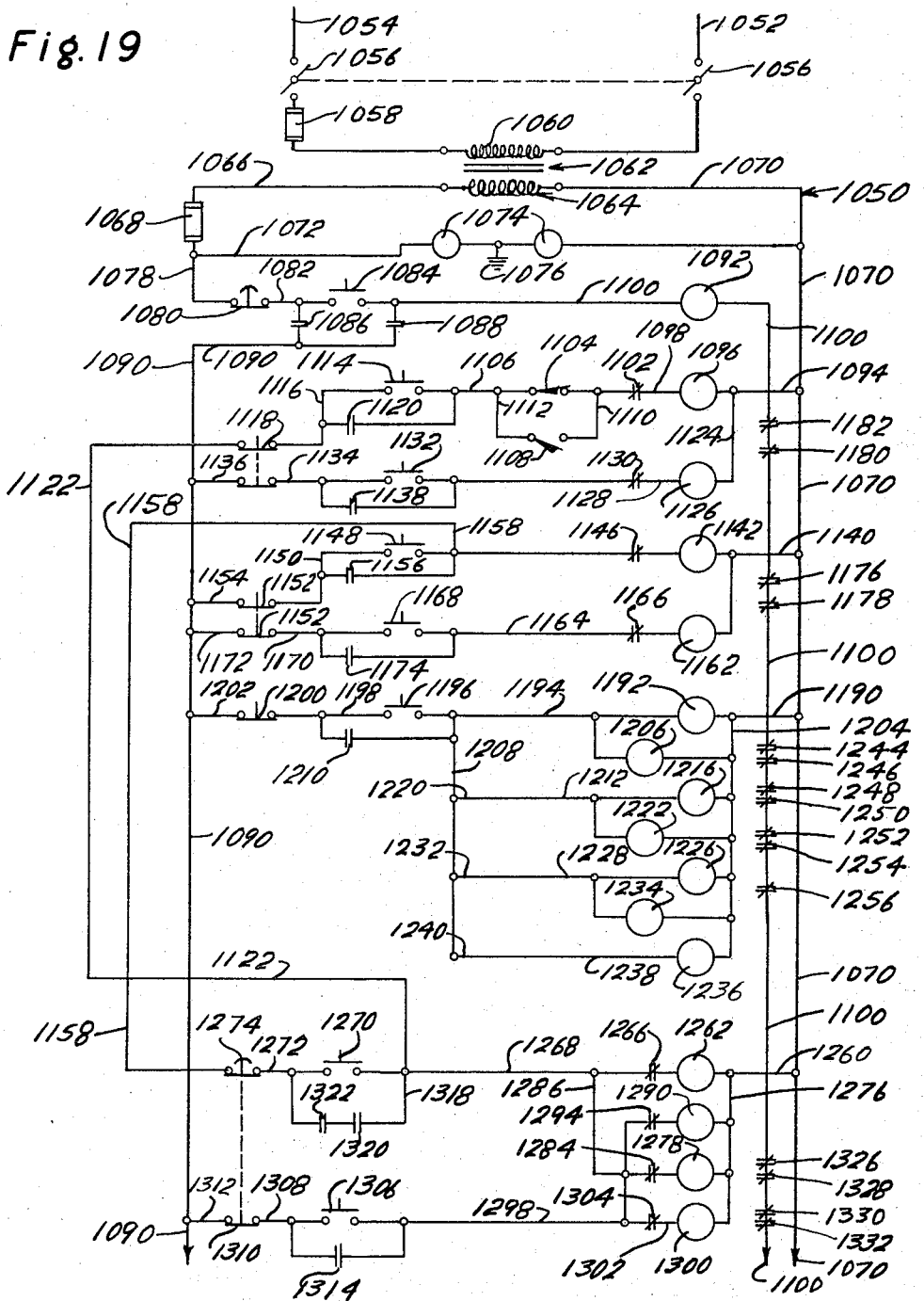
Figure 20:
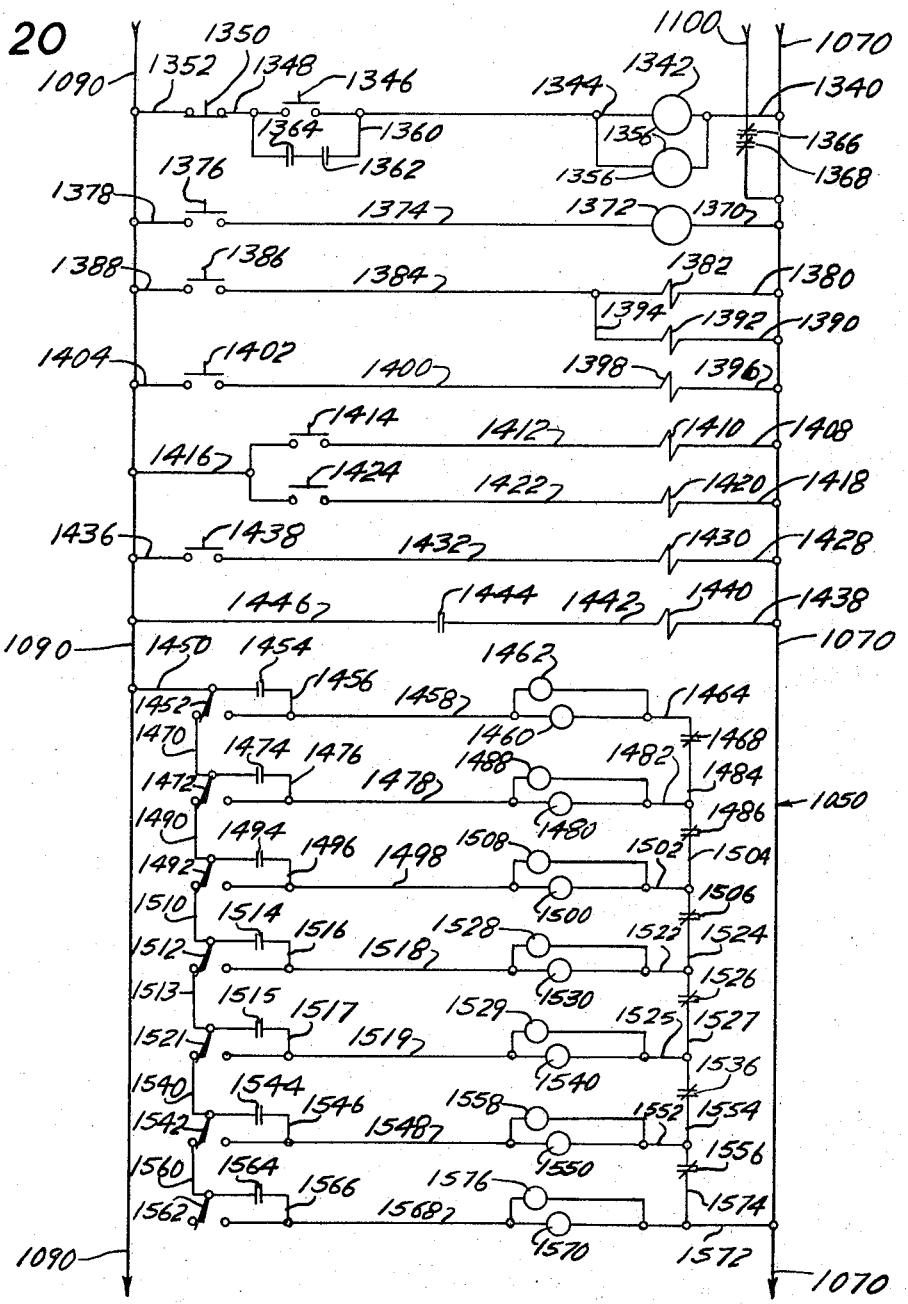
Figure 21:
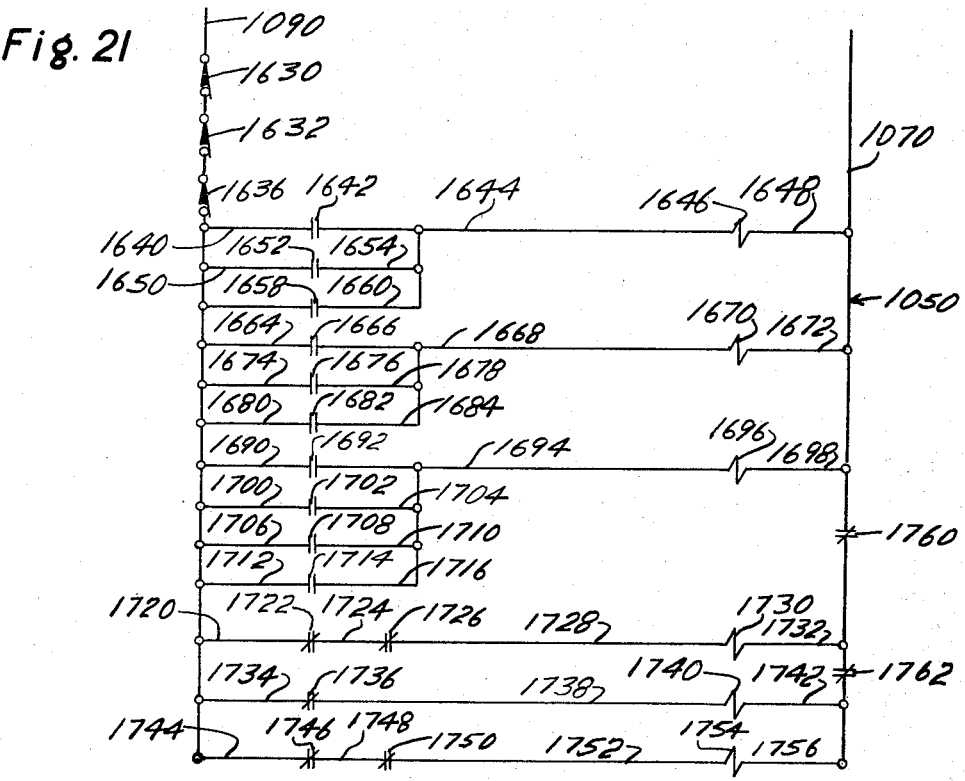
Figure 22:
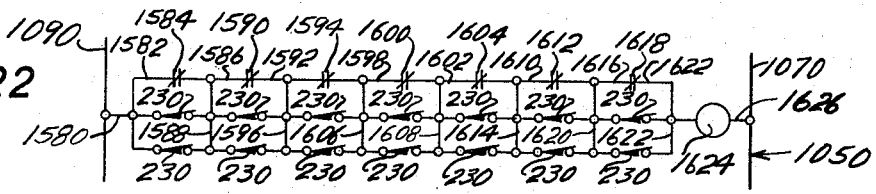
Figure 23:
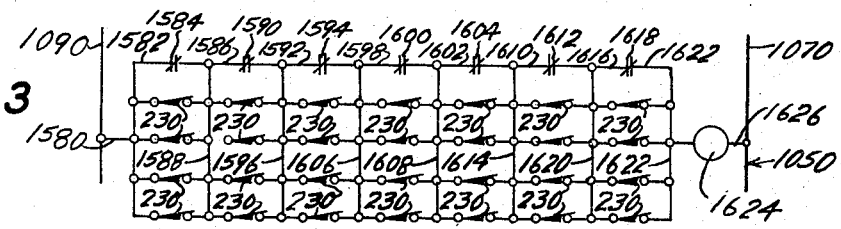
Figure 24:
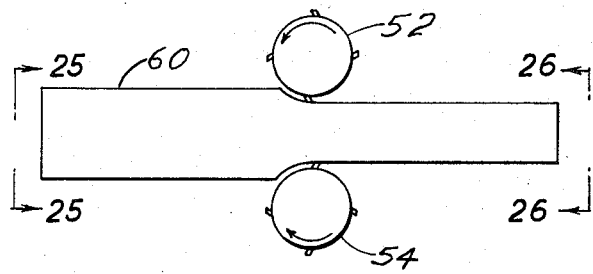
Figure 27:
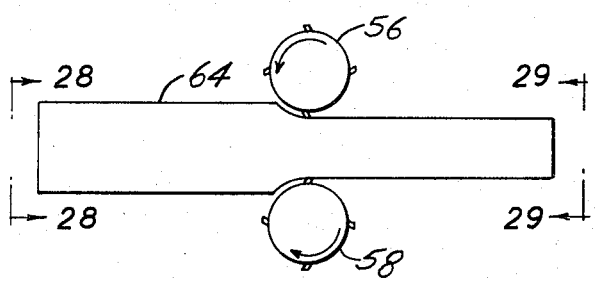
Figure 30:
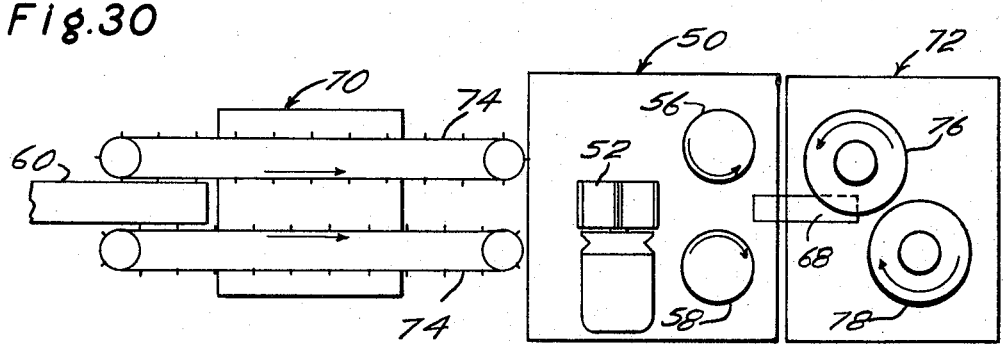
Figure 31:
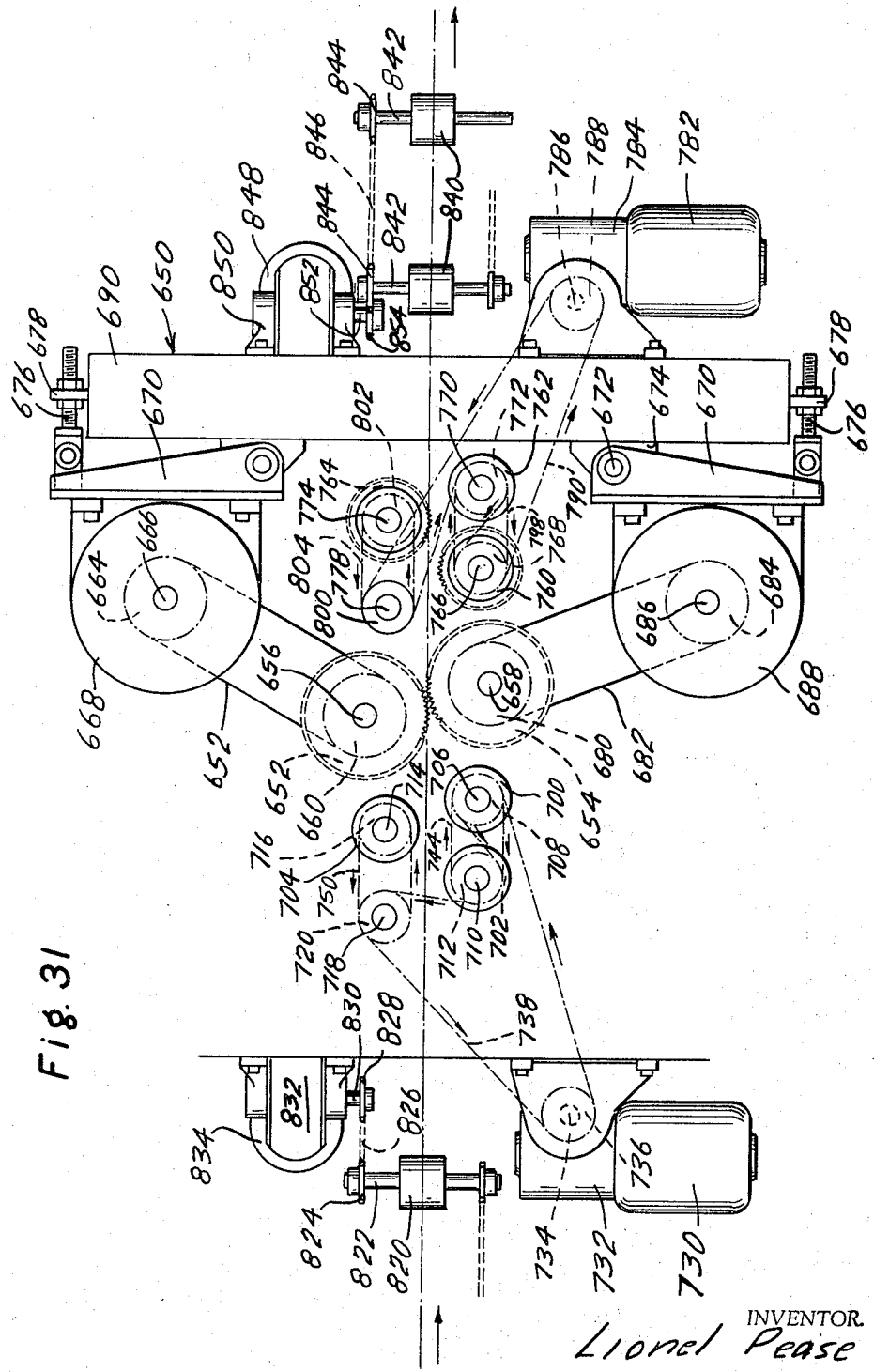
Figure 32:
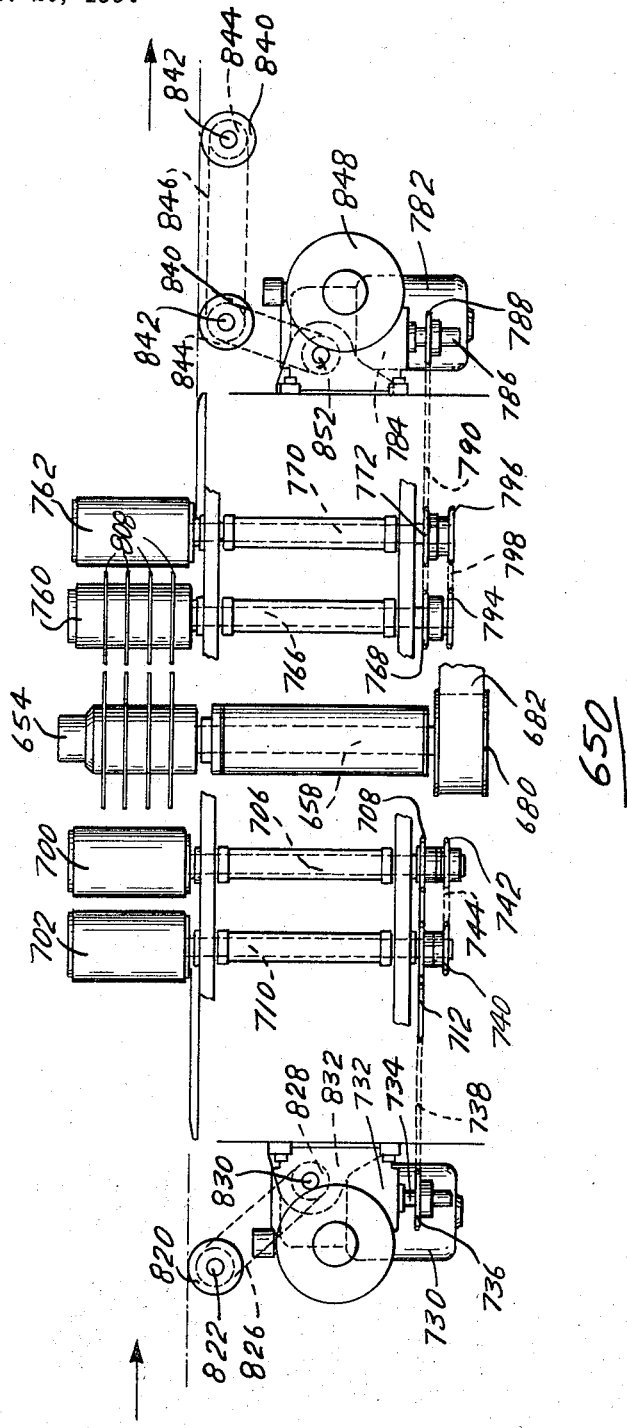
Figure 33:
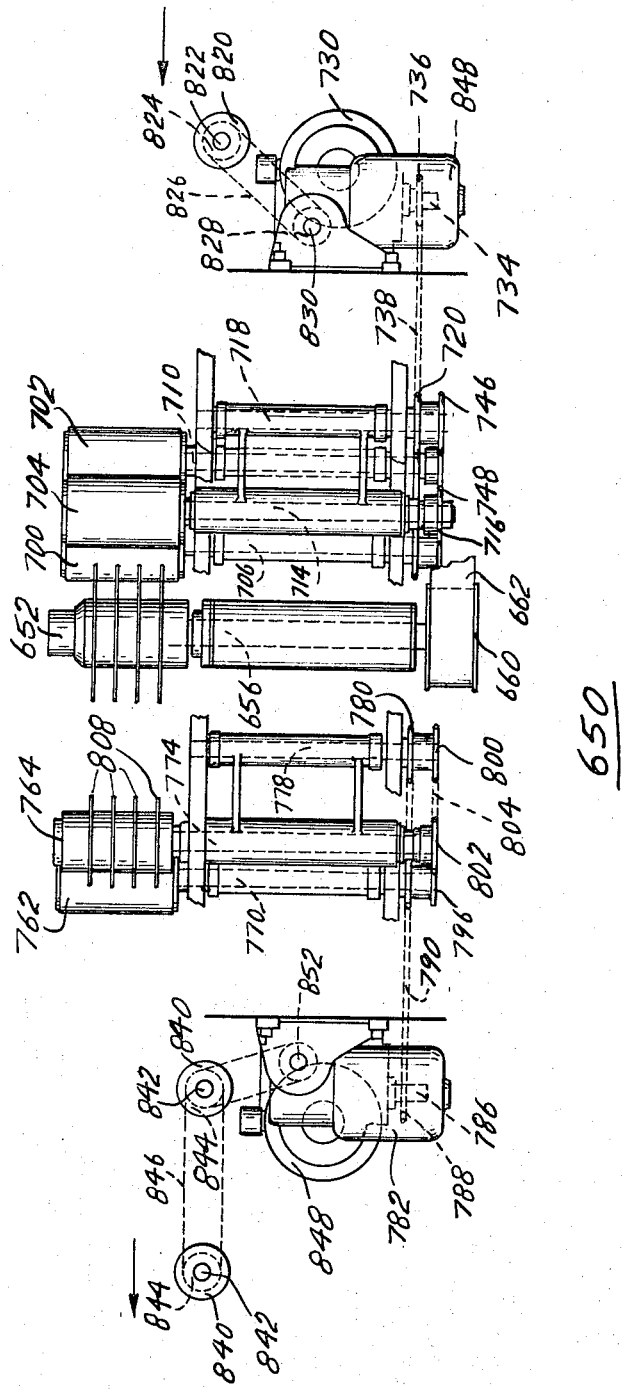
Figure 36:
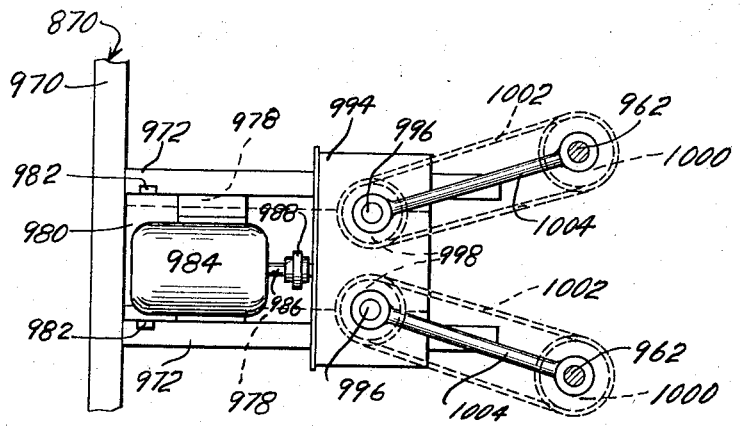
Figure 37:
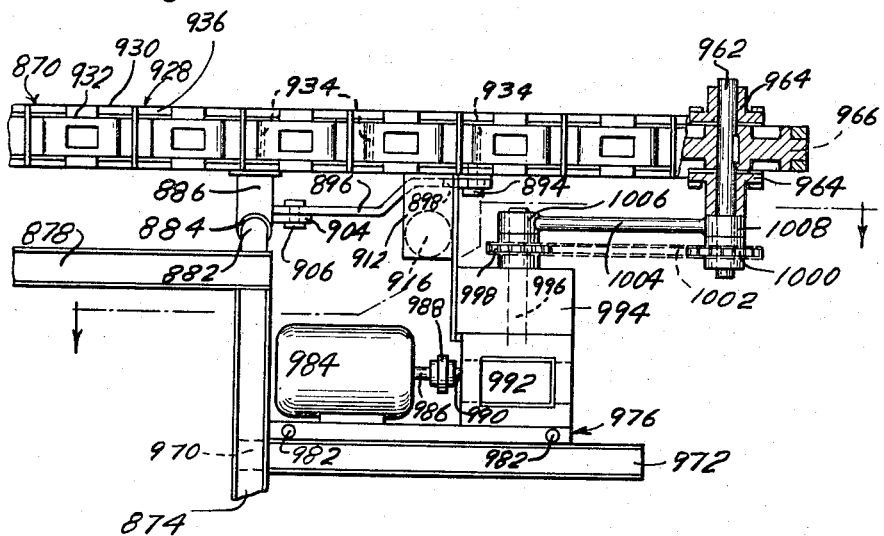

FIGURE 5, taken on line 5—5 of FIGURE 4, is a longitudinal cross-sectional view of the guide means for the two chippers, the two chippers and accompanying motor, and the fluid actuated cylinders for moving the two chippers on the guide means;

FIGURE 6, taken on line 6—6 of FIGURE 5, is an end view illustrating the guide means for the chippers, a chipper and an accompanying motor and a brake for locking the chipper in position;

FIGURE 7, on an enlarged scale, illustrates the brake for locking the chipper in position;

FIGURE 8 is a schematic side-elevational view illustrating the top and bottom chippers, the associated feed rolls and means for moving the chippers and the feed rolls;

FIGURE 9, taken on line 9—9 of FIGURE 8, illustrates the linkage for simultaneously moving the feed rolls and, also, means to assist in positioning the top chipper and the bottom chipper;

FIGURE 10, taken on line 10—10 of FIGURE 9, illustrates a connection with the forward feed roll and also a fluid actuated cylinder to assist in positioning the top chipper and the bottom chipper;

FIGURE 11, taken on line 11—11 of FIGURE 9, illustrates a connection between a fluid actuated cylinder to assist in positioning the top chipper and the bottom chipper;

FIGURE 12, taken on line 12—12 of FIGURE 10, illustrates connecting means between the linkage whereby the shaft is secured to one linking member but is free to rotate with respect to another linking member;

FIGURE 13 is a schematic plan view showing the side chippers and the associated feed rolls and the linkage for moving said feed rolls;

FIGURE 14, taken on line 14—14 of FIGURE 13, illustrates the connecting linkage between the forward feed roll and the rear feed roll associated with the side chippers;

FIGURE 15 is an illustration of the cantilever feed roll, sprockets and a chain between the sprockets for driving the cantilever feed roll;

FIGURE 16, taken on line 16—16 of FIGURE 15, is a cross-sectional view illustrating the cantilever feed roll and the means for driving said feed roll;

FIGURE 17 is a schematic illustration of the fluid-pressure system for moving the top and bottom chippers and the associated feed rolls;

FIGURE 18 is a schematic illustration of the fluid-pressure system for moving the side chippers and the associated feed roll;

FIGURE 19 is a partial wiring diagram of a feed table for advancing a log towards the chipper machine, a feed for advancing a cant from the chipper machine to a dimension machine, circuitry for running the chipper motors, and circuitry for controlling the feed rolls associated with the chippers;

FIGURE 20 is a continuation of the wiring diagram of FIGURE 19 and illustrates controls for the saws of the dimension machine, controls for the feed table, and circuitry for positioning the chippers;

FIGURE 21 is a continuation of the electrical circuitry of FIGURES 19 and 20 and illustrates the control means for the chippers and the final positioning of the chippers;

FIGURE 22 illustrates a switching means for a circuit in which only two of the four chippers move, either the top and bottom chippers move and the side chippers are stationary, or the side chippers move and the top and bottom chippers are stationary;

FIGURE 23 is a circuitry and shows a switch means when all four of the chippers are free to move;

FIGURE 24 is a schematic illustration of a log passing between the bottom chipper and the top chipper;

In FIGURE 25, taken on line 25—25 of FIGURE 24, illustrates a log before the log passes between the top chipper and the bottom chipper and shows by cross-hatching that portion of the log which will be removed by these two chippers;

FIGURE 26, taken on line 26-27 of FIGURE 24, illustrates a log after it has passed between the top chipper and the bottom chipper;

FIGURE 27 is a schematic illustration of the two side chippers acting on a semi-cant or a semi-log;

FIGURE 28, taken on line 28—28 of FIGURE 27, shows the semi-cant or semi-log after it has passed between the top chipper and the bottom chipper and before it passes between the two side chippers and illustrates by cross-hatching that portion which will be removed as wood chips;

FIGURE 29, taken on line 29—29 of FIGURE 27, shows a cant which is produced after the log has passed between the top chipper and the bottom chipper and the two side chippers;

FIGURE 30 is a schematic illustration of one embodiment showing the subject invention comprising the top chipper and the bottom chipper and the two side chippers, a feed table for feeding a log to the subject invention, and a dimension machine for processing the cant to make small dimensional lumber;

FIGURE 31 is a fragmentary view showing the essential components of the dimension machine such as the gang saws, the feed rolls, and means for driving the gang saws and the feed rolls;

FIGURE 32 is a schematic side-elevational view of the essential components of the dimension machine and shows the feed rolls and the gang saws such that the cant enters from the left and the small dimensional lumber leaves on the right;

FIGURE 33 is a schematic side-elevational view of the dimension machine and shows the saws and the feed rolls such that the cant enters on the right and the small dimensional lumber leaves on the left;

FIGURE 34 is a schematic plan view of the feed table and shows the two chains for advancing a log towards the chipper machine of the subject invention;

FIGURE 35 is a schematic side-elevational view of the feed table;

FIGURE 36 is a fragmentary plan view looking down on the drive means for driving the chains for advancing the log towards the chipper machine; and, FIGURE 37 is a fragmentary side-elevational view of the drive means for driving the chains for feeding a log to the chipper machine of the subject invention;

Before describing the invention specifically, the invention will be described generally. For this purpose see FIGURES 24-30. In FIGURE 30 there is schematically illustrated the subject invention: a top, bottom and side chipper apparatus 50. This apparatus 50 comprises a top chipper 52, a bottom chipper 54, a side chipper 56 and a side chipper 58.

The apparatus 50 converts a log into a cant. This conversion is schematically illustrated in FIGURES 24-29. In FIGURE 25 a log 60 is to be processed and the cross-hatched portions 62 are to be converted into chips. In FIGURE 24 it is seen that the log 60 is passed between the top chipper 52 and the bottom chipper 54 to make a slab 64 having wane edges 66.

In FIGURE 28 the slab 64 is illustrated with the wane coating, cross-hatched at 66, and which wane coating is to be removed upon the slab's being passed between side chippers 56 and 58. The output of the side chippers 56 and 58 is a cant 68.

The cant 68, it is to be realized, may be of various sizes. For example: this cant may be of four inches by four inches (4" x 4"), four inches by six inches (4" x 6"), six inches by six inches (6" x 6"), to illustrate a few of the sizes. Also, it is seen that the chippers 52, 54, 56 and 58 rotate with the direction of travel of the log at 60 and the slab 64.

In FIGURE 30 there is illustrated the apparatus 50 in conjunction with a feed table 70 for feeding the log 60 to the apparatus 50. Also, there is illustrated a dimension machine 72 for receiving the cant 68 from the apparatus 50.

The feed table 70 comprises two chains 74 which grip the log 60. These chains 74 advance the log 60 toward the top chipper 52 and the bottom chipper 54.

The dimension machine 72 comprises two spaced-apart saws 76 and 78. Actually, the saw 76 comprises a series of gang saws and saw 78 comprises a series of gang saws. The saw in 76 are aligned with the saws in 78 so as to saw completely through the cant 68. The gang saws 76 and 78 convert the cant 68 into small dimensional lumber such as two-by-fours (2" x 4") and the like.

In summary, a lug 60 may be fed by a feed table 70 to the apparatus 50 whereby the periphery of the log 60 is removed as wood chips to make a cant 68. The cant 68 is fed to the dimension machine 72 whereby this cant is sawed by gang saw 76 and gang saw 78 into small dimensional lumber such as two-by-fours (2" x 4").

Figure 1:
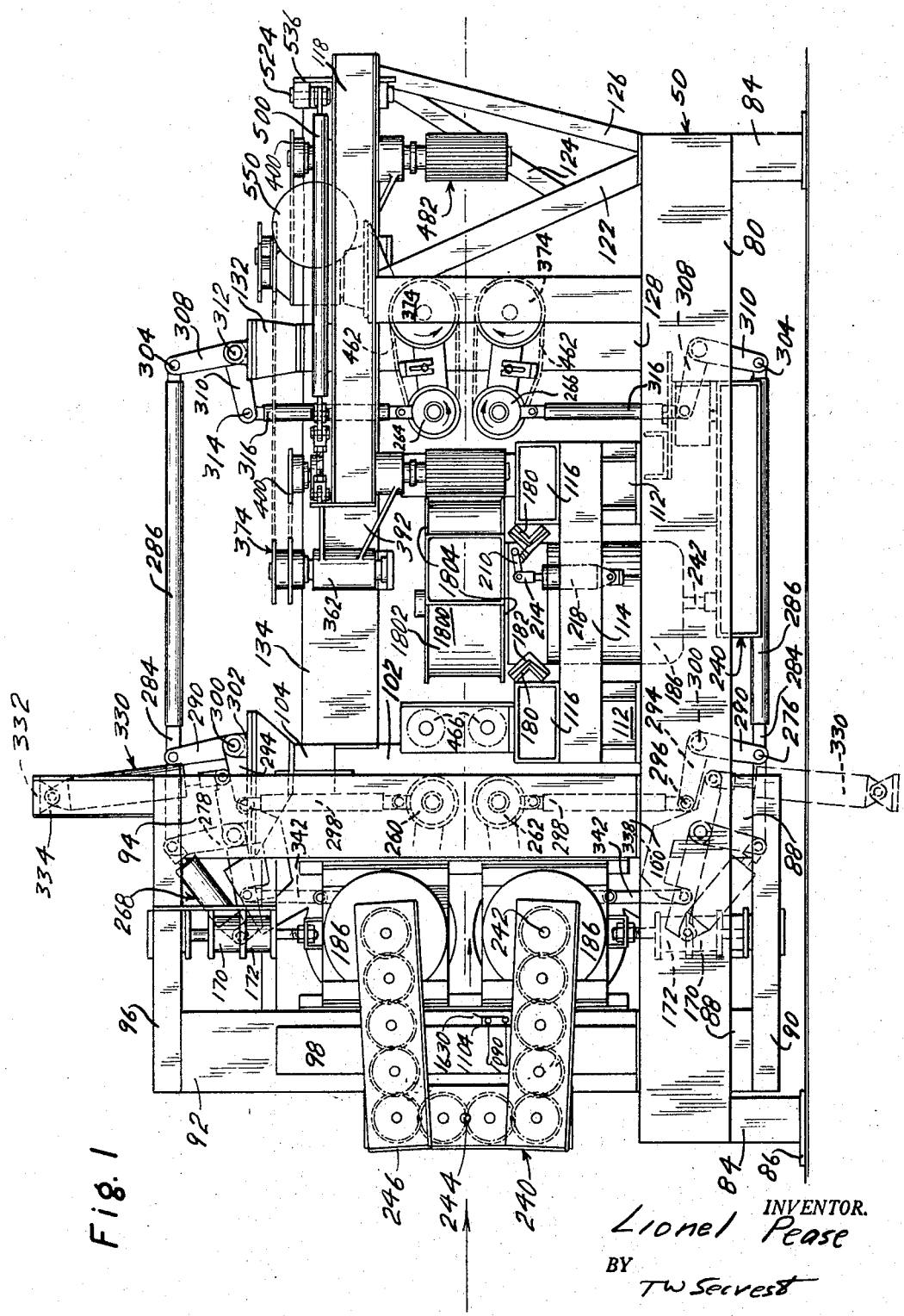
FIGURE 1 is a side-elevational view of a specific embodiment of the invention and illustrates the top chipper and the bottom chipper, and side chippers to receive the output of the top and bottom chippers.
Figure 2:
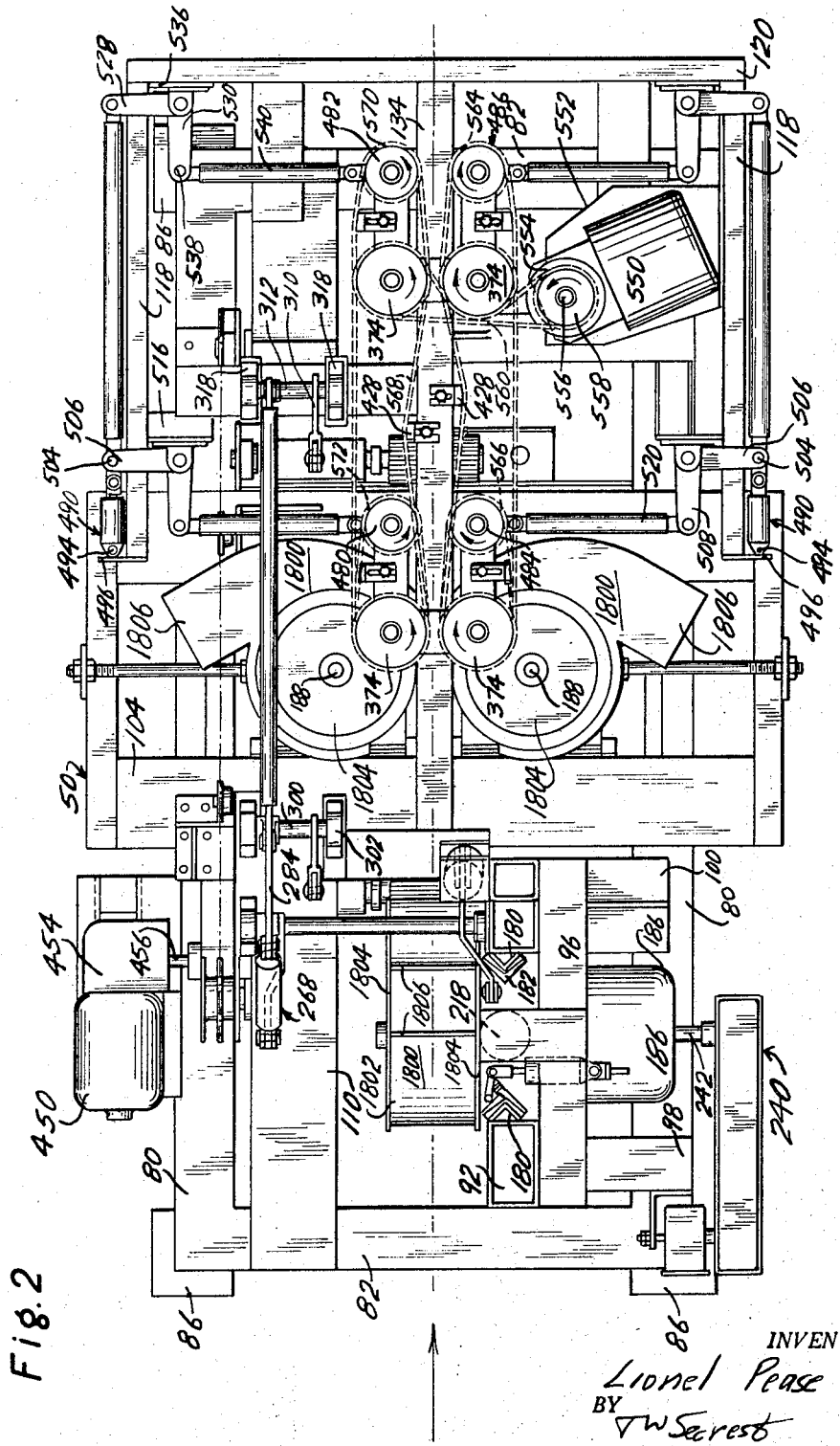
FIGURE 2 is a plan view of the invention looking down on the top chipper and the two side chippers.
Figure 3:
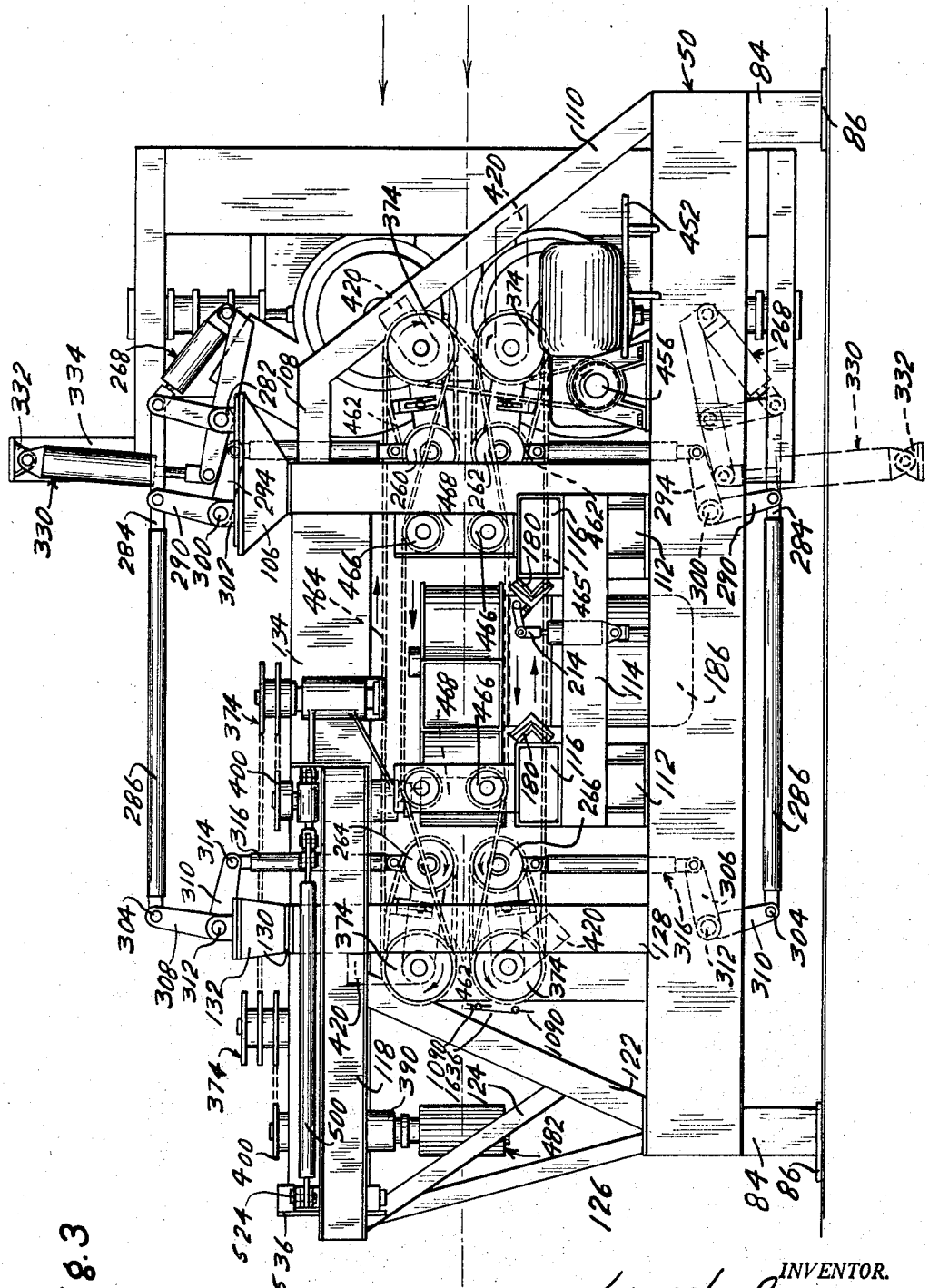
FIGURE 3 is a side-elevational view of the other side of the invention, as contrasted with FIGURE 1, and illustrates by arrows the direction of travel of the material.

A specific description of the invention, particularly the chipping machine, may be started with reference to FIGURES 1, 2 and 3. In these figures there is illustrated the chipping machine. This machine comprises a framework having basic longitudinal members 80 and end lateral members 82. At each corner there are legs 84. These legs rest on plates or shoes 86. Near the front or intake side of the chipping machine 50, there are two depending spaced-apart members 88, depending from the longitudinal member 80 and a longitudinal brace 90 connecting the two depending members 88. Also, near the front of the chipping machine 50 is an upright member 92 and spaced rearwardly of 92 is another upright member 94. The lower part of the upright member 92 connects with or is welded to the rear of the lateral member 82 while the upper side of the upright member 92 connects with a longitudinal brace 96. The upper part of the longitudinal brace 96 also connects with the side of the upright member 94. The longitudinal brace 80 and the upright brace 92 are also connected by means of a brace 98. Further, the lower part of the upright member 94 is connected with the longitudinal member 80 by means of a brace 100. On the longitudinal member 80, there is positioned an upright member 102. A lateral brace 104 connects the upper part of the upright member 94 and the upright member 102. On top of the lateral brace 104 there is a support member 106. A longitudinal forwardly directing brace 108 connects the front part of the lateral brace 104 with an angular brace 110. The lower part of the brace 110 connects with the lateral member 82. Approximately equidistant between the lateral members 82, and on each of the longitudinal members 80, are two spaced-apart steps 112. There are lateral members 116 which rest on the steps 112 and connect with the steps 112. Also, there are longitudinal members 114 which connect with the lateral members 116.

Positioned above the rear part of the chipping machine 50 is a superstructure frame. This superstructure frame comprises an outside longitudinal member 118, a rear lateral member 120 and another outside longitudinal member 118. The members 118 and 120 are supported on a longitudinal member 134. Further, a diagonal member 124 connects with the member 122 and the member 120. Further, a diagonal member 126 connects with the member 82 and the diagonal member 120.

Inside of the superstructure 118 and 120 is another supporting structure system. On the longitudinal members 80 there is an upright supporting member 128. Connecting the upper part of the upright supporting member 128 are lateral cross braces 130. Positioned on the lateral cross brace 130 is a stand 132.

A longitudinal center brace 134 connects the lateral brace 104 and the lateral brace 120.

The means for moving the chippers and for guiding the movement of the chippers is illustrated in FIGURES 4, 5, 6 and 7. Again, with reference to FIGURES 24–30, it is recalled that there is an upper chipper 52, a lower chipper 54 and two side chippers 56 and 58. The means for moving the upper chipper 52 and the lower chipper 54 with respect to each other and the means for moving the two side chippers 56 and 58 may be the same. Therefore, this means will be illustrated by FIGURES 4, 5, 6 and 7 and by one set of reference numerals.

The means for positioning and controlling the movement of either the upper chipper 52 and the lower chipper 54 or the two side chippers 56 and 58 comprises a guide-rail assembly 150. The guide-rail assembly 150 has two spaced-apart longitudinal guides 152 and 154. There are two end braces 156 and 158 connecting the ends of guides 152 and 154. On the outside of the end brace 156, and at approximately the middle thereof, there is welded a flange 160. Similarly, on the end brace 158, and at approximately the middle thereof, there is welded another flange 162. Spaced inwardly from the end cross brace 156 and also spaced inwardly from the end cross brace 158 are support braces 164. There are two of these support braces 164 and each support brace 164 connects with longitudinal guide 152 and longitudinal guide 154. A cylinder slide rail 166 runs between the end cross brace 156 and the support brace 164. Likewise, a cylinder slide rail 166 extends between the end cross brace 158 and the support brace 164.

Attached to the members 166 are three fluid actuated cylinders 168, 170 and 172. Similarly, attached to the member 162 are three fluid actuated cylinders 168, 170 and 172. Naturally, each of the cylinders has a plunger and means for supplying fluid under pressure to the cylinder to extend and retract the plunger. The cylinders 168 may have a plunger which will travel one-half (½″) inch. The cylinders 170 may have a plunger which will travel one (1″) inch. And, the cylinders 172 may have a plunger 174 which will travel two (2″) inches. It is seen that in this manner there is a wide variation in the travel of the final plunger 174 by varying the distance that the plungers in the cylinders 168, 170 and 172 will travel. The cylinders 170 and 172 slide on the slide rail 166. The cylinder 168 is secured to the member 160 or to the member 162.

On the inside of the longitudinal guide 152 there is a guide rail 180. Also, on the inside of the longitudinal guide 154 there is a guide rail 180. These guide rails 180 guide the movement of the chipper heads and the accompanying motors. In operating relation with the angle guide 180 is a second angle guide 182. Angle guide 182 is attached to a housing 184. The housing 184 houses the outer end of the motor 186. Projecting out of the housing 184 is a motor shaft 188 which connects with the chipper head 190.

Between the angle guide 180 and the angle guide 182 may be positioned rail bearing plates 192. The function of these plates is obvious. These plates absorb most of the sliding wear as the motor 186 and the chipper head 190 move along the angle guide 180. This is more particularly illustrated in FIGURE 6 and is a left support for the motor 186 and the chipper head 190. The angle guide 182 may be attached to the housing 184 by suitable means such as welding together these two members.

Again, in FIGURE 6 and, particularly, in FIGURE 7, there is illustrated a brake means on the right side of the motor housing 184. This brake means is actuated to lock the motor 186 and the chipper head 190 into position.

The brake means comprises what is the equivalent of an angle for mating with the angle guide 180 on the longitudinal guide 152. This angle has a base member 194 and an arm 196 substantially at right angles to the base member 194. A shoe plate 198 may be attached to the base member 194 by bolts or pins 200. Also, a shoe plate 202 may be attached to the member 196 by means of bolts and pins 204. The base member 194 is attached to an arm 206 by means of a pin 208 to a bell crank. The bell crank has an arm 210 in addition to the arm 206. The outer end or free end of the arm 206 is attached by means of pin 212 to a rod end clevis 214. Rod end clevis 214 is attached to plunger 216 of fluid actuated cylinder 218. The fluid actuated cylinder 218 is attached by means of pin 220 to a support bracket 222. This support bracket 222 is attached to the motor 186. The bell crank arms 206 and 210 connect with a shaft 226. The shaft 226 extends along the angle guide 180. At that end of the shaft 226, not attached to the cylinder 218, there is an arm 228. This arm 228 is like the arm 206. The arm 228 connects with a member 194. The member 194 in turn connects with a shoe guide 198 for clamping against the angle guide 180.

From FIGURE 7 it is seen that by extending the plunger 216, the bell crank arm 210 and the bell crank arm 206 are rotated clockwise. This draws the member 194 and the shoe guide 198 upward and toward the angle guide 180. There is created a locking grip between the shoe guide 198 and the angle guide 180 so that the motor 186 and the chipper head 190 are firmly locked in position.

The chipper head is illustrated as having four cutting teeth 231. This is seen in FIGURE 4 where the periphery of the motor is illustrated by 186 and the periphery of the chipper head is illustrated by 190. The chipper teeth 231 are illustrated as biting into a log or a piece of wood at substantially the same instant of time. The chipper head is not a part of this invention. One type of chipper head which may be satisfactorily employed is disclosed in the patent to E. M. Key, Patent No. 2,899,992, issuing date of Aug. 18, 1959. The motor 186 may revolve the chipper head 190 at a speed of rotation of 1800 r.p.m. or 3600 r.p.m. Of course, other satisfactory speeds of rotation may be employed, but these are the conventional speeds of rotation. It is necessary for the chipper head 190 to revolve at a sufficiently high speed to chip away the wood so as to present a smooth finished surface.

The chipper heads rotate in the same direction as the flow of wood, i.e., the chipper heads cut with the wood and not against the wood.

In regard to the fluid pressure lines for the fluid actuated cylinders 168, 170, 172 and 218, it is to be understood that there are fluid pressure lines for actuating these cylinders. These fluid pressure lines are not shown as they are old in the art.

In FIGURE 4 there are illustrated microswitches 230. On the housing 184 there is a finger 232. This finger 232 projects outwardly from the housing and may contact one of these microswitches 230 so as to open the circuit. It is to be understood that there is a series of microswitches 230 and a contact 232 for each chipper head 190. In all, there will be four sets of microswitches 230 and four contact or actuating fingers 232 when all four of the chippers are movable. Finally, attached to the housing 184 is a U-bracket 234. The plunger 174 may be attached to this U-bracket 234 by means of nuts 236. Naturally, the end of the plunger 174 is threaded in the bolts supplied so as to firmly position the plunger in the bracket.

A pantograph gear train 240 may connect the motors of the top chipper and the bottom chipper or the motors of the two side chippers. As these two pantograph gear trains are the same, like reference numerals will be used throughout for like components.

In FIGURES 1 and 2 it is seen that motor 186 of the top and bottom chippers has an output shaft 242. This output shaft 242 connects with the pantograph gear train 240. In FIGURE 1 it is seen that there are twelve gears in the pantograph gear train 240. It is possible for the spacing between the five gears in the bottom row and the five gears in the top row to be varied, the five gears in the bottom row may be at an angle with the five gears in the top row. This is accomplished by means of the two central gears which are so arranged as to revolve around the center gear or pinnion gear 244. Also, this is necessitated because with the movement of the two motors 186 towards each other and away from each other, it is necessary for the gear trains to move towards each other and away from each other. Further, there may be an appropriate housing 246 to house these gears.

These gears are so constructed that the chipper teeth 231 of the two opposed chipper heads, strike the log or wood simultaneously. Further, by having the pantograph gear train 240 it is possible to transfer power from one chipper head to another chipper head in case such a necessity arises. The motors 186 are normally sixty (60) horsepower motors. Therefore, it should not be necessary to transfer power from one motor to another motor, but the occasin may arise for such a transfer of power.

In certain instances, it may be satisfactory to let the motors run without the pantograph gear train 240 being connected to the output shaft of the motors 186. In such a situation the chipper teeth 231 may simultaneously strike the log or wood being chipped or the chipper teeth may not simultaneously strike the log or wood being chipped. At higher speeds of say 3600 revolutions per minute of the chipper 190, it may be possible to eliminate the pantograph gear train 240 and still realize a satisfactory output from the chipper head.

There are associated with the top chipper 52 and the bottom chipper 54 feed rolls to assist in moving the material through the apparatus. In FIGURES 1, 2, 3, 8, 9, 10, 11, 12, 13, 15 and 16 there is illustrated the linkage for moving the feed rolls in conjunction with the moving of the top chipper and the bottom chipper. FIGURE 8 is a schematic illustration of this linkage and presents the clearest overall view. FIGURES 1, 2 and 3 illustrate the linkage with reference to the support structure of the apparatus. FIGURES 9, 10, 11, 12, 15 and 16 illustrate specific details of this linkage. FIGURE 17 is closely associated with this linkage as it presents details of the fluid pressure system which is used to actuate the linkage.

In FIGURES 8 and 9 there is illustrated an upper and forward feed roll 260 associated with the upper chipper head 52 and a lower and forward feed roll 262 associated with the lower chipper head 54. Also, there is illustrated a rear and upper feed roll 264 and a lower and forward feed roll 266. The linkage for moving the feed rolls 260 and 264 is the same configuration as the linkage for moving the feed rolls 262 and 266. Therefore, the same reference numerals will be employed in the feed roll system 260 and 264 as for the feed roll system 262 and 266.

The primary source of power for moving the feed rolls 260 and 264 is a fluid actuated cylinder 268, see FIGURES 8 and 10. The base of the cylinder 268 is pinned at 270 to a first arm 272 of a bell crank 274. The plunger of the cylinder 268 is pinned at 276 to a second arm 278 of the bell crank 274. The arms 272 and 278 rotate about a rod 280. The end of the shaft 280 is journalled in bearing 282. The bearing 282, see FIGURE 3, is attached to the upper surface of member 106.

The plunger of the cylinder 268 and the pin 276 also connect with the forward projecting end 284 of the linkage rod 286.

Also, connecting with the forward projecting end 284 of the linkage rod 286, by means of a pin 288, is an arm 290 of a bell crank 292. A second arm 294 of this bell crank is pinned at 296 to an end of linkage rod 298. The lower end of the linkage rod 298 connects with feed roll 260.

The bell crank 292 rotates around a shaft 300. The shaft 300 is journalled on each end in bearings 302. These bearings 302 are on the upper surface of member 106.

The rear end of the linkage rod 286 is pinned at 304 to a bell crank 306 having a first arm 308 and a second arm 310. The arms 308 and 310 are rigidly fixed to a shaft 312. The arm 310 is pinned at 314 to a linkage rod 316. The linkage rod 316 connects with feed roll 264.

The shaft 312 is journalled in bearings 318. The bearings 318 are positioned on the upper surface of stand 132, see FIGURE 3.

In operation it is seen that, by extending the plunger of the cylinder 268, see FIGURES 8 and 10, the linkage rod 286 is moved rearwardly. As the arms 290 and 294 of the bell crank 292 are fixed to the shaft 300, this means that these arms rotate clockwise, see FIGURE 10, so as to move apart the feed rolls 260 and 262 to allow a wider gap between these feed rolls. Further, with the rearward movement of the linkage rod 286, the arms 308 and 310 of the bell crank 306 rotate in a clockwise direction around the shaft 312, see FIGURE 8. It is to be recalled that these arms 308 and 310 are fixedly secured to the shaft 312. This moves the linkage rod so that the two feed rolls 264 and 266 are moved away from each other to allow a wider gap or a greater distance between these two feed rolls.

Likewise, upon retracting the plunger of the cylinder 268, the linkage rod 286 is pulled forward and the arms 290 and 294 of the bell crank 292 rotate in a counterclockwise direction so as to move the linkage rod 298 and the feed rolls 260 and 262 toward each other to have a narrower gap or a less distance between these two feed rolls. And, with the forward movement of the linkage rod 286, the arms 308 and 310 of the bell crank 306 rotate in a counterclockwise direction so as to move the linkage rod 316 and the feed rolls 264 and 266 toward each other so as to have a narrower gap or a less distance between these two feed rolls.

In FIGURES 1, 3 and 8 there is illustrated a helping cylinder 330. The base of the helping cylinder associated with the upper feed roll 260 connects with the base member 332. This base member 332 is attached to an upright member 334. In FIGURE 1 it is seen that the upright member 334 is on the upper surface of the cross brace 96. The plunger of the cylinder 330 is connected by a pin 336 to a lever arm 338. The plunger and the lever arm 338 may rotate around the pin 336 with respect to each other. The lever arm 338 is connected by means of a pin 340 with a connecting bar 342. The lever arm 338 and the connecting bar 342 are free to rotate around pin 340 with respect to each other. The lever arm 338 is rigidly attached to a shaft 280 and rotates with the shaft. It is seen that the shaft 280 is positioned between the pin 336 and the pin 340. In FIGURE 8 it is seen that the connecting bar 342 is connected to the housing for the upper chipper associated with the upper feed roll 260 or connects with the housing for the lower chipper associated with the lower feed roll 262. With reference to FIGURE 4, it is seen that there is an ear or lug 346 projecting outwardly from each of the housings 184. The connecting bar 342 is attached to this ear or lug 346 by means of a pin 348.

The function of the helping cylinder is inherent in the terminology. The helping cylinder 330 helps to position the lower chipper and the upper chipper. The approximate weight of the chipper head, without the weight of the accompanying motor, is approximately 550 pounds. Even though there is provided a break means for positioning the chipper head and the motor, it is desirable to have an assisting means to more firmly position the lower chipper head and the upper chipper head. The helping cylinder performs this function.

The other end of the shaft 280 is journalled in bearing 350. The bearing 350 is connected to the upper part of member 94, see FIGURE 1.

With respect to the helping cylinder 330 associated with the lower feed roll 262, there is provided a base 352 on the longitudinal member 80, see FIGURE 3. The base of the cylinder 330 is attached to this base member 352 by means of a pin.

In FIGURE 12, taken on line 12—12 of FIGURE 10, there is illustrated the rigid or firm attachment of lever arm 272 and lever arm 278 of the bell crank 274 to the shaft 280.

Before proceeding with the description of the power means for driving the feed roll, the feed roll itself will be described. In FIGURE 16 there is illustrated a feed roll assembly 360. This feed roll assembly has a feed roll 260. It is to be made clear that the feed roll 260 is the equivalent of feed roll 262, 264 or 266. Also, the feed roll assembly 360 is the equivalent of feed roll assembly for the feed roll 262, the feed roll 264 or the feed roll 266.

The feed roll assembly 360 comprises a cylindrical casing 362 having ball bearings 364 at one end and ball bearings 366 at the other end for positioning the shaft 388. At the lower end there is a collar 370 between the ball bearings 366 and the plate 372 on the lower end of the shaft 388. On the upper end of the shaft 388 there is a sprocket 374 having three individual sprockets 376, 378 and 380. Between the upper end of the cylindrical casing 362 and the sprocket 374 there is a collar 382 and a plate 384. The sprocket 374 is free to rotate on the shaft 388. Between the sprocket 374 and the shaft 388 there is a needle bearing 386. Also, the shaft 388 is free to rotate inside of the casing 362. The casing 362 is connected to a cylindrical casing 390 by means of a gusset 392. In the casing 390 there is a shaft 394. The shaft 394 is positioned on the casing 390 by means of an upper ball bearing 396 and a lower ball bearing 398. On the upper end of the shaft 394 is a sprocket 400. The sprocket 400 is keyed to the shaft 394 by means of a key 402. A collar 404 is positioned between the sprocket 400 and the upper end of the casing 390. On the lower end of the shaft 394 there is positioned the feed roll 260. The feed roll 260 is keyed to the shaft 294 by means of key 408. Between the feed roll 260 and the lower end of the casing 390 or the ball bearing race 398, there is a collar 410.

It is seen that the sprocket 400 is not free to rotate on the shaft 394 and, likewise, the feed roll 260 is not free to rotate on the shaft 394.

The feed roll may be knurled or serrated to more firmly grip the wood or material being processed in the apparatus. On the casing 390 there is a lug 412. In FIGURE 8 it is seen that the linkage rod 298 connects with the feed roll 260 by a pin 414 in the lug 412. Likewise, it is seen that the linkage rod 316 connects by means of a pin 414 with a lug 412 on the feed roll casing 390 associated with the feed roll 264. Similar connections were made for the linkage rod 298 connecting with the casing of the feed roll 262 and the linkage rod 316 connecting with the base of the feed roll 266.

The casing 362 is attached to the framework of the apparatus by means of a bracket 420, see FIGURE 15. Also, see FIGURE 3, where it is seen that the casing 362 associated with the upper feed roll 360 is attached by bracket 420 to member 110. Likewise, the casing 362 associated with the lower feed roll 262 is attached by bracket 420 to member 110. The casing 362 of the upper feed roll 264 is attached by the bracket 420 to the upper member 118, and the casing 362 associated with the lower feed roll 266 is attached by a bracket 420 to member 128.

On the upper surface of the gusset 392 there is attached a stud bolt 422 having a threaded outer end. Positioned by this stud bolt 422 is a chain tightener having a flat plate 424 with a slot or clevis 426. The slot 426 fits with the stud bolt 422. On the outer end of the flat plate 424 there is a rounded head 428 which contacts a chain. The chain tightener is secured around stud bolt 422 by means of a nut 430. It is seen that it is possible to move the chain tightener so as to have the curvate head 428 contact the chain and tighten the chain running between one of the sprockets of sprocket 374 and the sprocket 400.

In FIGURES 2 and 3 there is illustrated the power means and chain arrangement for driving the feed rolls. The primary source of power is a motor 450. This motor 450 is secured to a stand 452. The stand 452 is secured to the longitudinal member 80 by support legs. The motor 450 connects with a mechanism 454 for driving a sprocket, which in turn, by means of chains, drives the feed rolls. The mechanism 454 may comprise a worm gear drive, a governor and brake or an inertial escape mechanism so as to drive the feed rolls at a constant velocity without acceleration. This provides a non-overrunning feed for the chippers so that the feed rolls will not be influenced by the pulling action of the chipping knives operating on a flitch or cant. As a result the flitch or cant is more uniformly processed by the chipper knives. The mechanism 454 has an output shaft 456, see FIGURE 2. In FIGURE 3 the mechanism 454 is not illustrated so as to more clearly illustrate the driving sprocket for driving the feed rolls. However, the shaft 456 is illustrated as leading into the driving sprocket.

In FIGURE 3 it is seen that the input shaft 456 connects with drive sprockets 458. A chain 460 goes around the drive sprocket 458 and around the sprocket 374 associated with the upper feed roll 260 and also, contacts a sprocket 374 associated with the lower feed roll 262 so as to rotate the sprocket 374 associated with the feed roll 264 in a clockwise direction and to rotate the sprocket 374 associated with the feed roll 266 in a counterclockwise direction.

In FIGURES 3 and 8 it is seen that the sprocket 374, by means of chain 462, drives sprocket 400 of the upper feed roll 260. Likewise, for the lower feed roll 262 the sprocket 374, by means of a chain 462, drives the sprocket 400 of the lower feed roll 262.

A chain 464 connects the sprocket 374 associated with the feed roll 260 with the sprocket 374 associated with the feed roll 264. The chain 464 runs over idler sprockets 466. It is seen that there are provided two spaced-apart uprights 468. On these uprights 468 there are the two spaced-apart idler sprockets 466. These idler sprockets may be adjusted in position so as to be used to tighten the chain 464. The chain 464, see FIGURE 3, runs around the sprockets 374 associated with the feed rolls 264 and 260 so as to drive the feed rolls 260 and 264 in a clockwise direction.

Similarly, a chain 465 connects the sprocket 374 associated with the feed roll 262 with the sprocket associated with the feed roll 266. The chain 465 runs over idler sprockets 466. The chain 465, see FIGURE 3, runs around the sprockets 374 associated with the feed rolls 262 and 266 so as to drive the feed rolls 262 and 266 in a counterclockwise direction. A chain 462 runs between the idler sprocket 374 and the idler sprocket 400 associated with the back feed roll 264 or the back feed roll 266, as appropriate. From the foregoing it is seen that the feed rolls are driven by means of chains and sprockets so as to rotate in a direction to assist in moving a log or lumber or material being worked through the apparatus.

There is associated with each of the side chippers 56 and 58, see FIGURES 2 and 13, a feed roll assembly comprising two feed rolls and appropriate linkage for moving the feed rolls toward each other and away from each other. There is a forward feed roll 480 associated with the side chipper 56 and a rear feed roll 482 associated with the side chipper 56. Further, there is a forward feed roll 484 associated with the side chipper 58 and a rear feed roll 486 associated with the side chipper 58. It is to be understood that the linkage connecting the feed rolls 480 and 482 is the same as the linkage connecting the feed rolls 484 and 486. Therefore, the same reference numerals will be used for the same components of the linkage in these two linkage systems.

The primary power source for moving either the feed rolls 480 and 482 or feed rolls 484 and 486 is a fluid actuated cylinder 490 having its base attached to a base member 492 by means of a pin 494. The base member, see FIGURE 2, is a lug 496 attached to the end of member 118. The plunger of fluid actuated cylinder 490 is pinned at 498 to the forward end of the linkage rod 500. There is attached to the forward projecting end of the linkage rod 500 a bell crank 502. This attachment is made by a pin 504 through the end of arm 506 of the bell crank. There is another arm 508. The arms 506 and 508 are rigidly connected to a shaft 510. In FIGURE 14 it is seen that this shaft 510 is journalled in bearings 514 on each end. The bearings 514 are securely positioned to a base 516. This base 516 connects with member 118. The arm 508 is pinned at 518 to a linkage rod 520. The linkage rod 520 in turn is pinned at 522 to lug 412 of the feed roll 480. The rear of the linkage rod 500 has a rearwardly projecting end which is pinned at 524 to a bell crank 526. The bell crank 526 has a lever arm 528 and another lever arm 530. The lever arms 528 and 530 are firmly attached to a shaft 532. The shaft 532 is journalled at each end in spaced-apart bearings 534. These bearings 534 are positioned on pad 536 which is attached to the rear member 120. The arm 530 is pinned at 538 to linkage rod 540. The lower end of the linkage rod 540 is pinned at 542 to the lug 412 of the rear feed roller 482. It is seen that by extending the plunger of the cylinder 490 that the linkage rod 500, see FIGURE 13, is moved in a backward or rearward direction. The arms of the bell crank 502, arms 506 and 508, are rotated in a clockwise direction so as to raise the linkage rod 520 and to move the feed roll 480 away from the feed roll 484. Likewise, the linkage rod 500, upon moving in a backward or rearward direction, rotataes the arms 528 and 530 of bell crank 526 in a clockwise direction so as to move the linkage rod 540 so as to move the feed roll 482 away from the feed roll 486. It is to be understood that, at the time the feed rolls 480 and 482 are being moved away from the feed roll 484 and 486, the feed rolls 484 and 486 are being moved away from the feed rolls 480 and 482.

By retracting the plunger of the fluid actuated cylinder 490, the linkage rod 500 is moved in a forward direction. This rotates the lever arms 506 and 508 so as to move the linkage rod 520 and the feed roll 480 towards the feed roll 484. Likewise, with the forward movement of the linkage rod 500, the lever arm 528 and the lever arm 530 are rotated in a counterclockwise direction to move the linkage rod 540 and to move the feed roll 482 towards the feed roll 486. It is to be clearly understood that, at the time the feed rolls 480 and 482 are moving towards the feed rolls 484 and 486, the feed rolls 484 and 486 are moving towards the feed rolls 480 and 482.

It is also to be clearly understood that the feed roll structure 360 is the same for all of the feed rolls, viz., 260, 262, 264, 266, 480, 482, 484 and 486.

From the foregoing it is seen that there is provided a feed roll which may be considered to be a cantilevered feed roll. There are two rotatable shafts 388 and 394. The shaft is in a fixed position. There is a housing which is free to rotate around the shaft 388. This housing encloses part of the shaft 394. On the free end of the shaft 394 there is a feed roll 260. This feed roll is offset from the shaft 388 and the housing for the shafts 388 and 394 so as to allow the feed roll to contact the log or the flitch or the cant without the housing interfering with the movement of the log or the flitch or the cant.

The feed rolls 480, 482, 484 and 486 are driven by means of chains and sprockets. In FIGURES 1 and 2 there is illustrated a motor 550 which is a primary source of power for driving these feed rolls. The motor 550 is supported on a base 552 which is secured to the apparatus and to members such as members 118 and other structure. The motor 550 connects with a mechanism 554. The mechanism 554 may comprise a worm gear drive, a governor and brake or an inertial escape mechanism so as to drive the output shaft 556 at a constant velocity without acceleration. This provides a non-overrunning feed for the chippers so that the feed rolls will not be influenced by the pulling and pushing action of the chipper knives against the slab or cant. As a result, there is realized a more uniform product from the log or slab.

The drive shaft 556 connects with the drive sprocket 558. The drive sprocket 558 drives a chain 560 which contacts sprocket 374 associated with the feed roll 486 and also drives sprocket 374 associated with the feed roll 482. In FIGURE 2 it is seen that the sprocket 374 associated with the feed roll 486 is driven in a clockwise direction and that the sprocket 374 associated with the feed roll 482 is driven in a counterclockwise direction.

The sprocket 374 associated with the feed roll 486 drives a chain 562 which in turn drives sprocket 374 associated with feed roll 484. It is seen that both of the drive sprockets 374 associated with the feed roll 486 and the feed roll 484 are driven in a clockwise direction. A chain tightener, similar to the chain tightener of FIGURE 15, and having a contact head 428, is positioned on member 134 so as to tighten the chain 562.

The feed roll 486 is driven by a chain 564 which goes around sprocket 400 and sprocket 374.

The feed roll 484 is driven by chain 566 which goes around sprocket 374 and sprocket 400.

The sprocket 374 associated with feed roll 482 drives a chain 568. The chain 568 goes around sprocket 374 associated with feed roll 480. A chain 570 goes around sprocket 374 and sprocket 400. A chain 572 goes around sprocket 374 and sprocket 480. The sprocket 374 associated with the feed roll 482 and the sprocket 374 associated with the feed roll 480 are driven in a counterclockwise direction as illustrated in FIGURE 2. Also, on the upper surface of member 134 there is a chain tightener similar to the chain tightener of FIGURE 15 having a contact head 428.

From the foregoing it is seen that the horizontal feed rolls 260, 262, 264 and 266 associated with the upper chipper 52 and the lower chipper 54 assist in maintaining a log or a slab or a cant in a vertical position, and that the vertical feed rolls 480, 482, 484 and 486 associated with the side chippers 56 and 58 maintain a horizontal position for a log or a slab or a cant undergoing chipping.

In FIGURE 17 there is a schematic illustration of the fluid pressure system 580 for supplying fluid under pressure to the cylinders for moving the upper chipper 52, the lower chipper 54, the cylinder 268 for moving the feed rolls 260, 262, 264 and 266, the helping cylinder 330 and the brake cylinder 218.

The system presently employed on this apparatus is a pneumatic system, but it is to be understood that a hydraulic system may be equally well employed. A pipe 582 connects with a source of fluid under pressure, said source not being illustrated. The pipe 582 connects with a manifold 584. The manifold 584 connects with a fluid pressure header 586. The fluid pressure header 586 is the same for both of the cylinders associated with the upper chipper 52 and the lower chipper 54. Therefore, the same reference numerals will be used for similar components. A solenoid controlled valve 588 controls the fluid under pressure leading to the cylinder 168, a solenoid controlled valve 590 controls fluid under pressure leading to cylinder 170, and a solenoid controlled valve 592 controls fluid under pressure leading to cylinder 172. As previously explained, the plunger 174 in the cylinder 172 connects by means of member 234 with either the lower chipper 54 or the upper chipper 52. The chipper is not shown, but the member 234 is shown.

From the manifold 584 there is a pipe 596 which leads to a T 598. The T 598 connects with the manifold 584 associated with the upper chipper 52.

Also, there is a solenoid controlled valve 600 which controls the fluid pressure to the cylinder 218 used for braking the chippers 52 and 54.

The T 598 by means of a pipe 602 connects with another T 604. The T 604 connects with the cylinder 330 which helps to position the upper chipper 52. Also, the T 604 by means of pipe 606 connects with a T 608. The T 608 connects both with the actuating cylinder 268 for moving the upper feed rolls 260 and 264; and, by means of pipe 610, connects with the actuating cylinder 268 for moving the lower feed rolls 262 and 266.

The manifold 584 by means of a pipe 610 connects with a fluid actuated cylinder 330 which helps to position the lower chipper 54.

All of the pipes and tubes used for connecting between the header 586 and the cylinders 168, 170, 172 and 218 have not been identified by reference numerals as such piping is conventional.

In FIGURE 18 there is a schematic illustration of the fluid pressure system 620 for positioning the side chippers 56 and 58 and the side feed rolls 480, 482, 484, and 486. A pipe 622 connects with the source of fluid pressure and connects with the T 624. The T 624 connects with the header 626 associated with the side chipper 58 and by means of pipes 628 connects with header 626 associated with the side chipper 56. The pipe 628 connects with the T 630 and which T in turn connects with the header 626. The headers connect with the cylinders 168, 170, and 172. A solenoid controlled valve 631 controls fluid pressure to cylinder 168; a solenoid controlled valve 632 controls fluid pressure to cylinder 170; and a solenoid controlled valve 634 controls fluid pressure to cylinder 172. A plunger 174 in cylinder 172 connects with 234. Member 234 in turn connects with an appropriate side chipper 58 or side chipper 56. The side chipper is not illustrated in the drawing as such but the member 234 is illustrated. Also, there is a solenoid controlled valve 636 which controls fluid pressure to the cylinder 218 for controlling the braking of the side chipper 56 and the side chipper 58.

The T 630 by means of pipes 638 connects with the T 640. The T 640 connects with the cylinder 490 which is used to control the movement of the side feed rolls 480 and 482; and the T 640 by means of pipe 642 connects with the cylinder 490 which is used to control the movement of the side feed rolls 484 and 486.

In this discussion of the fluid pressure system for controlling the movement of the side chippers 56 and 58, all of the piping has not been identified by reference numerals as such piping is conventional, i.e., to have two lines to the cylinder for moving the plunger and the piston in two directions.

The output of the top, bottom, side chipper apparatus 50 may be a cant having a surface between a rough surface and a finished surface. This cant may be used as is for industrial construction such as in concrete forms or this cant may be finished and used for a finished construction such as a house construction. Further, this cant may be cut into smaller cants and either used for concrete forms or in house construction. An example of this may be illustrated with a four-by-six (4″ x 6″) inch cant. This four-by-six (4″ x 6″) inch cant may be used as is for concrete forms or may be finished and used in house construction. Further, this four-by-six (4″ x 6″) inch cant may be sawed into three two-by-fours (2″ x 4″) which can be used for concrete forms and the like or, finished into two-by-fours (2″ x 4″) for house construction and the like. A machine for converting cants into smaller cants is illustrated in FIGURES 31, 32 and 33 and is called a dimension machine.

FIGURE 31 is a schematic plan view of such a dimension machine and at the left shows the infeed and at the right, the output. FIGURE 32 is an elevational view of the right side of the dimension machine and at the left shows the infeed and at the right, the output. FIGURE 33 is an elevational view of the left side of the machine and at the right shows the infeed and at the left, the output of the machine.

In FIGURE 31 it is seen that there is a dimension machine 650 having a first saw 652 and a second saw 654. These two saws are not aligned with each other. The saw 652 is mounted on a shaft 656 and the saw 654 is mounted on a shaft 658. At the lower part of the shaft 656 there is a pulley 660. This pulley 660 connects by means of a belt 662 with a pulley 664 on the bottom of a shaft 666. The shaft 666 is an output shaft of motor 668, approximately a fifty (50 HP) horsepower motor. The motor 668 is mounted on a base 670. The base 670 is pinned at 672 to a flange 674. Also, the base 670 is secured by means of a bolt 676 to a keeper 678.

Near the lower end of the shaft 658 there is a pulley 680. The pulley 680 is attached by means of a belt 682 to a pulley 684. The pulley 684 is attached to a shaft 686. The shaft 686 is an output shaft of motor 688. The motor 688 is attached to a base 670. The base 670 is pinned at 672 to a lug 674. The other end of the base 670 connects with the bolt 676 which passes through a keeper 678. It is seeen in FIGURE 31 that the lug 674 and the keeper 678 are on a lateral base support 690.

In FIGURE 31 it is seen that the saws 652 and 654 overlap so as to completely cut through a cant. Also, in FIGURES 32 and 33 it is seen that there are four saws on shaft 656 and four saws on shaft 658.

As previously stated, the motors 668 and 688 are approximately fifty (50 HP) horsepower motors.

There are three feed rolls for introducing a cant between the saws 654 and 652. These feed rolls are 700 and 702 associated with the saw 654. Feed roll 704 is associated with the saw 652. Feed roll 700 connects with the shaft 706 which in turn has a sprocket 708 on its lower end. Feed roll 702 is on shaft 710. On the lower end of shaft 710 there is a sprocket 712.

The feed roll 704 is mounted on a shaft 714. On the lower end of the shaft 714 there is a sprocket 716. Also, there is a vertical shaft 718 having on its lower end a sprocket 720. The feed roll 704 and the sprocket 720 are juxtapositioned with respect to the saws 652.

Mounted on the front of the machine is a motor 730 for driving the feed rolls. This motor connects with a mechanism 732. The mechanism 732 may comprise a worm gear drive, a governor and brake or an inertial escape mechanism so as to drive an output shaft 734 at a constant velocity without acceleration. This provides a non-overrunning feed for the saws 652 and 654 so that the feed rolls will not be influenced by the pulling action of the saws operating against the cant.

On the lower end of the output shaft 734 there is a sprocket 736. A chain 738 passes around the sprocket 736, around the sprocket 708, contacts sprocket 712 and around sprocket 720 so as to rotate the feed rolls 700 and 702 in a clockwise direction and to rotate feed roll 704 in a counterclockwise direction.

In FIGURE 32 it is seen that on the lower end of the shaft 710 there is another sprocket 740 and on the lower end of the shaft 706 there is another sprocket 742. A chain 744 runs around the two sprockets 740 and 742. This makes a positive drive for rotating the feed rolls 700 and 702. In FIGURE 33 it is seen that on the lower end of the shaft 718 there is another sprocket 746, and on the lower end of the shaft 714 there is another sprocket 716. A chain 750 runs around these two sprockets. In other words, the sprocket 746 is in driving relationship with the sprocket 716 and drives the feed roll 704.

In back of the saws 652 and 654 there are positioned three feed rolls. In back of the saws 652 and 654 are a splitter 760, a feed roll 762 and another splitter 764. The splitter 760 is mounted on the shaft 766. On the lower end of the shaft is a sprocket 768. The feed roll 762 is mounted on a shaft 770. On the lower end of this shaft 770 there is a sprocket 772. In FIGURE 31 it is seen that splitter 760 and the feed roll 762 are juxtapositioned with respect to saw 654.

The splitter 764 is mounted on a shaft 774. On the lower end of this shaft 774 there is a sprocket 802. Between the saw 652 and the splitter 764 there is a vertical shaft 778. On the lower end of this shaft 778 there is a sprocket 780.

On the lateral member 790 there is mounted a motor 782 having a mechanism 784. This mechanism 784 may comprise a worm gear drive, a governor and brake or an inertial escape mechanism so as to drive an output shaft 786 at a constant velocity without acceleration. This provides non-overrunning feed saws 652 and 654 so that the feed rollers will not be influenced by the pushing action of the saws operating on a cant. On the lower end of the output shaft 786 there is a sprocket 788. A chain 790 runs around the sprocket 768 on the shaft 766, runs around the sprocket 772 on the shaft 770, and runs around the sprocket 780 on the shaft 778.

On the lower end of the shaft 766 there is a sprocket 794 and on the lower end of the shaft 770 there is a sprocket 796. A chain 798 runs between the sprocket 794 and 796. It is seen that, due to the direction of travel of the chain 790 and the chain 798, the splitter 760 and the feed roll 762 rotate in a clockwise direction.

On the bottom of the shaft 778 there is a sprocket 800. On the bottom of the shaft 774 there is a sprocket 802. A chain 804 goes around the sprockets 800 and 802. It is seen that, with the direction of travel of the chain 790 and the chain 804, the splitter 764 rotates in a counterclockwise direction.

In FIGURES 32 and 33 the construction of the splitters 760 and 764 are illustrated. It is seen that there are provided four circular blades 808 on each of these splitters. These blades may be considered to be in the configuration of a torus and are mounted on the shaft 774. Also, it is seen that these blades are at substantially the same elevation as the four saws in the saws 654 and 652. Naturally, with the sawing of the cants into smaller cants, the space left by the saws is filled by the blades 808 so that the cant going through the gang saw is maintained at a uniform height so as to achieve a better cant.

There are other components of the dimension machine 650 such as the feed input roller 820 mounted on shaft 822. On the end of the shaft 822 is a sprocket 824 which connects by means of a chain 826 for the sprocket 828 on the end of an output shaft 830. Shaft 830 is an output shaft for gear box 832 which is driven by electric motor 834. The electric motor 834 is on the front of the dimension machine 650.

There is also a series of output rollers 840 mounted on shafts 842. These shafts 842 have a sprocket 844 and a chain drive 846. There is a motor 848 which drives a gear box 850. The gear box 850 has an output shaft 852. On the output shaft 852 is a sprocket 854 which is connected with the chain and is in driving relationship with the sprocket on shaft 842 for driving the rollers 840.

It is to be appreciated that FIGURES 31, 32 and 33 are schematics of a dimension machine for converting the cants into smaller cants. The details of construction are not included as the details may vary from machine to machine.

A log must be fed into the top, bottom and side chipper apparatus 50. It is possible but not practical to feed a small log by hand such as by workers holding the log and feeding it into the machine or the apparatus 50. However, since it is not practical, there must be some other way to feed the log into the apparatus 50. One appropriate machine is my "feed table," see my co-pending application, Ser. No. 339,504, filed Jan. 22, 1964.

In FIGURES 34, 35, 36 and 37 there is illustrated the major components of said "feed table" of said patent application, Ser. No. 339,504.

FIGURE 34 is a schematic plan view of a feed table 870, and FIGURE 35 is a schematic side-elevational view of the feed table 870. It is seen that the feed table 870 comprises a structure-support assembly 872 having four spaced-apart legs 874. Each pair of legs 874 is joined by an upper rail 876 and each pair of side legs 874 is joined by an upper rail or side-channel member 878. There are cross braces 880 connecting the legs 874 to the side-channel rails 878. Near the ends of the side-channel rails 878 and running on the upper parts of these rails are two cylindrical tubes 882. These tubes are positioned on a lateral axis with respect to the movement of the logs and may be welded onto the upper part of the rails 878. On the two spaced-apart tubular members 882 there is positioned a sliding tie-down member having a cylindrical member 884 which fits over the tubular members 882. On the upper part of the cylindrical member 884 there is an upright support 886. There are two spaced-apart sliding tie-down members on each cylindrical rod or tubular member 882. In all, there are four sliding tie-down members in the feed table 870.

The aligned upright supports 886 and the two spaced-apart cylindrical rods or tubes 882 support a carrier chain support-structure assembly 888. It is seen that there are two such assemblies 888. These two assemblies 888 are in an opposed relationship and will be more thoroughly explained. The assembly 888 comprises two longitudinal U-channel members 890 having their legs inwardly directed. The U-channel members 890 are tied together at their ends with end braces 892. In the lower leg of each U-channel member 890 and near the end thereof, there is positioned a bolt or a stub shaft 894. An arm 896 of a sector gear connects with the bolt 894. This arm 896, near the end and juxtapositioned with respect to the bolt 894, has an elongated slot or opening 898. The arm 896 has a bend which allows it to bend away from the U-channel member 890. The arm 896 expands into an enlarged head 900 having gear teeth 902. The sector gear 898 attaches to a mounting plate 904. The mounting plate 904 is at a central portion of the cylindrical tubular member 882 and directed outwardly therefrom. The mounting plate 904 may be welded so as to be substantially flush with the upper surface of the cylindrical tubular member 882. The sector gear 898 and the mounting plate 904 united by a pin or a bolt or a rivet 906. It is seen that on each mounting plate 904 there are two sector gears 898 with their teeth 902 meshing. In all, with the carrier chain support-structure assemblies 888 there are associated two sets of sector gears. The purpose of these sector gears is to assist in the positive movement and alignment of the carrier chain structure-support assemblies 888 upon moving toward and away from each other so as to maintain each carrier chain equidistant from the center line of the machine regardless of the opening between the carrier chains.

There are means for moving the two carrier chain support-structure assemblies 888 with respect to each other. It is seen that the two U-channel members 890 of the carrier chain support-structure assemblies 888 are joined near their ends by a support plate 910. Depending from the support plate 910 is a support member 912. On the lower end of the support member 912 and directed inwardly therefrom is a tie plate. It is seen that the two support members 912 and the two tie plates are aligned. A fluid actuated cylinder 916 connects with the two tie plates. More particularly, on one end of the fluid actuated cylinder 916 there is a tie member 918. A bolt or stub shaft 920 connects with the tie member or support member 912, and also connects with the tie member 918. Projecting out of the fluid actuated cylinder 916 is a plunger 922. This plunger 922 connects with a bolt or stub shaft on the other tie plate or support member 912. The fluid actuated cylinder has two pressure lines not shown. It is to be understood that the fluid actuated cylinder has a fluid pressure line for extending the plunger 922 and a fluid pressure line for retracting the plunger 922. The fluid actuated cylinder may be a hydraulic cylinder or may be a pneumatic cylinder. A source of pressure may be from a storage tank 924 secured to side-channel rails 878 by depending straps 926. Of course, as is readily appreciated, the extension of the plunger 922 will separate the two assemblies 888 and the retraction of the plunger 922 will bring toward each other the two assemblies 888.

The carrier chain support-structure assembly 888 carries a chain 928. This chain 928 has major links 930 and minor links 932. The major links 930 have pivot pins 934 connected by side bars 936. On the side bars 936 there are positioned, such as by welding, carrier plates 940. It is seen that these carrier plates 940 are recessed at 942 for gripping a log.

On the intake end, see FIGURE 35, of the feed table 870, there is welded to the I-beam 890 and the end braces 892 an upper end plate and a lower end plate 946. In each of these end plates 946 there is a slot 948 for receiving a shaft 950. On this shaft 950 there is mounted a sprocket 952. This shaft is journalled in an upper bearing 954 and a lower bearing 954. The two bearings 954 connect with a screw rod or a threaded rod 956. The rods 956 extend through a tapped keeper 958, and which keeper is attached to the end plate 946. It is seen that by twisting and turning the rods 956, it is possible to move the upper and lower bearings 954 so as to tension the chain 928. On the right or discharge end of the carrier chain support-structure assemblies 888 there is positioned a second upper end plate and a second lower end plate 960. The end plates 960 are welded to the I-beams or channels 890. Again, there is a shaft 962 mounted in an upper bearing 964 and a lower bearing 964. Also, there is a sprocket 966 mounted on the shaft 962. The shaft 962 extends below the lower bearing 964. The end plate 960 does not have means for moving the bearings 964 and the shaft 962 so as to vary the tension on the chain 928.

The power means for moving the carrier chains 928 is illustrated in FIGURES 36 and 37. There is a lower end cross brace 970 connecting the legs 874 of the support table 872. Attached to the lower brace 970 are two outwardly directed U-channels 972. These U-channels 972 are in a spaced-apart relation, see FIGURE 36. The two U-channels 972 project outwardly from the discharge end of the feed table 870 and under the assemblies 888. There is a frame 976 comprising two spaced-apart base members 978 connected by a transverse plate 980. Also, near each outer end of the base members 978 there are rollers 982. These rollers permit the frame 976 to roll back-and-forth on the U-channels 972. On the transverse plate 980 there is positioned a motor 984. The output shaft 986 of the motor 984 connects by means of a gear coupling unit 988 with an input shaft 990 of a speed reducer 992. The speed reducer 992 may incorporate a worm gear drive or a governor and a brake or an inertial escape mechanism so as to drive the chain 928 and the carrier plates 942 at a constant velocity without acceleration, viz., a non-overrunning feed. This speed reducer 992 connects with a change box assembly 994. In FIGURE 37 it is seen that the change box assembly 994 is positioned directly above the speed reducer 992. The change box assembly has two output shafts 996. The output shafts 996 rotate in opposite directions to drive the two carrier chains 928 in opposite rotational directions. Positioned on each end of the output shafts 996 is an output sprocket 998. On the lower end of the shaft 962 there is positioned an input sprocket 1000. A chain 1002 runs between output sprocket 998 and the input sprocket 1000. It is seen that the sprocket 966, which sprocket drives the carrier chain 928, is driven by the input sprocket 1000, chain 1002 and output sprocket 998 through the shaft 962. Also, there is a connector arm 1004 between the output shaft 996 and the input shaft 962. This connector arm 1004 has a bearing member 1006 associated with the output shaft 996 and a bearing member 1008 associated with the shaft 962. This connector arm 1004 maintains a constant distance between the output shaft 996 and the input shaft 962 so that the chain 1002 can be in a positive driving relationship with the input sprocket 1000. The operation of the power means is readily seen. Upon the separation of the two carrier chain support-structure assemblies 888, the platform 980 is pulled outwardly and away from the support table 872. Upon the inward movement of the carrier chain support-structure assemblies 888, the platform 980 is moved inwardly toward the support table 872. Also, if one of the support assemblies 888 moves away from the other support assembly 888, the connector arm 1004 would rotate around the two shafts 996 and 962 so as to maintain a constant distance between these two shafts.

In FIGURE 35 it is seen that there are three lateral braces 1010 on the underneath side of the longitudinal braces 878 of the support structure 872. Positioned on these three lateral braces are lifting pads 1012. Actually there are three of these lifting pads and each of the pads comprises a fluid actuated cylinder 1014 having a plunger 1016 and a circular plate 1018 positioned on the top of the plunger 1016. These lifting pads 1012 are positioned between the two carrier chain support-structure assemblies 888. Although it is not shown in the drawings, it is to be appreciated that there are two fluid pressure lines running between each of the cylinders 1014 and the receiver of the fluid pressure tank 924. These are double acting fluid actuated cylinders for both retracting and extending the plunger 1016. It is to be understood that the fluid actuated cylinders 1014 may be hydraulic cylinders or pneumatic cylinders. These lifting pads 1012 make it possible to more completely position a log between the two carrier chain support-structure assemblies 888. Assume that the log has a curve or a bend in it. To be better able to feed the log to the top, bottom and side chipper apparatus 888, it may be desirable to elevate one or all of the lifting pads 1012 or to elevate only some of these lifting pads. Then, after the log has been desirably positioned between the two carrier chain support-structure assemblies 888, the assemblies may be moved toward each other so as to firmly grip the log between the carrier plates 940 and in the recesses 942 of these carrier plates. Then, the carrier chains and the log may be advanced toward the top, bottom and side chipper apparatus 888 to remove the wood as chips and to produce a cant. Then, the cant may be used as is, as previously explained, or the cant may be processed in the dimension machine to make smaller cants.

In FIGURES 19, 20, 21, 22 and 23 there is illustrated a wiring diagram for the top, bottom and side chipper apparatus 50, the dimension machine 650 and the feed table 870 in combination. This wiring diagram is referred to by reference numeral 1050.

FIGURES 19, 20, 22, and 21, in that order, may be considered to be one electrical control unit. In this particular electrical system, one set of chippers is fixedly positioned and the other set of chippers is free to move. For example, the top chipper 52 and the bottom chipper 54 may be fixedly positioned so as to pass through a four-inch slab of lumber, while the side chippers 56 and 58 may be movable so as to reduce the slab of lumber to a thickness of two inches, three inches, four inches or a larger size. Conversely, the top chipper 52 and the bottom chipper 54 may be free to move so as to pass through a two-inch slab of lumber, a three-inch slab of lumber, a four-inch slab of lumber or a larger slab of lumber while the side chippers 56 and 58 are fixedly positioned so as to reduce the width of this lumber to say two inches, three inches, four inches or larger.

The wiring diagram composed of FIGURES 19, 20, 23 and 21, in that order, may be considered to be an actual wiring diagram whereby the top chipper 52 and the bottom chipper 54 are free to move while the side chippers 56 and 58 are fixedly positioned so as to pass only a four-inch width of lumber between them. To further illustrate, if the top chipper 52 and the bottom chipper 54 are spaced so as to pass only the two-inch slab of lumber, then the side chippers 56 and 58 chip this two-inch slab of lumber so as to make a two-by-four (2″ x 4″). To still further illustrate, if the top chipper 52 and the bottom chipper 54 are spaced so as to pass a six-inch slab of lumber, then the side chippers 56 and 58 chip away the slab of lumber so as to pass a six inch by four inch (6″ x 4″) cant. From these examples it is readily seen that various sized cants may be passed through the apparatus 50 with the electrical system of FIGURES 19, 20, 22 and 21.

In FIGURES 19, 20, 23 and 21 there is illustrated an electrical system where both the top chipper 52 and the bottom chipper 54 may be moved and the side chippers 56 and 58 may be moved. With this electrical system it is possible, by means of apparatus 50, to have a cant prepared having dimensions two inches by four inches (2″ x 4″), two inches by eight inches (2″ x 8″) or eight inches by eight inches (8″ x 8″) depending upon the size of the original log fed into the apparatus 50 and the useful material which may be realized from said log.

In FIGURE 19 there is illustrated a lead-in to the electrical system 1050 having lead-in wires 1052 and 1054. These lead-in wires 1052 and 1054 go through a gang switch 1056. In the line there is a fuse 1058. The lines 1052 and 1054 connect with the primary 1060 of transformer 1062. Transformer 1062 has a secondary 1064. The secondary 1064 of the transformer connects with the lead 1066 having a fuse 1068 with a lead 1070. The voltage across the lines 1066 and 1070 may be 120 volts. The fuse 1068 connects with a line 1072 which in turn connects with the line 1070. In the line 1072 there are two indicator lights 1074. These indicator lights are grounded at 1076. The fuse 1068 connects with a line 1078. In the line 1078 there is a master stop switch 1080 which in turn connects with a line 1082. The line 1082 connects with a reset switch 1084. The line 1082 connects with normally open relay contacts 1086. The normally open relay contacts 1086 connect with line 1090. The switch 1084 connects with line 1100. The line 1100 connects with normally open relay contacts 1088 which in turn connect with line 1090. In the line 1100 there is a relay coil 1092. The relay coil 1092 controls the relay contacts 1086 and 1088. As is seen in FIGURE 19, the relay contacts 1086 and 1088 are normally open.

A portion of the electrical circuit for the feed table 870 will be presently described. A line 1094 connects with the main line 1070. The line 1094 has a forward relay coil 1096. The forward relay coil 1096 connects with a line 1098. In the line 1098 are normally closed contacts 1102. The line 1098 connects with an infeed-log-limit switch 1104. The switch 1104 connects with a line 1106. A switch 1108 is in parallel with the switch 1104 and connects with lines 1110 and 1112. These lines 1110 and 1112 connect with lines 1098 and 1106. The line 1106 connects with the forward switch 1114. The forward switch 1114 in turn connects with the line 1116 which connects with a gang stop switch 1118. Also, normally open contacts 1120 connect with the line 1106 and with the line 1116 so as to be in parallel with the switch 1114. The normally open contacts 1120 are under the control of the relay coil 1096. The gang stop switch 1118 connects with the line 1122. A line 1124 connects with a line 1094 and with a relay coil 1126. The relay coil 1126 connects with a line 1128. In the line 1128 there are normally closed contacts 1130. The normally closed contacts 1130 are under the control of relay coil 1096. The normally closed contacts 1102 in the line 1098 are under the control of the reverse relay coil 1126. The line 1128 connects with a reverse switch 1132 which in turn connects with a line 1134. In the line 1134 there is a gang stop switch 1118. The gang stop switch 1118 which connects with the line 1116 also connects with the line 1136 which connects with the power line 1090. In parallel with the switch 1132 is a pair of normally open contacts 1138. These contacts connect with the line 1134 and the line 1128. The normally open contacts 1138 are under the control of the reverse relay coil 1126.

The forward relay coil 1096 and the reverse relay 1126 also control the motor 984 of the feed table 870. More particularly, with the forward relay coil 1096 actuated, the motor 984 drives the carrier plates 942 in a forward direction or toward the apparatus 50 so as to advance a log toward the apparatus 50. Conversely, with the relay coil 1126 actuated, the motor 984 drives the carrier plates 940 in a reverse direction or in a direction away from the apparatus 50. One of the reasons for this is that an operator may decide that the log should be better positioned between the carrier chain support-structure assemblies 888 before the log is advanced toward the apparatus 50.

A portion of the machine feed for the dimension machine 650 will be presently described. In FIGURE 19 it is seen that a lead 1140 connects with a power line 1070. In the lead 1140 there is a forward relay coil 1142. The forward relay coil 1142 connects with a line 1144. In the line 1144 there are normally closed relay contacts 1146. The line 1144 connects with a forward switch 1148. The forward switch 1148 connects with a line 1150. In the line 1150 there is a gang switch 1152. The gang switch 1152, by means of lead 1154, connects with power line 1090. In parallel with the forward switch 1148 is normally open relay contacts 1156. The normally open relay contacts 1156 are controlled by forward relay 1142. A line 1158 connects with the line 1144 between the contacts 1146 and the switch 1148. A lead 1160 connects with the line 1140. A relay coil 1162 is in the line 1160. The relay coil 1162 connects with the line 1164. In the line 1164 there are normally closed relay contacts 1166. The normally closed relay contacts 1166 are under the control of the relay coil 1142. The normally closed relay contacts 1146 and the line 1144 are under the control of the relay coil 1162. The lead 1164 connects with the jog reverse switch 1168. The jog reverse switch 1168 connects with the lead 1170. The lead 1170 connects with part of the gang switch 1152 which in turn connects with a lead 1172. The lead 1172 connects with a power line 1090. In parallel with the jog reverse switch 1168 is normally closed contacts 1174. The contacts 1174 connect with the lead 1170, and with the lead 1164. The normally closed contacts 1166 are under the control of the relay coil 1142.

The forward relay 1142, in addition to controlling the contacts 1156 and 1166, also controls the operation of the motors 730 and 782 in the dimension machine 650 so as to have these motors drive the feed rolls to run a cant through the gang saws 652 and 654. The relay 1162, in addition to controlling the contacts 1174 and the contacts 1146, also controls the reverse movement of the motors 730 and 782 so as to have these motors run in a reverse direction for moving a cant away from saws 652 and 654.

In the line 1100 it is seen that there are series of normally closed contacts. These are thermal overload switches and are safety switches. More particularly, upon the switches becoming overheated, the eutectic mixture in the overload switch melts so as to open the circuit and prevent the operation of the apparatus. Fox example, such a thermal overload switch as switch 1176 is under the control of the relay 1142; a thermal overload switch 1178 is under the control of the relay 1162; a thermal overload switch 1180 is under the control of the relay 1126; and a thermal overload switch 1182 is under the control of the relay coil 1096.

The electrical system for controlling the chipper motors of the top, bottom and side chipper apparatus 50 will be presently described. A line 1190 connects with the power line 1070. In this line 1190 is coil 1192 for controlling the operation of the motor associated with the chipper 52. The coil 1192 connects with the line 1194. In the line 1194 is a start switch 1196. The start switch 1196 connects with a line 1198. In the line 1198 there is an emergency stop switch 1200. The emergency stop switch 1200 connects with a line 1202 which in turn connects with the power line 1190. A line 1204 connects with the line 1190. A relay coil 1206 connects with the line 1194 and with the line 1204. A line 1208 connects with the line 1194. Relay contacts 1210 connect with line 1198 and with line 1208 so as to be in parallel with start switch 1196. The relay contacts 1210 are under the control of relay coil 1206. A line 1214 connects with line 1204. A motor control coil 1216, for controlling the motor for chipper 54, connects with the line 1214. The coil 1216 connects with line 1212. In the line 1212 are normally open relay contacts 1218. The relay contacts 1218 connect with the line 1208 by means of line 1220. The relay contacts 1218 are also under the control of relay coil 1206. The relay coil 1206 is a time-delay relay coil and does not act instantaneously upon the closing of the switch 1196. There is a short-time pause between the closing of the switch 1196 and the action of the relay coil 1206 so as to close normally open relay contacts 1210 and 1218. A relay coil 1222 connects with a line 1212 and also with the line 1204. A line 1224 connects with the line 1204. In this line there is a motor control coil for controlling the motor of chipper 56. The motor control 1226 connects with the line 1228 which in turn connects with relay contacts 1230. The relay contacts 1230 connect with the line 1208 by means of line 1232. The relay contacts 1230 are under the control of the relay coil 1222. The relay coil 1222 is a time-delay relay coil, and upon the contacts 1218 being closed, introduces a short-time delay before closing the contacts 1230. A relay coil 1234 connects with the line 1228 and with the line 1204. A motor control coil 1236 connects with the line 1204, and also connects with a line 1238. The motor control coil 1236 controls the operation of the motor associated with the chipper 58. The line 1238 connects with normally open relay contacts 1240. The normally open relay contacts 1240 connect with the line 1208 by means of line 1242. The normally open relay contacts 1240 are under control of the relay coil 1234. The relay coil 1234 is a time-delay relay coil and does not close the normally open contacts 1240 upon current flowing through the closed contacts 1230 and the coil 1234. It is seen that by means of the time-delay relay coils 1206, 1222 and 1234 the motors associated with the clippers 54, 56 and 58 are not simultaneously started with motor 52. In fact, the motor 52 starts, then a few seconds later the motor 54 starts, a few seconds later the motor 56 starts and then a few seconds later the motor 58 starts. This staggers the load so as not to have a load hit the apparatus 50 and the electrical system simultaneously but over a few seconds time-span.

In the line 1100 there is a thermal overload safety device 1244 under the control of the coil 1192; a thermal overload safety device 1246 under the control of the relay coil 1206; a thermal overload safety device 1248 under the control of the coil 1216; a thermal overload safety device 1250 under the control of the relay coil 1222; a thermal overload safety device 1252 under the control of the coil 1226; a thermal overload safety device 1254 under the control of the relay coil 1234; and, a thermal overload safety device 1256 under the control of the relay coil 1236.

The electrical system for the motors 450 and 550 for the feed rolls of the apparatus 50, see FIGURES 8, 13, 1, 2, and 3, will be presently described. A line 1260 connects with the power line 1070. In the line 1260 is a control coil 1262 for controlling the motor 450. The control coil 1262 connects with the line 1264 which in turn connects with normally closed contacts 1266. The normally closed contacts 1266 connect with the line 1268. Line 1268 connects with the start switch 1270. A switch 1270 connects with the line 1272 which connects with an emergency stop switch 1274. The emergency stop switch 1274 connects with line 1158. A line 1276 connects with a line 1260. A control coil 1278 for the motor 550 connects by means of line 1280 with the line 1276. The coil 1278 by means of line 1282 connects with normally closed contacts 1284. The normally closed contacts 1284 by means of line 1286 connects with line 1268. The control coils 1262 and 1278 are for driving the motors 450 and 550 in a forward direction. A line 1288 connects with a line 1276. A control coil 1290 for driving the motor 450 in a reverse direction connects with a line 1288. The motor coil 1290 connects with the line 1292. The line 1292 connects with normally closed contacts 1294 which in turn connect by means of line 1296 with a line 1298, to be described. A line 1276 connects with controls 1300 for driving the motor 550 in a reverse direction. The coil 1300 connects with a coil 1302 which in turn connects with normally closed contacts 1304. The normally closed contacts connect with line 1298 which in turn connects with a jog reverse switch 1306. The jog reverse switch connects with line 1308. The line 1308 connects with the emergency stop switch 1310. The emergency stop switch 1310 ganged to the emergency stop switch 1274. The emergency stop switch 1310 connects by means of line 1312 with power line 1090. Normally closed contacts 1314 are parallel with the jog reverse switch 1306 and connects with line 1308 and line 1298. A line 1318 connects with a line 1268. In this line 1268 there are normally open contacts 1320 and normally open contacts 1322. The line 1318 also connects with the line 1272. From this it is seen that the normally open contacts 1320 and 1322 are in parallel with the start switch 1270. The coil 1262 controls the normally open contacts 1322 and the normally closed contacts 1294. The coil 1278 controls the normally open contacts 1320 and the normally closed contacts 1304. The coil 1290 controls the normally closed contacts 1266. The coil 1300 controls the normally closed contacts 1284.

In the line 1100 is a thermal overload switch 1326. The thermal overload switch 1326 is associated with the coil 1262. Also, there is a thermal overload switch 1328 associated with the coil 1290; a thermal overload switch 1330 associated with the coil 1278; and, a thermal overload switch 1332 associated with the coil 1300.

Further, it is seen that the line 1122 connects with the line 1268.

This concludes the description of FIGURE 19; but it is to be realized that FIGURE 20 is part of the electrical circuit 1050 and is a continuation of FIGURE 19. The same power lines 1070 and 1090 appear in FIGURE 20 as well as safety control line 1100 containing the thermal overload switches.

A description of the electrical circuitry which controls the motors 668 and 688 for running the gang saws 652 and 654 of the dimension machine 650 will be presently described. In FIGURE 20 it is seen that a line 1340 connects with power line 1070. In the line 1340 there is a control 1342 which controls the motor 668 for driving the gang saw 652. The control 1342 connects with a line 1344 which in turn connects with a start switch 1346. The start switch 1346 connects with line 1348 which in turn connects with a motor stop switch 1350. The motor stop switch 1350 connects with the line 1090 by means of line 1352. A line 1354 connects with line 1340 and, also, with a control coil 1356 for controlling the motor 688 for driving the gang saw 654. The control coil 1356 by means of line 1358 connects with line 1344. A line 1360 connects with line 1344 and with line 1348. The line 1360 contains normally open relay contacts 1362 and normally open relay contacts 1364. The normally open relay contacts 1364 are under the control of the coil 1342 and the normally open relay contacts 1362 are under the control of the coil 1356. In the line 1100, there is a thermal overload switch 1366 which is associated with the coil 1342. Also, in the line 1100 there is a thermal overload switch 1368 which is associated with the coil 1356. It is seen that the safety line 1100 having the thermal overload switches connects with the line 1070. The place of connection with the line 1070 should be such as to include all of the foregoing relay coils.

There is provided a master jog reverse switch for reversing the motors for reversing the direction of travel of the infeed table so as to move a log away from the apparatus 50; for reversing the direction of the feed rolls in the apparatus 50 so as to move a log or a slab away from the chippers; and for reversing the feed rolls from the gang saws 652 and 654. A line 1370 connects with the power line 1070. It is seen that line 1370 connects with the power line 1070. In the line 1370 is a relay coil 1372. The relay coil 1372 connects with the line 1374 which in turn connects with a master jog reverse switch 1376. It is seen that the line 1374 connects with the master jog reverse switch 1376 which in turn connects with line 1090 by means of line 1378. The following relay contacts, 1138, 1174 and 1314 are under the control of relay coil 1372. The normally open relay contacts 1138 are in the feed table 870. The relay contacts 1174 are in the dimension machine 650, and the relay contacts 1314 are in the apparatus 50.

There is an electrical control means for the log lifting pads 1012 of the feed table 870, see FIGURES 34, 35 and 37. A line 1380 connects with the power line 1070 and with the solenoid 1382. The solenoid 1382 connects with the line 1384 which in turn connects with a sweep control switch 1386. The sweep control switch 1386 by means of line 1388 connects with the line 1090. A line 1390 connects with the solenoid 1392 and which solenoid in turn connects by means of line 1394 with the line 1384. The solenoids 1382 and 1392 may be considered to control the two outer log lifting pads 1012, see FIGURES 34 and 35, by controlling the flow of fluid to the fluid actuated cylinders 1014. A line 1396 connects with the power line 1070 and with the solenoid 1398. The solenoid 1398 by means of line 1400 connects with the sweep control switch 1402 which in turn connects with the power line 1090 by means of a line 1404. The solenoid 1398 controls the center log lifting pad 1012, see FIGURES 34 and 35, by controlling the flow of fluid to the fluid actuated cylinders 1014 associated with the log lifting pad 1012.

There is an electrical control means for moving the carrier chain support-structure assemblies toward each other, away from each other, moving the same ends of the carrier chain support-structure assemblies toward each other and the other ends of the support-structure assemblies away from each other so that the two carrier chain support-structure assume a V configuration. A line 1408 connects with the power line 1070. The line 1408 also connects with the solenoid 1410 which in turn connects with a line 1412. The line 1412 connects with a log grip switch 1414 which in turn connects with a line 1416 which connects with the power line 1090. Similarly, there is a line 1418 which connects with the solenoid 1420. The solenoid 1420 connects with the line 1422 which connects with a log gripping switch 1424. The log gripping switch 1424 connects with the line 1416 which connects with the power line 1090. With reference to FIGURES 34 and 37, it may be assumed that the solenoid 1410 controls the fluid actuated cylinder 916 at the left side of the feed table 870 and the solenoid 1420 controls the fluid actuated cylinder 916 at the right side of the feed table 870. By actuating the solenoid 1410 the two carrier chain support-structure assemblies are drawn close together at the left end. By actuating the solenoid 1420 the two support-structure assemblies 888 are drawn close together at the right end. By actuating only one of the solenoids 1410 or 1420, only one end of the two support-structure assemblies 888 are drawn close together so that the feed table 870, in the plan view, assumes the configuration of a V.

Although not shown in the drawings, there is a log loader for placing a log between the carrier chain support-structure assemblies 888 of the feed table 870. There is a line 1428 connecting with the power line 1070. The line 1428 connects with the solenoid 1430 which in turn connects with a line 1432. The line 1432 connects with a switch 1434 which by means of line 1436 connects with the power line 1090. Upon actuation of the solenoid 1430, the log lifter places a log between the two carrier chain support-structure assemblies 888 of the feed table 870.

A line 1438 connects with a power line 1070 and also with the solenoid 1440. The solenoid 1440 by means of line 1442 connects with normally open contacts 1444. The normally open contacts 1444 connect with the power line 1090 by means of a line 1446. The solenoid 1440 controls the flow of the fluid to the cylinder 218 for controlling the brake in the apparatus 50, see FIGURES 5 and 7. As is recalled, there is a brake cylinder 218 associated with each chipper, viz., 52, 54, 56 and 58. Therefore, the solenoid 1440 controls the flow of fluid to four brake cylinders 218. At this time it is appropriate to state that the electrical circuit being described is for an apparatus 50 having two movable chippers and two stationary chippers. More particularly, the top chipper 52, and bottom chipper 54 may be movable and the side chippers 56 and 58 may be stationary. Therefore, the brake solenoid 1440 controls only the flow of fluid to the cylinders 218 associated with the top chipper head or chipper 52 and the bottom chipper 54. Or, conversely, the top chipper 52 and the bottom chipper 54 may be stationary and the side chippers 56 and 58 may be movable so that the brake solenoid 1440 controls the flow of fluid to the brake cylinder 218 associated with the side chippers 56 and 58. In this particular installation, the top chipper 52 and the bottom chipper 54 are free to move while the side chippers 56 and 58 are set at a spacing of four (4″) inches so as to pass a cant four (4″) inches in width. The height of the cant may vary from two inches on up to any reasonable height. The reason for the four-inch width between the chippers 56 and 58 is that the dimension machine 650 cuts the cants on the apparatus 50 into two-by-fours (2 x 4's). For example, if a four-by-four (4" x 4") inch cant is fed the dimension machine 650, there results two two-by-fours (2 x 4's). Likewise, if a four-by-eight (4" x 8") inch cant is fed into the dimension machine 650, there results four two-by-fours (2 x 4's). These two-by-fours (2 x 4's) are rough two-by-fours (2 x 4's) of approximately two inches by four inches (2" x 4") in cross section and not a finshed two-by-four (2 x 4) of approximately three and five-eighths inches by one and five-eighths inches (3⅝" x 1⅝") in cross section. With this information, it will be seen that the presently-to-be-described selector switch arrangement applies only to the top chipper 52 and the bottom chipper 54 so as to vary the spacing between these two chippers while the spacing between the side chippers 56 and 58 is not varied. This portion of the electrical circuit will be referred to as the selector switches for the setting of the distance between the chippers 52 and 54. At the selector box there are a number of switches for determining the height of the slab to be passed between the chippers 52 and 54. It is to be recalled that a log, assumed substantially circular in lateral cross section, is fed between the chippers 52 and 54. These two chippers chip off the top of the log and the bottom of the log so as to pass a slab having a flat top and a flat bottom, see FIGURES 24, 25 and 26, wherein in FIGURE 26 there is illustrated a slab having rounded sides 66 and a flat top and a flat bottom. The height of this slab is determined by the operator at the control box for controlling the spacing between the chippers 52 and 54. He may vary the spacing so as to be 2 inches, 3 inches, 4 inches, 5 inches, 6 inches, 7 inches or 8 inches. Of course, it is possible to have different spacings between the top chipper 52 and the bottom chipper 54 so that the operator is not limited to a lower limit of two inches or an upper limit of eight inches. It is conceivable to have a lower limit of one-half (½") inch or one (1) inch, if practical, and an upper limit of sixteen or twenty-four (16" or 24") inches or any reasonable figure. In the selector box a line 1450 connects with the power line 1090. The line 1450 connects with the switch 1452 and in the line 1450 is normally open relay contacts 1454. The relay contacts 1454 by means of the line 1456 connect with a line 1458. The line 1458 forms a terminal for the switch 1452. The switch 1452 is normally open with respect to the line 1458, and does not contact the terminal 1458 being actuated by an operator. In the line 1458 there is a relay coil 1460. Also, in parallel with the relay coil 1460 is a light 1462 to indicate that the circuit is actuated. The relay coil 1460 by means of line 1464 connects with normally closed relay contacts 1468. The light 1462 connects with a line 1458 and with the line 1464. The switch 1452 may correspond to a two-inch space between the chippers so as to allow a two-inch slab to pass. The switch 1452 is normally in a closed relationship with the line 1470. The relay coil 1460 controls the normally open relay contacts 1454. The line 1470 connects with a switch 1472 and with normally open relay contacts 1474. The normally open relay contacts 1474 by means of line 1476 connect with the line 1478. The line 1478 terminates at one pole of the switch 1472 and is in a normally open relationship with said switch. The line 1478 also connects with the relay coil 1480 which in turn connects with a line 1482. The normally closed relay contacts 1468 by means of a line 1484 connect with line 1482 and with normally closed relay contacts 1486. In parallel with the relay coil 1480 is a light 1488 which connects with the line 1478 and the line 1482. The relay coil 1480 controls the normally open relay contacts 1474 and the normally closed relay contacts 1468. The switch 1472 is in a normally closed relationship with the terminal of line 1490. The switch 1472 may be considered to correspond to a switch for spacing the chippers three inches apart. The line 1490 connects with a switch 1492 and with normally open relay contacts 1494. The normally open relay contacts 1494 by means of line 1496 connect with a line 1498. The line 1498 terminates at a terminal of the switch 1492 and is in a normally open relationship with said switch. The line 1498 connects with a relay coil 1500 which in turn connects with a line 1502. The normally closed relay contacts 1486 by means of line 1504 connect with the line 1502 and with normally closed relay contacts 1506. A light 1508 is in parallel with the relay coil 1500 and connects with the line 1498 and the line 1502. The relay coil 1500 controls normally open relay contacts 1494 and normally closed relay contacts 1486. The switch 1492 may be considered to be a selector switch for spacing the chippers four inches apart and for passing a four-inch slab of lumber.

The switch 1492 connects with a line 1510 which terminates at one pole of the switch and is in a normally closed relationship with the switch 1492. The relay coil 1508 controls the normally open relay contacts 1494 and the normally closed relay contacts 1486. The line 1510 connects with the normally open relay contacts 1514 which by means of line 1516 connect with the line 1518. The line 1518 terminates at one pole of the switch 1512 and is in a normally open relationship with said switch 1512. The line 1518 connects with the relay coil 1520 which connects with the line 1522. The normally closed relay contacts 1506 connect with the line 1524 which connects with the line 1522 and with normally closed relay contacts 1526. In parallel with the relay coil 1520 is a light 1528 which connects with the line 1518 and the line 1522. The relay coil 1520 controls the normally open relay contacts 1514 and the normally closed relay contacts 1506. The switch 1512 may be considered to control the spacing of the chippers at five inches. The switch 1512 connects with a line 1513 which terminates at one pole of the switch and is in a normally closed relationship of said switch 1512. The line 1513 connects with a switch 1521 and with normally open relay contacts 1515. The normally open relay contacts 1515 by means of line 1517 connects with the line 1519. The line 1519 connects with one pole of the switch 1521 and is in a normally open relationship with the switch 1521. The line 1519 connects with a relay coil 1523. The relay coil 1523 by means of a line 1525 connects with the normally closed contacts 1526 by means of a line 1527. The line 1527 also connects with normally closed relay contacts 1536. In parallel with the relay coil 1523 is a light 1529. The light 1529 connects with the line 1519 and the line 1525 so as to indicate if the relay coil 1523 is actuated. The relay coil 1523 controls the normally open relay contacts 1515 and the normally closed relay contacts 1526. The switch 1521 controls the space between the chippers at a distance of six inches. The switch 1521 connects with the terminal of line 1540 and is in a normally closed relationship with the line 1540. The line 1540 connects with the switch 1542 and with normally open relay contacts 1544. The relay contacts 1544 by means of the line 1546 connects with the line 1548. The line 1548 connects with one terminal of the switch 1542 and in a normally open relationship with said switch 1542. The line 1548 connects with a relay coil 1550 which in turn connects with a line 1552. The normally closed relay contacts 1536 by means of line 1554 connect with the line 1552 and with the normally closed relay contacts 1556. In parallel with relay coil 1550 is a light 1558 which connects with a line 1548 and line 1552. The light 1558 indicates if the relay coil coil 1550 is activated. The relay coil 1550 controls the normally open relay contacts 1544 and the normally closed contacts 1536. The switch 1542 connects with the terminal of a line 1560 and is in a normally closed relationship with said line 1560. The line 1560 connects with the switch 1562 and with normally open contacts 1564. The normally open contacts 1564 by means of line 1566 connect with the line 1568. The line 1568 connects with the terminal of the switch 1562 and is in a normally open relationship with respect to said switch 1562. The line 1568 connects with the relay coil 1570 which in turn connects with the line 1572. The line 1572 connects with power line 1070. The normally closed relay contacts 1556 connect with the line 1572 by means of line 1574. A light 1576 is in parallel with the relay coil 1570 and connects with lines 1568 and 1572 and indicates if the relay coil 1570 is activated. The relay coil 1570 controls normally open relay contacts 1564 and the normally closed relay contacts 1556. The switch 1562 may be considered to control the spacing of the chippers a distance of eight inches, and the switch 1542 may be considered to control the spacing of the chippers seven inches. This completes the description of the selector switches at the control of an operator of the apparatus 50.

The means by which the movement of the chippers is controlled will be presently described. In this regard see FIGURE 22 which is a continuation of FIGURE 20 and has power lines 1070 and 1090. A line 1580 connects with the line 1090. The line 1580 branches into line 1582 which connects with normally closed contacts 1584. The line 1582 branches into a line which connects with a first switch 230 and a second switch 230. With regard to switches 230 the reader is advised to see FIGURE 4. It is to be recalled that the switches 230 are associated with the chippers. With each chipper there is associated one switch 230. Since only two of the chippers move in this particular design, the upper chipper 52 and the lower chipper 54, there are only two switches 230 for each chipper setting. The normally closed contacts 1584 are controlled by the relay 1460, see FIGURE 20. The normally closed contacts 1584 connect with a line 1586. A line 1588 connects the line 1586 with the two switches 230 associated with normally closed contacts 1584. The line 1586 also connects with normally closed contacts 1590. The line 1588 connects with the switches 230 associated with the normally closed contacts 1590. The normally closed contacts 1590 are controlled by the relay coil 1480 and correspond to a three-inch spacing between the chippers. The normally closed contacts 1584 correspond to a spacing of two inches between the chippers. The normally closed contacts 1590 connect by means of line 1592 with normally closed contacts 1594. The line 1592 also connects with the line 1596 which connects with the two switches 230 associated with the normally closed contacts 1590 and the two switches 230 associated with the normally closed contacts 1594. The normally closed contacts 1594 are under the control of the relay coil 1500 and corresponds to a spacing of four inches between the chippers. The normally closed contacts 1594 connect by means of line 1598 with normally closed contacts 1600. The line 1598 connects with the switches 230 associated with the normally closed contacts 1594 and with the switches 230 associated with the normally closed contacts 1600. The normally closed contacts 1600 are under the control of relay coil 1530 and correspond to a spacing of six inches between the chippers. The normally closed contacts 1600 by means of line 1602 connect with normally closed contacts 1604. A line 1606 connects with the line 1598 and with the switches 230 associated with the normally closed contacts 1594 and with switches 230 associated with normally closed contacts 1600. A line 1608 connects the line 1602 with switches 230 associated with the normally closed contacts 1600 and with the switches 230 associated with the normally closed contacts 1604. The normally closed contacts 1604, under control of the coil 1540, by means of line 1610 connect with normally closed contacts 1612. The contacts 1612 are under the control of the relay coil 1550 and may be considered to be for a seven-inch spacing between the chippers so as to allow a seven-inch slab to pass between the chippers. A line 1614 connects with a line 1610 and also with the switches 230 associated with the normally closed contacts 1604 and also with the switches 230 associated with the normally closed contacts 1612. The normally closed contacts 1612 by means of line 1616 connect with the normally closed contacts 1618. The normally closed contacts 1618 are under the control of the relay coil 1570 and may be considered to be associated with an eight-inch spacing between the chippers so as to allow an eight-inch slab to pass between the chippers. A line 1620 connects with the line 1616 and also with switches 230 associated with the normally closed contacts 1612 and with the switches 230 associated with the normally closed contacts 1618. A line 1622 connects with the normally closed contacts 1618 and with the switches 230 associated with the normally closed contacts 1618 and with the relay coil 1624. The relay coil 1624 by means of line 1626 connects with the power line 1070. The relay coil 1624 controls the normally open relay contacts 1444, see FIGURE 20, associated with the brake solenoid 1440.

The rest of the electrical control circuitry is continued in FIGURE 21. This figure shows two power lines 1090 and 1070 and may be considered to be a continuation of the power lines 1090 and 1070 of FIGURE 22. In the line 1090 there is a safety switch 1630, see FIGURE 1. This is an infeed safety switch located in front of the top chipper 52 and the bottom chipper 54.

Also, in the line 1090 is a safety switch 1632, see FIGURE 7. This safety switch 1632 is opened when the brake is set so that the chippers cannot move. It is seen that on the lower member of 194, see FIGURE 7, there is a finger 1634. Upon the setting of the brake this finger moves so as to open the switch 1632 in the line 1090.

Also in the line 1090 is a safety switch 1636, see FIGURE 3. This is an outfeed safety switch and is opened when a cant contacts the switch 1636 and passes out of the apparatus 30.

There is an electrical means for controlling the actuation of the cylinders 168, 170 and 172, see FIGURE 4. By controlling these cylinders, the space between the chippers is controlled. By way of review it is to be recalled that the cylinder 168 has a plunger which may extend one-half inch. The cylinder 170 has a plunger which may extend one inch, and the cylinder 172 has a plunger which may extend one and one-half inches. Also, the plungers of cylinders 168 and 170 are connected and the cylinders 170 and 172 are in a back-to-back relationship. A line 1640 connects with the line 1090. The line 1640 also connects with normally open contacts 1642. The normally open contacts 1642 connect with the line 1644 which connects with a solenoid 1646 for controlling a valve 588 for controlling the flow of fluid to the cylinder 168. The solenoid 1646 by means of a line 1648 connects with a line 1050. A line 1650 connects with the line 1090 and with normally open contacts 1652. The normally open contacts 1652 by means of a line 1654 connects with the line 1644. A line 1656 connects with the line 1090 and with normally open contacts 1658. The normally open contacts 1658 connect with a line 1660 which connects with a line 1654 and thereby the line 1644. It is seen that the normally open contacts 1642, 1652 and 1658 are in parallel. The normally open contacts 1642 are under the control of relay coil 1480, see FIGURE 20. The normally open relay contacts 1652 are under the control of relay coil 1530. The normally open relay contacts 1658 are under the control of the relay coil 1570. As is recalled, the cylinder 168 has a plunger which may be moved one-half inch. Therefore, upon the closing of any of the three relay contacts 1642, 1652 or 1658, the plunger 168 will be moved one-half inch and the chipper will be moved one-half inch because of this. A line 1664 connects with the line 1090 and with normally open contacts 1666. The contacts 1666 connect with the line 1668 which in turn connects with the solenoid 1670. The solenoid 1670 by means of line 1672 connects with the power line 1070. The solenoid 1670 controls the valve which controls the flow of fluid to the fluid actuated cylinder 170. A line 1674 connects with the power line 1090 and with normally open contacts 1676. The contacts 1676 by means of a line 1678 connects with a line 1668. A line 1680 connects with a power line 1090 and with normally open contacts 1682. The normally open contacts 1682 connect with a line 1684 which in turn connects with line 1678 and, therefore, the line 1668. It is seen that the normally open contacts 1666, 1676 and 1682 are in parallel. The normally open contacts 1666 are controlled by the relay coil 1500. The normally open contacts 1676 are controlled by the relay coil 1550. The normally open relay contacts 1682 are controlled by the relay coil 1570. Upon the closing of any of the contacts 1666 or 1676 or 1682, the solenoid coil 1670 is actuated so as to control the valve so as to move the plunger of the fluid actuated cylinder 170 a distance of one inch so as to move the chipper a distance of one inch.

A line 1690 connects with power line 1090 and also connects with normally open contacts 1692. The normally open contacts 1692 connect with line 1694 which connects with the solenoid 1696. The solenoid 1696 connects by means of line 1698 with power line 1070. A line 1700 connects with line 1090 and also with normally open contacts 1702. The normally open contacts 1702 connect by means of line 1704 with line 1694. A line 1706 connects with power line 1090 and also with normally open contacts 1708. The normally open contacts 1708 connect by means of a line 1710 with the line 1704 and also with the line 1694. A line 1712 connects with the power line 1090 and also with normally open contacts 1714. The normally open contacts 1714 connect by means of a line 1716 with the line 1704 and with line 1694. The normally open contacts 1692 are under the control of relay coil 1520. The normally open contacts 1702 are under the control of relay coil 1530. The normally open contacts 1708 are under the control of the relay coil 1550. The normally open contacts 1714 are under the control of the relay coil 1570. The solenoid controls the valve for regulating the flow of fluid actuated cylinder 172. As is recalled, the fluid actuated cylinder 172 has a plunger which may be moved one and one-half inches. Upon the closing of any of the contacts 1692, 1702, 1708 or 1714, the solenoid 1696 is actuated and the plunger of the cylinder 172 is moved one and one-half inches. The chipper is correspondingly moved one and one-half inches.

The solenoids 1646, 1670 and 1696 control the valves for supplying fluid to the cylinders 168, 170 and 172 so as to retract the plungers of these cylinders. In other words, upon the retraction of the plungers, the two chippers in a set of chippers are moved away from each other.

A line 172 connects with the power line 1090 and also connects with the normally closed contacts 1722. A line 1724 connects with normally closed contacts 1722 and normally closed contacts 1726. A line 1728 connects with normally closed contacts 1726 and with solenoid coil 1730. A line 1732 connects with solenoid 1730 and with power line 1070. The normally closed contacts 1722 are under the control of the relay coil 1480. The normally closed contacts 1726 are under control of relay coil 1530. The solenoid 1730 controls the valve for controlling the flow of the fluid to the fluid actuated cylinder 168. Upon the actuation of solenoid 1730 the plunger of cylinder 168 is extended so as to move the corresponding chipper one-half inch toward the center of the apparatus 50.

A line 1734 connects power line 1050 with normally closed relay contacts 1736. A line 1738 connects normally closed relay contacts 1736 with solenoid 1740. A line 1742 connects the solenoid with the power line 1070. The normally closed relay contacts 1736 are under the control of relay coil 1500. The solenoid 1740 controls the valve for controlling the flow of the fluid to the plunger 170. Upon the activation of the solenoid 1470, the plunger of the cylinder 170 is extended one inch so as to move the corresponding chipper one inch closer toward the center of the apparatus 50.

A line 1744 connects with power line 1090 and with the normally closed relay contacts 1746. A line 1748 connects the normally closed relay contacts 1746 with normally closed relay contacts 1750. A line 1752 connects the normally closed relay contacts 1750 with the solenoid 1754. A line 1756 connects the solenoid 1570 with the power line 1070. The normally closed contacts 1746 are under the control of relay coil 1520 and the normally closed contacts 1750 are under the control of the relay coil 1530. The solenoid 1754 controls the valve which controls the flow of fluid to the cylinder 172. Upon the flow of fluid to the cylinder 172, the plunger of this cylinder is extended so as to move the corresponding chipper one and one-half inches closer to the center of the apparatus 50.

It is noted that in the power line 1070 between lines 1698 and 1732 there is a set of normally closed contacts 1760. These contacts 1760 are under the control of relay coil 1570.

It is noted that in the power line 1070 between lines 1732 and 1742 there is a set of normally closed relay contacts 1762. These contacts 1762 are under the control of relay coil 1550.

The electrical system for the combination of the top, bottom and side chipper apparatus 50, the dimension machine 650 and the feed table 870 has been described. Now, there will be presented some examples of the use of this electrical system for this combination. It is to be recalled that in this particular apparatus 50, only the top chipper 52 and the bottom chipper 54 are free to move. The side chippers 56 and 58 are not free to move and are set four inches apart from each other so as to allow a cant having a four-inch width to pass out of the apparatus 50 to the dimension machine 650. Normally, in this dimension machine 650, this cant having a four-inch width will be sawed into smaller cants of the size of two-by-four (2" x 4") inches.

In starting this combination, it is desirable to start at the last member of the combination, in this instance the dimension machine 650, and to work forward through the apparatus 50 and to the feed table 870. With this starting procedure, it is then possible to have all members operating prior to the feeding of a log to the apparatus 50 and thereby preclude the jamming of the apparatus 50. In starting the apparatus 50, the switch 1084 is closed so as to activate relay coil 1092. With the actuation of the relay coil 1092 the normally open contacts 1086 and 1088 are closed so that current will flow to line 1090 and also to line 1100. The switch 1084 becomes open, but the contacts 1086 and 1088 insure the flow of current to these two lines 1090 and 1100. Naturally, there is power supply to the line 1070 from the secondary winding 1064 of the transformer 1062. Then, the switch 1346 is closed and the control coils 1342 and 1356 for the motors 668 and 688 of the dimension machine 650 are actuated. With the actuation of these control coils 1342 and 1356, the normally open contacts 1364 and 1362 are closed so that current flows through these contacts. The switch 1346 becomes open. In this manner the saws 668 and 688 of the dimension machine 650 are actuated.

Then, the feed rolls of the dimension machine 650, feed rolls being 700, 702, 704, 760, 762, and 764, are activated by closing the switch 1148 so as to activate the coil 1142 which controls the motors 730 and 782 which drive these said feed rolls. By activating the coil 1142, the feed rolls feed a cant to the gang saws of the dimension machine. Also, by activating the coil 1142 the normally open relay contacts 1156 are closed and the normally closed relay contacts 1166 are opened. The switch 1148 becomes open, but the normally open relay contacts 1156 remain closed. By opening the normally closed contacts 1166 there is no power supply to the coil 1162 for reversing the feed rolls. In case of an emergency, it may be necessary to reverse these feed rolls. Therefore, the switch 1168 is closed. By closing the switch 1168, energy current is supplied to the coil 1162 which closes the normally open relay contacts 1174 and opens the normally closed relay contacts 1146 so as to cut off electrical energy to the control coil 1142. With the control coil 1142 de-activated, the closed contacts 1156 return to the normally open state.

The chippers 52, 54, 56 and 58 of the apparatus 50 are started by closing the switch 1196 so as to supply current to the coil 1192. The coil 1192 controls the motor for the chipper 52. Also, the coil 1192 controls the normally open contacts 1210. With current supplied to the coil 1192, the contacts 1210 close. The switch 1196 opens. It is seen that normally open contacts 1218, 1230 and 1240 prevent energy, electrical current, to go to the coils 1216, 1226 and 1236. With the closing of the normally open contacts 1210, electrical current is supplied to the delay relay coil 1206. After a few seconds, the delay relay coil 1206 closes the normally open contacts 1218 so as to supply current to the control coil 1216 for the motor of the chipper 54 and, also, supply current to the time delay relay coil 1222. After a few seconds of time, delay relay coil 1222 closes the normally open relay contacts 1230 so as to supply current to the control coil 1226 of the motor for the chipper 56 and, also, to supply current to the time delay relay coil 1234. The time delay relay coil 1234, after a few seconds, closes the normally open relay contacts 1240 so as to supply current to the control coil 1236 for the motor for controlling the chipper 58. In this manner it is seen that the four motors for driving the four chippers 52, 54, 56 and 58 are not simultaneously thrown on the electrical system, but are connected with the source of electrical power in a staggered relationship of a few seconds of time between each motor.

The feed rolls 260, 262, 264, 266, 480, 482, 484 and 486 are activated to move a log or a slab in a forward direction by closing the switch 1270. This activates the control coil 1262 for the feed motor 450 and the control coil 1278 for the feed motor 550. With the closing of the switch 1270, current is sent to the control coil 1262 and to the control coil 1278. The control coil 1262 closes the normally open contacts 1322 and the control coil 278 closes the normally open relay contacts 1320. It is seen that the relay contacts 1322 and 1320 are a safety measure as, if the two control coils 1262 and 1278 do not properly operate, it is not possible to supply current to these two coils. The switch 1270 opens automatically after being closed. The control coil 1262 opens the normally closed relay contacts 1294 and the control coil 1278 opens the normally closed relay contacts 1304. It is seen that the control coils 1262 and 1278 do not connect directly with the power line 1090 through switch 1270, but instead connect with the power line 1090 through switch 1148. As is recalled, the switch 1148 controls the feed rolls in the dimension machine 650. This is a safety feature as it makes it necessary to have the feed rolls in the dimension machine 650 operating before the feed rolls in the apparatus 50 will function.

There is a reverse means for the feed rolls of the dimension machine 650. It is seen that there is a switch 1306. The normally open relay contacts 1314 may be closed by closing the master jog reverse switch 1376 so as to activate the coil 1372. The normally open relay contacts 1314 are under the control of the relay coil 1372. With this closing of the switches 1376 and 1306, the control coil 1300 and 1290 for controlling the motors 450 and 550 which drive the feed rolls 260, 262, 264, 266, 480, 482, 484 and 486 in a reverse direction are activated. With the activation of the relay coil 1290, the normally closed contacts 1266 are opened. With the activation of the relay coil 1300, the normally closed relay contacts 1284 are opened so that electrical current does not flow to the control coils 1262 and 1290 so as to preclude having current flowing to the motors 450 and 550 to drive the motors both in a forward and a reverse direction simultaneously.

The feed table is activated by closing the switch 1114. However, it is seen that this switch 1114 on one side is connected to the power line 1070; but in order to become connected to the power line 1090 on the other side, or to close the circuit, it is necessary for the switches 1270 and the switches 1148 to be closed, or for the feed rolls of the apparatus 50 and for the rolls of the dimension machine 650 to be operating before the feed table operates. This is a safety device to preclude the feeding of a log to the apparatus 50 and to the dimension machine 650 when the apparatus 50 and the dimension machine 650 are not simultaneously operating. With the closing of the switch 1114 and the closing of the circuit, the control coil 1096 which controls the motor 984 of the feed table 870 is activated. The control coil 1096 also controls the normally open relay contacts 1120 so as to close these contacts. The switch 1114 automatically opens, but there is a circuit bypassing the switch 1114 through the closed relay contacts 1120. There is a jog reverse circuit having normally closed relay contacts 1130. With the activation of the control coil 1096, the normally closed relay contacts 1130 are opened so as to isolate the control coil 1126 for controlling the reverse movement of the motor 984 and the chain 930. It is seen that there are also limit switches 1104 and 1112 associated with the control coil 1096. These are safety means and will be described in a later part of the specification.

There is a jog reverse means for the carrier chains 930. Upon the closing of switch 1132, the electrical energy flows to the control coil 1126 for the reverse control of the motor 984. Also, the control coil 1126 controls the normally closed contacts 1102 so as to open these contacts to stop the flow of current to the control coil 1096 for the forward direction of the motor 984 and the chains 930. The normally open contacts 1138, which bypass the switch 1132, are controlled by a control coil 1372 which is under the control of the switch 1376. Upon the closing of the switch 1376, the normally open relay contacts 1138 are closed so as to assure a continuous supply of electrical energy of the control coil 1126.

With the combination of the top, bottom and side chipper apparatus 50, the dimension machine 650 and the feed table 870 functioning, there is presented an example of the processing of a log of approximately seven (7") inches in diameter. If the log be slightly warped or bent, it may be handled on the feed table 870 by raising the lifting pads 1012. These lifting pads 1012 are under the control of the switch 1386, solenoids 1382 and 1392, switch 1402 and solenoid 1398. It is possible to position the log between the two sets of chains 930. Assume that the log is fairly straight and that it is positioned by means of these lifting pads 1012. Then, the two chains 930 are moved to grip the log. This is accomplished by the two switches 1414 and 1424 so as to move both the front and the rear ends of the chains 930 against the log by activating the solenoids 1410 and 1420. With the chains 930 firmly holding the log, the switch 1114 is closed so as to advance the log toward the apparatus 50.

The apparatus 50 has been set so that the top chipper 52 and the bottom chipper 54 are spaced six inches apart. As is recalled, the side chippers 56 and 58 are at a pre-set distance of four inches. The log contacts infeed limit switch 1630 so as to cut off any further power to solenoids 1646, 1670 and 1696. With power cut off to these solenoids, it is not possible to vary the distance between the chippers 52 and 54. Further, after the log has passed through the chippers 52 and 54 and is leaving the apparatus 50, the log also contacts an outfeed limit switch 1636 so as to open this limit switch to provide another safety means for making certain that electrical power cannot be sent to the solenoids 1646, 1670 and 1696. With the log no longer in contact with the infeed limit switch 1630, this switch closes and with the log no longer in contact with the outfeed limit switch 1636, this switch also closes. However, it is to be recalled that the switch 1362, a brake limit switch, is opened so as to preclude the flow of electrical energy to solenoids 1646, 1670 and 1696 while the log is being processed in the apparatus 50. There results from this log of approximately seven inches in diameter, a cant of four-by-seven (4" x 7") inches. This cant is fed to the dimension machine 650, which by means of previously described gang saws, cuts the cant into three two-by-fours (2 x 4's).

Now it is necessary to re-set the chippers 52 and 54 of the apparatus 50 for the next log. In this instance, assume that the log is nine inches in diameter. The setting for the top chipper 52 and the bottom chipper 54 will be approximately eight inches.

A seven-inch log has been run through the apparatus 50. It is desired to run a nine-inch log through the apparatus 50. With the seven-inch log, the top chipper 52 and the bottom chipper 54 were spaced approximately six inches apart. In FIGURE 22 this means that the two limit switches 230 associated with the normally closed relay contacts 1604 and between the line 1608 and 1614 are opened. Further, the normally closed contacts 1604 are opened. By way of reference, the switches 230 may also be found in FIGURE 4. With the opening of the switches 230 and the normally closed contacts 1604, the relay coil 1624 is opened. This sets the brake switch 1632, see FIGURES 21 and 7, by having the normally open contacts 1444 open so that the brake solenoid 1440 is not activated. Now, to accommodate a nine-inch log, it will be necessary to set the top chipper 52 and the bottom chipper 54 a distance of eight inches apart. This is accomplished by throwing the switch 1562, see FIGURE 20, so that relay coil 1570 is activated so as to close the normally open contacts 1564. With the activation of relay coil 1570, the normally open relay contacts 1564 are closed so as to insure a continuous supply of electrical energy to the relay coil 1570. Further, the normally closed relay contacts 1618 are opened so that the control relay coil 1624 must receive its electrical energy through the series of switches 230 between the line 1090 and the relay coil 1624. With the coil 1624 activated, the normally open relay contacts 1444 are closed so that the brake solenoid 1440 is activated. The solenoid 1440 controls the flow of fluid to the fluid actuated cylinder controlling the brake limit switch 1632. The brake limit switch 1632 is closed so that electrical energy flows to the normally open contacts 1658, 1682 and 1714, see FIGURE 21. Remember, the relay coil 1570 is activated so that these normally open contacts 1658, 1682 and 1714 are thereby closed in order to supply electrical energy to the solenoids 1646, 1670 and 1696. With the solenoids 1646, 1670 and 1696 activated, the plungers of the cylinders 168, 170 and 172 are retracted. At this place in the specification, it is appropriate to state that: in the particular configuration of the apparatus 50 being described, the distance between the effective chipping means of the upper chipper 52 and the lower chipper 54 is set at two inches. By retracting the plungers of the cylinders 168, 170 and 172 in various combinations, it is possible to vary the distance between the effective cutting means of the chippers 52 and 54 so as to have the distance from two inches to eight inches in one-inch increments. To illustrate this, remember that the effective distance is two inches. Now, with the activation of the solenoid 1646, the fluid to the cylinder 168 is regulated so that the plunger is retracted one-half inch; with the solenoid 1670 activated, the fluid flow to the cylinder 170 is regulated so that the plunger is retracted one inch; and, with the solenoid 1696 activated, the fluid flow to the cylinder 172 is controlled so that the plunger is retracted one and one-half inches. This means that there is a total retraction of three inches for one chipper. However, there are two chippers. Therefore, the total retraction for the two chippers is two times three inches plus the original two inches (2×3"+2") making a total of eight inches, the space between the upper chipper 52 and the lower chipper 54. Now, with the chippers 52 and 54 retracted this distance, the two switches 230 (one associated with each chipper) and associated with the normally closed contacts are opened. These two switches 230 are between the line 1620 and the control relay coil 1624. It is to be recalled that the relay coil 1570 has opened the normally closed relay contacts 1618. Therefore, there is no flow of electrical energy to the control relay 1624. As a result, the relay contacts 1444 are opened so that there is no flow of electrical energy to the brake solenoid 1440. The brake switch 1632 is opened so that there is no flow of electrical energy to any of the solenoids 1646, 1670 and 1696 which control or regulate the flow of fluid to the fluid actuated cylinders 168, 170 and 172. This is a safety means for precluding the movement of the plungers associated with the cylinders 168, 170 and 172 while the log is passing through the apparatus 50.

With the opening of the normally open relay contacts 1444 and the de-activation of the brake solenoid 1440 and the opening of the brake limit switch 1632, there is simultaneously closed a brake limit switch 1108, see FIGURE 19, This brake limit switch 1108 is associated with the control coil 1096 on the feed table 870. Actually, the brake limit switches 1108 and 1732 are controlled by the fluid actuated cylinder 218 but are referred to by different numbers for ease of identification. With the closing of the brake limit switch 1108 and with the setting of the brake, there is assured a continuous supply of electrical current to the coil 1096. The reason for this is that, with the log entering the apparatus 50, there is opened an infeed log limit switch 1104, see FIGURE 19. The infeed log limit switch 1104 is associated with the infeed limit switch 1630. These two switches are referred to by different numbers as they are associated with different parts of the invention. The infeed limit switch 1630 is considered to be part of the apparatus 50 and infeed limit switch 1104, although on the apparatus 50, is electrically associated with the feed table 870. The infeed limit switch 1104 is illustrated in FIGURE 1. Upon a log entering the apparatus 50, the switch 1104 is opened. If it were not for the brake limit switch 1108, upon the opening of the infeed limit switch 1104 there would be no electrical current flowing to the control relay 1092.

The feeding of a log by way of feed table 870 to the apparatus 50 and the feeding of a cant to the dimension machine 650 has been described for a seven-inch log and will not be repeated for a nine-inch log.

For purposes of illustration, assume that a small log is to be passed through apparatus 50 and it is desired to have the spacing between the upper chipper 52 and the lower chipper 54 to be two inches. This means that these chippers are spaced apart a minimum distance. In this instance the switch 1452 is closed so that electrical energy flows to the control relay 1460. The normally open contacts 1454 are closed so that on the reopening of the switch 1452 the control relay 1460 will receive electrical energy. Upon the closing of the switch 1452, the coil 1570 is de-activated so that the normally open relay contacts 1564 are once again opened; the normally closed relay contacts 1556 are closed; the normally closed relay contacts 1618 are closed. This allows the flow of electrical current through normally open relay contacts 1454 and the relay coil 1460. Also, in FIGURE 22 it is seen that current will flow through the switches 230 associated with the normally closed relay contacts 1454 (these contacts are now open as they are controlled by relay coil 1460) and through the rest of the switches 230 and through relay contacts 1618 to the control coil 1624. Upon the activation of the control coil 1624, the normally open contacts 1444 are closed so that the brake solenoid 1440 is activated to release the brake. With the release of the brake, the brake limit switch 1632 is closed. It is to be recalled at this time that the limit switches 1630 and 1636 are also closed so that electrical energy will flow through the power line 1090. Further, the electrical energy will flow through normally closed relay contacts 1722 and 1726 to the solenoid 1730 which controls the cylinder 168. This will extend the plunger of cylinder 168 one-half inch. Further, electrical energy will flow through normally closed contacts 1736 to the solenoid 1740 which controls the flow of fluid to the cylinder 170. This will allow the plunger of the cylinder 170 to extend one inch. Further, electrical energy will flow through the normally closed contacts 1746 and 1750 to the solenoid 1754 which controls the flow of fluid to the cylinder 172. As a result, the plunger of the cylinder 172 is extended one and one-half inches. In other words, the plungers of all of the cylinders are extended their maximum distance so that the space between the top chipper 52 and the bottom chipper 54 is two inches. This makes it possible to reduce the size of a log to a distance of two inches between the top chipper 52 and the bottom chipper 54. At this place it is appropriate to go back to the switches 1104 and 1108 in FIGURE 19. With the brake released, the brake limit switch 1108 will be closed. However, again electrical energy goes to the relay control coil 1096 as the infeed limit switch 1104 is closed because there is no log in the apparatus 50.

The multiplication of the electrical circuitry of FIGURES 19, 20, 21 and 22 in conjunction with the apparatus 50 will enable the side chipper 56 and 58 to move. It is to be recalled that the description, so far, has been limited to the movement of the top chipper 52 and the bottom chipper 54 while the side chippers 56 and 58 have been in a fixed position. More particularly, it is possible to move all of the chippers so as to have a cant of a square configuration in a lateral cross-section from the apparatus 50. This is possible by substituting the electrical circuitry of FIGURE 23 for the electrical circuitry of FIGURE 22. As the electrical circuitry of FIGURE 23 is substantially the same as the electrical circuitry of FIGURE 22, the same reference numerals will be employed throughout. In FIGURE 22, it is to be recalled that the switches 230 are associated with the top chipper 52 and the bottom chipper 54. In FIGURE 20 there is illustrated a bank of switches 1452, 1472, 1492, 1512, 1522, 1542 and 1562 and associated relay contacts and relay coils. These same switches, contacts and coils may be employed in conjunction with FIGURE 23. In FIGURE 21 there is illustrated solenoids 1646, 1670 and 1696 which solenoids retract the plungers of cylinders 168, 170 and 172. Also, there is illustrated solenoids 1730, 1740 and 1754 which solenoids extend the plungers of cylinders 168, 170 and 172. These same solenoids may be employed in conjunction with FIGURE 23. The top chipper 52 and the bottom chipper 54 move as a pair and the two side chippers 56 and 58 move as a pair. The spacing between the top chipper 52 and the bottom chipper 54 and the spacing between the side chippers 56 and 58 are the same so as to produce a cant having a square lateral cross-section. Of course, having a cant of a lateral square cross-section will make it impossible to use the dimension machine 650 in the described form as a machine for making a multiplicity of two-by-fours (2 x 4's) simultaneously. The reason for this is obvious as the dimensions of the cant from the apparatus 50 may vary from two-by-two (2 x 2) to eight-by-eight (8 x 8) or other suitable dimensions. In this instance the dimension machine 650 is eliminated so that the output of apparatus 50 is a cant of a square lateral cross-section configuration.

It is possible to have electrical circuitry for moving the top chipper 52 and the bottom chipper 54 as a pair and for moving the side chippers 56 and 58 as a pair, but to have the spacing between the top chipper 52 and the bottom chipper 54 different from the spacing between the side chippers 56 and 58. Again, in FIGURES 20, 21 and 22 it is to be recalled that the switches 1452, 1472 and 1492, 1512, 1522, 1542 and 1562 and associated relay contacts or relay coils; the solenoids 1646, 1670, 1696, 1730, 1740 and 1752 and associated relay contacts and the switches 230; and the relay contacts 1584, 1590, 1594, 1600, 1604, 1612 and 1618 control only the top chipper 52 and the bottom chipper 54. To control the side chippers 56 and 58, it is necessary to add to FIGURE 20 another bank of switches such as 1452, 1472, 1492, 1512, 1522, 1524, 1542 and 1562, associated relay contacts and associated relay coils; to add to FIGURE 21 another bank of solenoids 1646, 1670, 1696, 1730, 1740 and 1750; and, to add to FIGURE 22 another bank of switches 230 and associated relay contacts 1584, 1590, 1594, 1600, 1604, 1612, and 1680 and a control relay 1624; and to add to FIGURE 20 another set of relay contacts 1444 and another solenoid 1440. In fact, what has been added is just a duplication of the electrical circuitry particularly for controlling the side chippers 56 and 58. From an electrical standpoint this is just a duplication of this particular phase of circuitry and is not difficult to visualize and is within the ability of a person skilled in the art. With the additional circuitry it is possible to set the space between the top and the bottom chippers 52 and 54 at say, two inches and the space between the side chippers 56 and 58 at eight inches or other suitable dimensions. Also, it is possible to have the spacing, when desired, to have the apparatus 50 make a cant in a lateral cross-section of a square configuration. With this electrical circuitry it is possible to have the apparatus 50 to be more versatile than the previously described apparatus 50 so as to make cants of various lateral cross-section configurations. Again, with this electrical circuitry it may not be desirable to use the dimension machine 650 as the cant will not always have a width of four inches (4").

The volume of chips produced by the top, side and bottom chipper 50 is quite large. Therefore, means must be provided to remove the chips away from the chippers. Such a means is a shroud 1800 having cylindrical sides 1802, and ends 1804 for these sides. The shroud 1800 partially covers the chipper but does not encase the chipper near where the chipper contacts the log or the flitch or semi-cant. Naturally, the shroud cannot cover this part of the chipper as the teeth of the chipper must be free to contact the log or the flitch or the semi-cant. The housing of the chipper forms a funnel-like member 1806 which is directed away from that part of the chipper which contacts the log or flitch or semi-cant. Although not shown, there connects with the funnel-like member 1806 a suitable means such as a cloth bag or a metallic structure for directing the chips away from the chipper. This cloth or metallic structure may connect with a vacuum producing means so that the chips are blown away from the chipper.

The combination of the feed table and the side, top and bottom chipper 50 makes it possible to realize a larger cant or a larger utilizable product from a given log. For example, assume that the log being fed to the top, side and bottom chipper 50 is crooked or has a curve curving configuration. It is possible by means of the feed table 70 to center this log with respect to the side, top and bottom chipper 50. By so centering the log it is possible to realize a larger utilizable cant or product from the side, top and bottom chipper 50.

I do not know of another feed table or a combination of another feed table and subsequent processing apparatus which makes it possible to realize as large a utilizable cant as the combination of my feed table 70 and side, top and bottom chipper 50.

Having presented my invention, what I claim is as follows:

1. A chipping machine, said machine comprising:
   (a) a first chipper and a second chipper;
   (b) said first chipper chipping in a first plane;
   (c) said second chipper chipping in a second plane;
   (d) said first and second planes being substantially parallel;
   (e) means to vary the distance between the first chipper and the second chipper;

(f) a first feed roll juxtapositioned to the first chipper;
(g) a second feed roll juxtapositioned to the second chipper; and
(h) means to simultaneously vary the distance between the first feed roll and the second feed roll as the distance between the first chipper and the second chipper is varied.

2. A chipping machine, said machine comprising:
(a) a first chipper and a second chipper;
(b) said first chipper chipping in a first plane;
(c) said second chipper chipping in a second plane;
(d) said first and second planes being substantially parallel;
(e) a third chipper and a fourth chipper;
(f) said third chipper chipping in a third plane;
(g) said fourth chipper chipping in a fourth plane;
(h) said third and fourth planes being substantially parallel;
(i) said first and second planes being at substantially right angles to the third and fourth planes;
(j) a first feed roll juxtapositioned to the first chipper;
(k) a second feed roll juxtapositioned to the second chipper;
(l) said first and second feed rolls functioning as a pair;
(m) a third feed roll and a fourth feed roll juxtapositioned to the first chipper and the second chipper and functioning as a pair;
(n) said first, second, third and fourth feed rolls functioning as a unit;
(o) means to simultaneously vary the distance between the first chipper and the second chipper, the first feed roll and the second feed roll, and the third feed roll and the fourth feed roll;
(p) a fifth feed roll juxtapositioned to the third chipper;
(q) a sixth feed roll juxtapositioned to the fourth chipper;
(r) said fifth and sixth feed rolls functioning as a pair;
(s) a seventh feed roll and an eighth feed roll positioned behind the fifth and sixth feed rolls;
(t) said seventh and eighth feed rolls functioning as a pair;
(u) said fifth, sixth, seventh and eighth feed rolls functioning as a unit; and
(v) means to simultaneously vary the distance between the third chipper and the fourth chipper, the fifth feed roll and the sixth feed roll, and the seventh feed roll and the eighth feed roll.

3. A chipping machine, said machine comprising:
(a) a first chipper and a second chipper;
(b) a first substantially horizontal shaft;
(c) a second substantially horizontal shaft;
(d) a first guide positioning the first shaft;
(e) a second guide positioning the second shaft;
(f) a vertical guide means in contact with the first guide and the second guide for guiding said guides and the first and second shafts;
(g) said first chipper rotating with said first shaft;
(h) said second chipper rotating with said second shaft;
(i) a first motor for driving the first shaft;
(j) a second motor for driving the second shaft;
(k) a first feed roll juxtapositioned to the first chipper;
(l) a second feed roll juxtapositioned to the second chipper;
(m) said first and second feed rolls functioning as a pair;
(n) a third feed roll and a fourth feed roll positioned on the output side of the first and second chippers;
(o) said third and fourth feed rolls functioning as a pair;
(p) mechanical linkage connecting the first and second chippers, the first and second feed rolls, and the third and fourth feed rolls so as to simultaneously vary the distance between the first chipper and the second chipper, the first feed roll and the second feed roll, and the third feed roll and the fourth feed roll;
(q) a third chipper and a fourth chipper;
(r) a third substantially vertical shaft;
(s) a fourth substantially vertical shaft;
(t) a third guide positioning the third shaft;
(u) a fourth guide positioning the fourth shaft;
(v) a horizontal guide means in contact with the third guide and the fourth guide for guiding said guides and the third and fourth shafts;
(w) said third chipper rotating with said third shaft;
(x) said fourth chipper rotating with said fourth shaft;
(y) a third motor for driving the third shaft;
(z) a fourth motor for driving the fourth shaft;
(aa) a fifth feed roll juxtapositioned to the third chipper;
(bb) a sixth feed roll juxtapositioned to the fourth chipper;
(cc) said fifth and sixth feed rolls functioning as a pair;
(dd) a seventh feed roll and an eighth feed roll positioned on the output side of the third and fourth chippers and also of the fifth and sixth chippers;
(ee) said seventh and eighth feed rolls functioning as a pair; and
(ff) mechanical linkage connecting the third and fourth chippers, the fifth and sixth feed rolls, and the seventh and eighth feed rolls so as to simultaneously vary the distance between the third chipper and the fourth chipper, the fifth feed roll and the sixth feed roll, and the seventh feed roll and the eighth feed roll.

4. A chipping machine according to claim 3 and comprising:
(a) a first fluid actuated cylinder connecting with the first guide for moving the first guide and the first chipper;
(b) a second fluid actuated cylinder connecting with the second guide for moving the second guide and the second chipper;
(c) a first fluid actuated helping cylinder for assisting in the positioning of the first guide;
(d) a second fluid actuated helping cylinder for assisting in the positioning of the second guide;
(e) a first pantograph gear train connecting the first shaft with the second shaft so that the first chipper and the second chipper strike an object being chipped substantially simultaneously;
(f) a third fluid actuated cylinder connecting with the third guide for moving the third guide and the third chipper;
(g) a fourth fluid actuated cylinder connecting with the fourth guide for moving the fourth guide and the fourth chipper;
(h) a second pantograph gear train connecting the third shaft with the fourth shaft so that the third chipper and the fourth chipper strike an object being chipped substantially simultaneously;
(i) a brake associated with each chipper;
(j) said guide means comprising a guide channel;
(k) said brake comprising an angular shoe for fitting with the guide channel;
(l) a bell crank having a first arm and a second arm;
(m) said first arm connecting with the angular shoe;
(n) a fifth fluid actuated cylinder; and
(o) said fifth fluid actuated cylinder connecting with the second arm to vary the position of the angular shoe with respect to the guide channel.

5. In a chipping machine according to claim 4, said machine comprising:
(a) said vertical guide means being common to both the first chipper and the second chipper so that the distance between the two chippers is varied by moving the chippers on the vertical guide means;
(b) said horizontal guide means being common to both the third chipper and the fourth chipper so that the distance between the two chippers is varied by moving the chippers on the horizontal guide means;
(c) said feed rolls being cantilever mounted;
(d) each of said feed rolls being mounted in a bracket;
(e) one end of said bracket being fixed but said bracket being free to rotate around the fixed end; and
(f) means to rotate the feed rolls.

6. A chipping machine, said machine comprising:
(a) a first chipper;
(b) a second chipper;
(c) a first guide positioning the first chipper;
(d) a second guide positioning the second chipper;
(e) a guide means;
(f) said guide means being common to both the first guide and the second guide; and
(g) said first guide and second guide being movable on the guide means to vary the distance between the first chipper and the second chipper.

7. A chipping machine, said machine comprising:
(a) a chipper;
(b) a motor connecting with said chipper;
(c) a guide comprising a first guide channel;
(d) a second guide channel;
(e) said guide channels mating so that one of the guide channels guides the movement of the other channel; and
(f) said second guide channel being integral with the motor to guide the movement of the motor and the chipper.

8. A chipping machine, said machine comprising:
(a) a first chipper and a second chipper;
(b) said first chipper chipping in a first plane;
(c) said second chipper chipping in a second plane;
(d) said first and second planes being substantially parallel;
(e) a first means to move the first chipper with respect to the second chipper so as to vary the distance between the first chipper and the second chipper;
(f) a brake to control the movement of the first chipper with respect to the second chipper;
(g) a first motor connecting with the first chipper for driving the same;
(h) a second motor connecting with the second chipper for driving the same;
(i) a switch means to connect the first motor and the second motor with a source of power;
(j) a selection means for determining the distance the first chipper is to be moved;
(k) said selection means upon being actuated actuating the first means to move the first chipper a predetermined distance;
(l) a first electrical circuit controlling the first means;
(m) said first chipper upon moving said predetermined distance opens said first electrical circuit to cut off power to the first means;
(n) said first chipper upon moving said predetermined distance activating said brake to lock the first chipper in place;
(o) a second electrical circuit for supplying power to the first means;
(p) a first safety means in the second electrical circuit; and
(q) said brake upon locking the first chipper activating the first safety means to isolate the first means from a source of power.

9. A chipping machine, said machine comprising:
(a) a first chipper and a second chipper;
(b) said first chipper chipping in a first plane;
(c) said second chipper chipping in a second plane;
(d) said first and second planes being substantially parallel;
(e) a third chipper and a fourth chipper;
(f) said third chipper chipping in a third plane;
(g) said fourth chipper chipping in a fourth plane;
(h) said third and fourth planes being substantially parallel;
(i) said first and second planes being at substantially right angles to the third and fourth planes;
(j) a first means to move the first chipper with respect to the second chipper so as to vary the distance between the first chipper and the second chipper;
(k) a brake to control the movement of the first chipper with respect to the second chipper;
(l) a second motor connecting with the second chipper for driving the same;
(m) a third motor connecting with the third chipper for driving the same;
(n) a fourth motor connecting with the fourth chipper for driving the same;
(o) a switch means to connect the first motor, the second motor, the third motor and the fourth motor with a source of power;
(p) a selection means for determining the distance the first chipper is to be moved;
(q) said selection means upon being actuated actuating the first means to move the first chipper a predetermined distance;
(r) a first electrical circuit controlling the first means;
(s) said first chipper upon moving said predetermined distance opens said first electrical circuit to cut off power to the first means;
(t) said first chipper upon moving said predetermined distance activating said brake to lock the first chipper in place;
(u) a second electrical circuit for supplying power to the first means;
(v) a first safety means in the second electrical circuit; and
(w) said brake upon locking the first chipper activating the first safety means to isolate the first means from a source of power.

10. A chipping machine according to claim 9 and comprising:
(a) a second safety means in the second electrical circuit;
(b) a first indicator juxtapositioned to the first chipper and the second chipper;
(c) said first indicator controlling said second safety means;
(d) said first indicator being actuated to control said second safety means to isolate the first means from a source of power when the first chipper and the second chipper are acting on a member;
(e) a third safety means in the second electrical circuit;
(f) a second indicator juxtapositioned to the third chipper and the fourth chipper;
(g) said second indicator controlling the third safety means; and
(h) said second indicator being actuated to control said third safety means to isolate the first means from a source of power when the third chipper and the fourth chipper are acting on a member.

11. A chipping machine, said machine comprising:
(a) a first chipper and a second chipper;
(b) said first chipper chipping in a first plane;
(c) said second chipper chipping in a second plane;
(d) said first and second planes being substantially parallel;
(e) a third chipper and a fourth chipper;
(f) said third chipper chipping in a third plane;
(g) said fourth chipper chipping in a fourth plane;
(h) said third and fourth planes being substantially parallel;
(i) said first and second planes being at substantially right angles to the third and fourth planes;
(j) a fluid actuated cylinder connecting with the first chipper to move the first chipper with respect to the second chipper so as to vary the distance between the first chipper and the second chipper;
(k) an electrically controlled valve for controlling the flow of fluid to the fluid actuated cylinder;
(l) a brake to control the movement of the first chipper with respect to the second chipper;
(m) a first motor connecting with the first chipper for driving the same;
(n) a second motor connecting with the second chipper for driving the same;
(o) a third motor connecting with the third chipper for driving the same;
(p) a fourth motor connecting with the fourth chipper for driving the same;
(q) a switch means to connect the first motor, the second motor, the third motor and the fourth motor with a source of power;
(r) a selection means for determining the distance the first chipper is to be moved;
(s) said selection means upon being actuated actuating the first means to move the first chipper a predetermined distance;
(t) a first electrical circuit controlling the electrically controlled valve;
(u) said first chipper upon moving said predetermined distance opens said first electrical circuit to cut off the flow of fluid to the fluid actuated cylinder;
(v) said first chipper upon moving said predetermined distance activating said brake to lock the first chipper in place;
(w) a second electrical circuit connecting with the electrically controlled valves for supplying power to the valve;
(x) a first safety means in the second electrical circuit;
(y) said brake upon locking the first chipper in position actuating the first safety means to isolate the electrically controlled valve from a source of power;
(z) a second safety means in the second electrical circuit;
(aa) a first indicator juxtapositioned to the first chipper and the second chipper;
(bb) said first indicator controlling said second safety means;
(cc) said first indicator being actuated to control said second safety means to isolate the electrically controlled valve from a source of power when the first chipper and the second chipper are acting on a member;
(dd) a third safety means in the second electrical circuit;
(ee) a second indicator juxtapositioned to a third chipper and the fourth chipper;
(ff) said second indicator controlling the third safety means; and
(gg) said second indicator being actuated to control said third safety means to isolate the electrically controlled valve from a source of power when the third chipper and the fourth chipper are acting on a member.

12. A chipping machine in combination with a feed table:
(a) said feed table being in a feeding relationship with said chipping machine;
(b) said feed table comprising two spaced-apart chains;
(c) a first means to vary the distance between the chains to cause the chains to grip a member;
(d) a second means to advance the chains and the member toward the chipping machine;
(e) a first electrical circuit for supplying electricity to the second means;
(f) a first safety switch in the first electrical circuit;
(g) a first control indicator for the first safety switch to indicate when the member is being gripped by the chains and to open the first safety switch to isolate the second means from a source of electricity;
(h) said chipping machine comprising a first chipper and a second chipper;
(i) said first chipper chipping in a first plane;
(j) said second chipper chipping in a second plane;
(k) said first and second planes being substantially parallel;
(l) a third means to move the first chipper with respect to the second chipper so as to vary the distance between the first chipper and the second chipper;
(m) a brake to control the movement of the first chipper with respect to the second chipper;
(n) a second safety switch in the first electrical circuit;
(o) said brake upon being actuated to position the first chipper closing the second safety switch to connect the second means with a source of electricity;
(p) a first motor connecting with the first chipper for driving the same;
(q) a second motor connecting with the second chipper for driving the same;
(r) a third switch means to connect the first motor and the second motor with a source of power;
(s) a selection means for determining the distance the first chipper is to be moved;
(t) said selection means upon being actuated actuating the first means to move the first chipper a predetermined distance;
(u) a second electrical circuit controlling the third means;
(v) said first chipper upon moving said predetermined distance opens said second electrical circuit to cut off power to the third means; and
(w) said first chipper upon moving said predetermined distance activating said brake to lock the first chipper in place.

13. A chipping machine in combination with a feed table:
(a) said feed table being in a feeding relationship with said chipping machine;
(b) said feed table comprising two spaced-apart chains;
(c) a first fluid actuated cylinder connecting with both chains to vary the distance between the chains to grip a member;
(d) a first motor connecting with the chains to advance the chains and the member toward the chipping machine;
(e) a first electrical circuit for supplying electricity to the first motor;
(f) a first electrically controlled valve for controlling the flow of fluid to the fluid actuated cylinder;
(g) a first safety switch in the first electrical circuit;
(h) a first control indicator for the first safety switch to indicate when the member is being gripped by the chains and to open the first safety switch to isolate the first motor from a source of electricity;
(i) said chipping machine comprising a first chipper, a second chipper, a third chipper and a fourth chipper;
(j) said first chipper chipping in a first plane;
(k) said second chipper chipping in a second plane;
(l) said first and second plane being substantially parallel;
(m) said third chipper chipping in a third plane;
(n) said fourth chipper chipping in a fourth plane;
(o) said third and fourth planes being substantially parallel;
(p) said first and second planes being at substantially right angles to the third and fourth planes;
(q) a second fluid actuated cylinder connecting with the first chipper to move the first chipper with respect to the second chipper so as to vary the distance between the first chipper and the second chipper;
(r) a second electrically controlled valve for controlling the flow of fluid to the fluid actuated cylinder;
(s) a brake to control the movement of the first chipper with respect to the second chipper;

(t) a first motor connecting with the first chipper for driving the same;
(u) a second motor connecting with the second chipper for driving the same;
(v) a third motor connecting with the third chipper for driving the same;
(w) a fourth motor connecting with the fourth chipper for driving the same;
(x) a second switch means to connect the first motor, the second motor, the third motor and the fourth motor with a source of power;
(y) a selection means for determining the distance the first chipper is to be moved;
(z) said selection means upon being actuated actuating the second fluid actuated cylinder to move the first chipper a predetermined distance;
(aa) a second electrical circuit controlling the second electrically controlled valve;
(bb) said first chipper upon moving said predetermined distance opens said second electrical circuit to cut off the flow of fluid to the second fluid actuated cylinder;
(cc) said first chipper upon moving said predetermined distance activating said brake to lock the first chipper in place;
(dd) a third electrical circuit connecting with the second electrically controlled valve for supplying power to the valve;
(ee) a first safety means in the third electrical circuit;
(ff) said brake upon locking the first chipper in position actuating the first safety means to isolate the second electrically controlled valve from a source of power;
(gg) a second safety means in the third electrical circuit;
(hh) a second control indicator juxtapositioned to the first chipper and the second chipper;
(ii) said second control indicator controlling said second safety means;
(jj) said second control indicator being actuated to control said second safety means to isolate the second electrically controlled valve from a source of power when the third chipper and the fourth chipper are acting on a member;
(kk) a third safety means in the third electrical circuit;
(ll) a third control indicator juxtapositioned to the third chipper and the fourth chipper;
(mm) said third control indicator controlling the third safety means; and
(nn) said third control indicator being actuated to control said third safety means to isolate the second electrically controlled valve from a source of power when the third chipper and the fourth chipper are acting on a member.

14. A chipping machine in combination with a dimension machine:
(a) said chipping machine being in a feeding relationship with said dimension machine;
(b) said dimension machine comprising a first shaft and a second shaft;
(c) said first and second shaft being parallel;
(d) a plurality of saws on the first shaft and a plurality of saws on the second shaft;
(e) said saws on the first and the second shafts being aligned;
(f) a first motor connecting with and driving the first shaft;
(g) a second motor connecting with and driving the second shaft;
(h) a first electrical circuit for supplying electricity to the first motor and the second motor;
(i) said chipping machine comprising a first chipper and a second chipper;
(j) said first chipper chipping in a first plane;
(k) said second chipper chipping in a second plane;
(l) said first and second planes being substantially parallel;
(m) a first means to move the first chipper with respect to the second chipper so as to vary the distance between the first chipper and the second chipper;
(n) a brake to control the movement of the first chipper with respect to the second chipper;
(o) a third motor connecting with the first chipper for driving the same;
(p) a fourth motor connecting with the second chipper for driving the same;
(q) a switch means to connect the third motor and the fourth motor with a source of power;
(r) a selection means for determining the distance the first chipper is to be moved;
(s) said selection means upon being actuated actuating the first means to move the first chipper a predetermined distance;
(t) a second electrical circuit controlling the first means;
(u) said first chipper upon moving said predetermined distance opens second electrical circuit to cut off power to the first means;
(v) said first chipper upon moving said predetermined distance activating said brake to lock the first chipper in place;
(w) a third electrical circuit for supplying power to the first means;
(x) a first safety means in the third electrical circuit; and
(y) said brake upon locking the first chipper activating the first safety means to isolate the first means from a source of power.

15. A chipping machine in combination with a dimension machine:
(a) said chipping machine being in a feeding relationship with said dimension machine;
(b) said dimension machine comprising a first shaft and a second shaft;
(c) said first and second shafts being parallel;
(d) a plurality of saws on the first shaft and a plurality of saws on the second shaft;
(e) said saws on the first and the second shafts being aligned;
(f) a first motor connecting with and driving the first shaft;
(g) a second motor connecting with and driving the second shaft;
(h) feed rolls juxtapositioned to said saws to feed a material to said saws;
(i) a third motor connecting with said feed rolls and for driving the same;
(j) a first electrical circuit for supplying electricity to the third motor;
(k) said chipping machine comprising a first chipper and a second chipper;
(l) said first chipper chipping in a first plane;
(m) said second chipper chipping in a second plane;
(n) said first and second planes being substantially parallel;
(o) a third chipper and a fourth chipper;
(p) said third chipper chipping in a third plane;
(q) said fourth chipper in a fourth plane;
(r) said third and fourth planes being substantially parallel;
(s) said first and second planes being at substantially right angles to the third and fourth planes;
(t) a first fluid actuated cylinder connecting with the first chipper to move the first chipper with respect to the second chipper so as to vary the distance between the first chipper and the second chipper;
(u) a first electrically controlled valve for controlling the flow of fluid to the first fluid actuated cylinder;
(v) a brake to control the movement of the first chipper with respect to the second chipper;
(w) a fourth motor connecting with the first chipper for driving the same;
(x) a fifth motor connecting with the second chipper for driving the same;

(y) a sixth motor connecting with the third chipper for driving the same;
(z) a seventh motor connecting with the fourth chipper for driving the same;
(aa) a second electrical circuit for supplying electricity to the first motor, the second motor, the fourth motor, the fifth motor, the sixth motor and the seventh motor;
(bb) a selection means for determining the distance the first chipper is to be moved;
(cc) said selection means upon being actuated actuating the first fluid actuated cylinder to move the first chipper a predetermined distance;
(dd) a third electrical circuit controlling the first electrically controlled valve;
(ee) said first chipper upon moving said predetermined distance opens said third electrical circuit to cut off the flow of fluid to the first actuated cylinder;
(ff) said first chipper upon moving said predetermined distance activating said brake to lock the first chipper in place;
(gg) a fourth electrical circuit connecting with the first electrically controlled valve for supplying power to the valve;
(hh) a first safety means in the fourth electrical circuit;
(ii) a second safety means in the fourth electrical circuit;
(jj) a first indicator juxtapositioned to the first chipper and the second chipper;
(kk) said first indicator controlling said second safety means;
(ll) said first indicator being actuated to control said second safety means to isolate the first electrically controlled valve from a source of power when the first chipper and the second chipper are acting on a member;
(mm) a third safety means in the fourth electrical circuit;
(nn) a second indicator juxtapositioned to the third chipper and the fourth chipper;
(oo) said second indicator controlling the third safety means;
(pp) said second indicator being actuated to control said third safety means to isolate the first electrically controlled valve from a source of power when the third chipper and the fourth chipper are acting on a member;
(qq) said chipping machine having feed rolls;
(rr) an eighth motor connecting with and driving said feed rolls; and
(ss) said eighth motor being in the first electrical circuit so that the feed rolls in the dimension machine must be functioning substantially simultaneously with the feed rolls of the chipping machine.

16. A chipping machine in combination with a feed table and a dimension machine:
(a) said feed table being in a feeding relationship with said chipping machine;
(b) said dimension machine comprising a first shaft and a second shaft;
(c) said feed table comprising two spaced-apart chains;
(d) a first means to vary the distance between the chains to cause the chains to grip a member;
(e) a second means to advance the chains and the member toward the chipping machine;
(f) a first electrical circuit for supplying electricity to the second means;
(g) a first safety switch in the first electrical circuit;
(h) a first control indicator for the first safety switch to indicate when the member is being gripped by the chains and to open the first safety switch to isolate the second means from a source of electricity;
(i) said chipping machine comprising a first chipper and a second chipper;
(j) said first chipper chipping in a first plane;
(k) said second chipper chipping in a second plane;
(l) said first and second planes being substantially parallel;
(m) a third means to move the first chipper with respect to the second chipper so as to vary the distance between the first chipper and the second chipper;
(n) a brake to control the movement of the first chipper with respect to the second chipper;
(o) a second safety switch in the first electrical circuit;
(p) said brake upon being actuated to position the first chipper closing the second safety switch to connect the second means with a source of electricity;
(q) a first motor connecting with the first chipper for driving the same;
(r) a second motor connecting with the second chipper for driving the same;
(s) a third switch means to connect the first motor and the second motor with a source of power;
(t) a selection means for determining the distance the first chipper is to be moved;
(u) said selection means upon being actuated actuating the first means to move the first chipper a predetermined distance;
(v) a second electrical circuit controlling the third means;
(w) said first chipper upon moving said predetermined distance opens said second electrical circuit to cut off power to the third means;
(x) said first chipper upon moving said predetermined distance activating said brake to lock the first chipper in place;
(y) said dimension machine comprising a first shaft and a second shaft;
(z) said first and second shafts being parallel;
(aa) a plurality of saws on the first shaft and a plurality of saws on the second shaft;
(bb) said saws on the first and second shafts being aligned;
(cc) a first motor connecting with and driving the first shaft;
(dd) a second motor connecting with and driving the second shaft;
(ee) feed rolls juxtapositioned to said saws to feed a material to said saws;
(ff) a third motor connecting with said feed rolls and for driving the same; and
(gg) a third electrical circuit for supplying electricity to the third motor.

17. A combination of a chipping machine and a dimension machine, said combination comprising:
(a) said chipping machine being in a feeding relationship with said dimension machine;
(b) said dimension machine comprising a first shaft and a second shaft;
(c) said first and second shaft being parallel;
(d) a plurality of saws on the first shaft and a plurality of saws on the second shaft;
(e) said saws on the first and the second shafts being aligned;
(f) a first motor connecting with and driving the first shaft;
(g) a second motor connecting with and driving the second shaft;
(h) said chipping machine comprising a first chipper and a second chipper;
(i) said first chipper chipping in a first plane;
(j) said second chipper chipping in a second plane;
(k) said first and second planes being substantially parallel;
(l) a first means to move the first chipper with respect to the second chipper so as to vary the distance between the first chipper and the second chipper;
(m) a brake to control the movement of the first chipper with respect to the second chipper;

(n) a selection means for determining the distance the first chipper is to be moved;

(o) said selection means upon being actuated actuating the first means to move the first chipper a predetermined distance; and (p) said first chipper upon moving said predetermined distance activating said brake to lock the first chipper in place.

18. A combination of a chipping machine and a dimension machine according to claim 17 and comprising:

(a) a first motor connecting with the first chipper for driving the same;

(b) a second motor connecting with the second chipper for driving the same;

(c) a switch means to connect the first motor and the second motor with a source of power;

(d) a first electrical circuit for supplying power to the first means;

(e) a first safety means in the first electrical circuit; and (f) said brake upon locking the first chipper activating the first safety means to isolate the first means from a source of power.

19. A combination of a chipping machine and a dimension machine, said combination comprising:

(a) a chipping machine being in a feeding relationship with said dimension machine;

(b) said dimension machine comprising a first shaft and a second shaft;

(c) said first and second shafts being parallel;

(d) a plurality of saws on the first shaft and a plurality of saws on the second shaft;

(e) said saws on the first and the second shafts being aligned;

(f) said chipping machine comprising a first chipper and a second chipper;

(g) said first chipper chipping in a first plane;

(h) said second chipper chipping in a second plane;

(i) said first and second planes being substantially parallel;

(j) a third chipper and a fourth chipper;

(k) said third chipper chipping in a third plane;

(l) said fourth chipper chipping in a fourth plane;

(m) said third and fourth planes being substantially parallel;

(n) said first and second planes being at substantially right angles to the third and fourth planes;

(o) a first means to move the first chipper with respect to the second chipper so as to vary the distance between the first chipper and the second chipper;

(p) a brake to control the movement of the first chipper with respect to the second chipper;

(q) a selection means for determining the distance the first chipper is to be moved;

(r) said selection means upon being actuated actuating the first means to move the first chipper a predetermined distance; and (s) said first chipper upon moving said predetermined distance activating said brake to lock the first chipper in place.

20. A combination of a chipping machine and a dimension machine according to claim 19 and comprising:

(a) a first motor connecting with and driving the first shaft;

(b) a second motor connecting with and driving the second shaft;

(c) feed rolls juxtapositioned to said saws to feed a material to said saws;

(d) a third motor connecting with said feed rolls and for driving the same;

(e) a first electrical circuit for supplying electricity to the third motor;

(f) said chipping machine having feed rolls;

(g) a fourth motor connecting with and driving said feed rolls; and (h) said fourth motor being in the first electrical circuit so that the feed rolls in the dimension machine must be functioning substantially simultaneously with the feed rolls of the chipping machine.

21. A combination of a chipping machine and a dimension machine according to claim 19 and comprising:

(a) said first means being a first fluid actuated cylinder connecting with the first chipper;

(b) a first electrically controlled valve for controlling the flow of fluid to the first fluid actuated cylinder;

(c) a third motor connecting with the first chipper for driving the same;

(d) a fourth motor connecting with the second chipper for driving the same;

(e) a fifth motor connecting with the third chipper for driving the same;

(f) a sixth motor connecting with the fourth chipper for driving the same;

(g) a first electrical circuit for supplying electricity to the first motor, the second motor, the third motor, the fourth motor, the fifth motor and the sixth motor;

(h) a second elecrical circuit controlling the first electrically controlled valve;

(i) said first chipper upon moving said predetermined distance opens said second electrical circuit to cut off the flow of fluid to the first actuated cylinder;

(j) a third electrical circuit connecting with the first electrically controlled valve for supplying power to the valve;

(k) a first safety means in the third electrical circuit;

(l) a second safety means in the third electrical circuit;

(m) a first indicator juxtapositioned to the first chipper and the second chipper;

(n) said first indicator controlling said second safety means;

(o) said first indicator being actuated to control said second safety means to isolate the first electrically controlled valve from a source of power when the first chipper and the second chipper are acting on a member;

(p) a third safety means in the third electrical circuit;

(q) a second indicator juxtapositioned to the third chipper and the fourth chipper;

(r) said second indicator controlling the third safety means; and (s) said second indicator being actuated to control said third safety means to isolate the first electrically controlled valve from a source of power when the third chipper and the fourth chipper are acting on a member.

22. A chipping machine, said machine comprising:

(a) a first chipper and a second chipper;

(b) said first chipper chipping in a first plane;

(c) said second chipper chipping in a second plane;

(d) said first and second planes being substantially parallel;

(e) a first means to move the first chipper with respect to the second chipper so as to vary the distance between the first chipper and the second chipper;

(f) a brake to control the movement of the first chipper with respect to the second chipper;

(g) a selection means for determining the distance the first chipper is to be moved;

(h) said selection means upon being actuated actuating the first means to move the first chipper a predetermined distance;

(i) a first electrical circuit controlling the first means;

(j) said first chipper upon moving said predetermined distance opens said first electrical circuit to cut off power to the first means; and (k) said first chipper upon moving said predetermined distance activating said brake to lock the first chipper in place.

23. A chipping machine according to claim 22 and comprising:

(a) a second electrical circuit for supplying power to the first means;

(b) a first safety means in the second electrical circuit; and (c) said brake upon locking the first chipper activating the first safety means to isolate the first means from a source of power.

24. A combination of a feed table and a chipping machine and a dimension machine:
(a) said feed table being in a feeding relationship with said chipping machine for feeding a log to the chipping machine and for centering the log with respect to the chipping machine;
(b) said feed table comprising two spaced-apart chains;
(c) a first means to vary the distance between the chains to cause the chains to grip the log;
(d) a second means to advance the chains and the log toward the chipping machine;
(e) said chipping machine comprising a first chipper and a second chipper;
(f) said first chipper chipping in a first plane;
(g) said second chipper chipping in a second plane;
(h) said first and second planes being substantially parallel;
(i) a third means to move the first chipper with respect to the second chipper so as to vary the distance between the first chipper and the second chipper;
(j) a brake to control the movement of the first chipper with respect to the second chipper;
(k) a selection means for determining the distance the first chipper is to be moved;
(l) said dimension machine comprising a first shaft and a second shaft;
(m) said first and second shafts being parallel;
(n) a plurality of saws on the first shaft and a plurality of saws on the second shaft; and
(o) said saws on the first and second shafts being aligned.

25. A combination according to claim 24 and comprising:
(a) a first motor connecting with the first chipper for driving the same;
(b) a second motor connecting with the second chipper for driving the same;
(c) a switch means to connect the first motor and the second motor with a source of power;
(d) said selection means upon being actuated actuating the first means to move the first chipper a predetermined distance;
(e) said first chipper upon moving said predetermined distance activating said brake to lock the first chipper in place;
(f) a first motor connecting with and driving the first shaft;
(g) a second motor connecting with and driving the second shaft; and
(h) feed rolls juxtapositioned to said saws to feed a material to said saws.

26. A combination according to claim 24 and comprising:
(a) a first electrical circuit for supplying electricity to the second means;
(b) a first safety switch in the first electrical circuit;
(c) a first control indicator for the first safety switch to indicate when the member is being gripped by the chains and to open the first safety switch to isolate the second means from a source of electricity;
(d) a second safety switch in the first electrical circuit;
(e) said brake upon being actuated to position the first chipper closing the second safety switch to connect the second means with a source of electricity;
(f) a first motor connecting with the first chipper for driving the same;
(g) a second motor connecting with the second chipper for driving the same;
(h) a third switch means to connect the first motor and the second motor with a source of power;
(i) said selection means upon being actuated actuating the first means to move the first chipper a predetermined distance;
(j) a second electrical circuit controlling the third means;
(k) said first chipper upon moving said predetermined distance opens said second electrical circuit to cut off power to the third means; and
(l) said first chipper upon moving said predetermined distance activating said brake to lock the first chipper in place.

27. A combination according to claim 26 and comprising:
(a) a third chipper and a fourth chipper;
(b) said third chipper chipping in a third plane;
(c) said fourth chipper chipping in a fourth plane;
(d) said third and fourth planes being substantially parallel; and
(e) said first and second planes being at substantially right angles to the third and fourth planes.

28. A combination of a chipping machine and a feed table for feeding lengthwise to said machine a non-uniform log having varying transverse dimensions with respect to a center line extending lengthwise of said log, said combination comprising:
(a) said chipping machine comprising a first chipper and a second chipper;
(b) said first chipper chipping in a first plane;
(c) said second chipper chipping in a second plane;
(d) said first and second planes being substantially parallel;
(e) means to move the first chipper with respect to the second chipper so as to vary the distance between the first chipper and the second chipper; and
(f) said feed table being adapted to feed said non-uniform log to said machine in such a manner that said log center line is substantially parallel to said first and second chipping planes.

29. A combination of a chipping machine and a feed table, said combination comprising:
(a) said chipping machine comprising a first chipper and a second chipper;
(b) said first chipper chipping in a first plane;
(c) said second chipper chipping in a second plane;
(d) said first and second planes being substantially parallel;
(e) means to move the first chipper with respect to the second chipper so as to vary the distance between the first chipper and the second chipper;
(f) said feed table being in a feeding relationship with said chipping machine for feeding a log lengthwise to the chipping machine;
(g) said feed table comprising two spaced-apart chains;
(h) means to vary the distance between the chains to cause the chains to grip substantially opposed lengthwise extending side surfaces of said log;
(i) said chains upon gripping said log substantially centering said log with respect to said chipping machine; and
(j) means to advance the chains and the log gripped thereby toward the chipping machine.

30. A combination of a chipping machine and a feed table according to claim 29 and comprising:
(a) a brake to control the movement of the first chipper with respect to the second chipper;
(b) a first motor connecting with the first chipper for driving the same;
(c) a second motor connecting with the second chipper for driving the same;
(d) a switch means to connect the first motor and the second motor with a source of power;
(e) a selection means for determining the distance the first chipper is to be moved; and (f) said selection means upon being actuated actuating the first means to move the first chipper a predetermined distance.

31. A combination of a chipping machine and a feed table for feeding lengthwise to said machine a non-uniform log having varying transverse dimensions with respect to a center line extending lengthwise of said log, said combination comprising:
(a) said chipping machine comprising a first chipper, a second chipper, a third chipper and a fourth chipper;
(b) said first chipper chipping in a first plane;
(c) said second chipper chipping in a second plane;
(d) said first and second planes being substantially parallel;
(e) said third chipper chipping in a third plane;
(f) said fourth chipper chipping in a fourth plane;
(g) said third and fourth planes being substantially parallel;
(h) said first and second planes being at substantially right angles to the third and fourth planes;
(i) means to move the first chipper relative to the second chipper so as to vary the distance between the first chipper and the second chipper;
(j) said feed table including means to grip said non-uniform log;
(k) said gripping means being adapted to substantially center said non-uniform log with respect to the chipping machine in such a manner that said log center line is substantially parallel to said chipping planes; and
(l) means to advance the gripping means and said non-uniform log toward the chipping machine.

32. A combination of a chipping machine and a feed table, said combination comprising:
(a) said chipping machine comprising a first chipper, a second chipper, a third chipper and a fourth chipper;
(b) said first chipper chipping in a first plane;
(c) said second chipper chipping in a second plane;
(d) said first and second planes being substantially parallel;
(e) said third chipper chipping in a third plane;
(f) said fourth chipper chipping in a fourth plane;
(g) said third and fourth planes being substantially parallel;
(h) said first and second planes being at substantially right angles to the third and fourth planes;
(i) means to move the first chipper with respect to the second chipper so as to vary the distance between the first chipper and second chipper;
(j) said feed table being in a feeding relationship with said chipping machine for feeding a log lengthwise to the chipping machine in a centered relationship thereto;
(k) said feed table comprising two spaced-apart chains;
(l) means to vary the distance between the chains to cause the chains to grip the log;
(m) means to substantially center the log with respect to said chipping machine in a first direction perpendicular to one pair of said parallel chipping planes;
(n) said chains upon gripping said log when centered in said first direction and being adapted to substantially center said log with respect to said chipping machine in a second direction perpendicular to the other pair of said parallel chipping planes; and
(o) means to advance the chains and the log gripped thereby toward the chipping machine;

33. A combination of a chipping machine and a feed table according to claim 32 and comprising:
(a) a brake to control the movement of the first chipper with respect to the second chipper;
(b) a first electrical circuit for supplying electricity to the second means; and
(c) a first safety switch in the first electrical circuit.

34. A method for handling a non-uniform log having varying transverse dimensions with respect to a center line extending lengthwise of said log, said method comprising: removing the peripheral portion of said non-uniform log by a chipping action to form chips and a cant having a center line which is substantially the center line of said log from which said cant is formed.

35. A method for processing a non-uniform log having varying transverse dimensions with respect to a center line extending lengthwise of said log to make chips and a cant having on its periphery a plurality of flat surfaces, said method comprising:
(a) providing a chipping machine adapted to form said plurality of flat surfaces on said cant by removing portions of said non-uniform log in the form of chips;
(b) feeding said non-uniform log to said machine in such a manner that said log center line is substantially parallel to said flat surfaces to be formed; and
(c) forming said flat surfaces.

36. A combination of a chipping machine and a dimension machine, said combination comprising:
(a) said chipping machine being in a feeding relationship with said dimension machine;
(b) said dimension machine comprising a first shaft and a second shaft;
(c) said first and second shafts being parallel;
(d) a plurality of saws on the first shaft and a plurality of saws on the second shaft;
(e) said saws on the first and the second shafts being aligned;
(f) means for driving the first and second shafts;
(g) said chipping machine comprising a first chipper and a second chipper;
(h) said first chipper chipping in a first plane;
(i) said second chipper chipping in a second plane;
(j) said first and second planes being substantially parallel;
(k) a first means to move the first chipper with respect to the second chipper so as to vary the distance between the first chipper and the second chipper;
(l) a brake to control the movement of the first chipper with respect to the second chipper;
(m) a selection means for determining the distance the first chipper is to be moved; and
(n) said selection means upon being actuated actuating the first means to move the first chipper a predetermined distance.

37. A combination of a chipping machine and a dimension machine, said combination comprising:
(a) a chipping machine being in a feeding relationship with said dimension machine;
(b) said dimension machine comprising a first shaft and a second shaft;
(c) said first and second shafts being parallel;
(d) a plurality of saws on the first shaft and a plurality of saws on the second shaft;
(e) said saws on the first and the second shafts being aligned;
(f) said chipping machine comprising a first chipper and a second chipper;
(g) said first chipper chipping in a first plane;
(h) said second chipper chipping in a second plane;
(i) said first and second planes being substantially parallel;
(j) a third chipper and fourth chipper;
(k) said third chipper chipping in a third plane;
(l) said fourth chipper chipping in a fourth plane;
(m) said third and fourth planes being substantially parallel;
(n) said first and second planes being at substantially right angles to the third and fourth planes;
(o) a first means to move the first chipper with respect to the second chipper so as to vary the distance between the first chipper and the second chipper;
(p) a brake to control the movement of the first chipper with respect to the second chipper;

(q) a selection means for determining the distance the first chipper is to be moved; and
(r) said selection means upon being actuated actuating the first means to move the first chipper a predetermined distance.

38. A combination of a chipping machine and a dimension machine according to claim 37 and comprising:
(a) a first motor connecting with and driving the first shaft;
(b) a second motor connecting with and driving the second shaft;
(c) feed rolls juxtapositioned to said saws to feed a material to said saws;
(d) a third motor connecting with said feed rolls and for driving the same;
(e) a first electrical circuit for supplying electricity to the third motor;
(f) said chipping machine having feed rolls;
(g) a fourth motor connecting with and driving said feed rolls; and
(h) said fourth motor being in the first electrical circuit so that the feed rolls in the dimension machine must be functioning substantially simultaneously with the feed rolls of the chipping machine.

39. A chipping machine, said machine comprising:
(a) a first chipper and a second chipper;
(b) said first chipper chipping in a first plane;
(c) said second chipper chipping in a second plane;
(d) said first and second planes being substantially parallel;
(e) a first means to move the first chipper with respect to the second chipper so as to vary the distance between the first chipper and the second chipper;
(f) a brake to control the movement of the first chipper with respect to the second chipper;
(g) a selection means for determining the distance the first chipper is to be moved;
(h) said selection means upon being actuated actuating the first means to move the first chipper a predetermined distance;
(i) a first electrical circuit controlling the first means; and
(j) said first chipper upon moving said predetermined distance opens said first electrical circuit to cut off power to the first means.

40. A combination of a chipping machine and a dimension machine, said combination comprising:
(a) said chipping machine being in a feeding relationship with said dimension machine;
(b) said dimension machine comprising at least one shaft;
(c) a plurality of saws on said shaft;
(d) means for driving said shaft;
(e) said chipping machine comprising a first chipper and a second chipper;
(f) said first chipper chipping in a first plane;
(g) said second chipper chipping in a second plane;
(h) said first and second planes being substantially parallel;
(i) a first means to move the first chipper with respect to the second chipper so as to vary the distance between the first chipper and the second chipper;
(j) a brake to control the movement of the first chipper with respect to the second chipper;
(k) a selection means for determining the distance the first chipper is to be moved; and
(l) said selection means upon being actuated actuating the first means to move the first chipper a predetermined distance.

References Cited

UNITED STATES PATENTS

| | | | |
|---|---|---|---|
| 1,606,313 | 11/1926 | Martenet | 144—416 XR |
| 1,938,108 | 12/1933 | Morris | 144—116 |
| 2,684,088 | 7/1954 | Miller | 143—38 |

WILLIAM W. DYER, Jr., *Primary Examiner.*

W. D. BRAY, *Assistant Examiner.*